(12) United States Patent
Okada et al.

(10) Patent No.: US 9,003,082 B2
(45) Date of Patent: Apr. 7, 2015

(54) INFORMATION PROCESSING APPARATUS, ARITHMETIC DEVICE, AND INFORMATION TRANSFERRING METHOD

(75) Inventors: Seishi Okada, Kawasaki (JP); Toshikazu Ueki, Yokohama (JP); Hideyuki Koinuma, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 287 days.

(21) Appl. No.: 13/599,114

(22) Filed: Aug. 30, 2012

(65) Prior Publication Data

US 2013/0262783 A1 Oct. 3, 2013

(30) Foreign Application Priority Data

Mar. 30, 2012 (JP) ................... 2012-083281

(51) Int. Cl.
*G06F 5/00* (2006.01)
*G06F 9/54* (2006.01)
(52) U.S. Cl.
CPC ...................... *G06F 9/546* (2013.01)
(58) Field of Classification Search
CPC ............. G06F 5/065; G06F 5/00; G06F 3/00; G06F 13/00; G06F 2003/00; G06F 9/50
USPC .............................................. 710/52–57, 310
See application file for complete search history.

(56) References Cited

U.S. PATENT DOCUMENTS

| | | | |
|---|---|---|---|
| 5,357,612 A * | 10/1994 | Alaiwan ..................... | 709/216 |
| 5,765,187 A | 6/1998 | Shimizu et al. | |
| 6,091,734 A | 7/2000 | Suzuki et al. | |
| 8,321,866 B2 | 11/2012 | Suzuoki et al. | |
| 8,656,409 B2 * | 2/2014 | Li et al. ......................... | 719/312 |
| 2003/0058875 A1 | 3/2003 | Arndt et al. | |

FOREIGN PATENT DOCUMENTS

| | | |
|---|---|---|
| EP | 0444376 A1 | 9/1991 |
| EP | 0614139 | 9/1994 |
| JP | 04-308956 | 10/1992 |
| JP | 6-259387 | 9/1994 |
| JP | 07-200506 | 8/1995 |
| JP | 8-87425 | 4/1996 |

(Continued)

OTHER PUBLICATIONS

Extended European Search Report issued May 31, 2013 in corresponding European Application No. 12185664.5.

(Continued)

*Primary Examiner* — Christopher Shin
(74) *Attorney, Agent, or Firm* — Staas & Halsey LLP

(57) ABSTRACT

An information processing apparatus including a plurality of nodes. The each of the nodes comprises a processor, a storage device, and a storing unit that stores therein multiple pointer sets in each of which a write pointer indicating an address used when data received from another node is stored in the storage device is associated with a read pointer indicating an address used when the data is read from the storage device. The each of the nodes comprises a notifying unit that notifies a node corresponding to a transmission source of the data of a pointer identifier that indicates a pointer set. The each of the nodes comprises a retaining unit that retains the received data in the storage device in accordance with an address indicated by a write pointer in a pointer set indicated by the pointer identifier.

10 Claims, 41 Drawing Sheets

(56) References Cited

FOREIGN PATENT DOCUMENTS

| | | |
|---|---|---|
| JP | 8-263234 | 10/1996 |
| JP | 8-339354 | 12/1996 |
| JP | 9-269936 | 10/1997 |
| JP | 10-98524 | 4/1998 |
| JP | 2002-342165 | 11/2002 |
| JP | 2003-216592 | 7/2003 |
| JP | 2005-234617 | 9/2005 |
| WO | WO 2007/073628 A1 | 7/2007 |

OTHER PUBLICATIONS

Donald E. Knuth, "The Art of Computer Programming, vol. 1: Fundamental Algorithms", 1969, Addison-Wesley Publishing Company, USA, 15pp.

Japanese Office Action mailed Nov. 5, 2013 in corresponding Japanese Application No. 2012-083281.

Japanese Office Action mailed Apr. 15, 2014 in corresponding Japanese Patent Application No. 2012-083281.

* cited by examiner

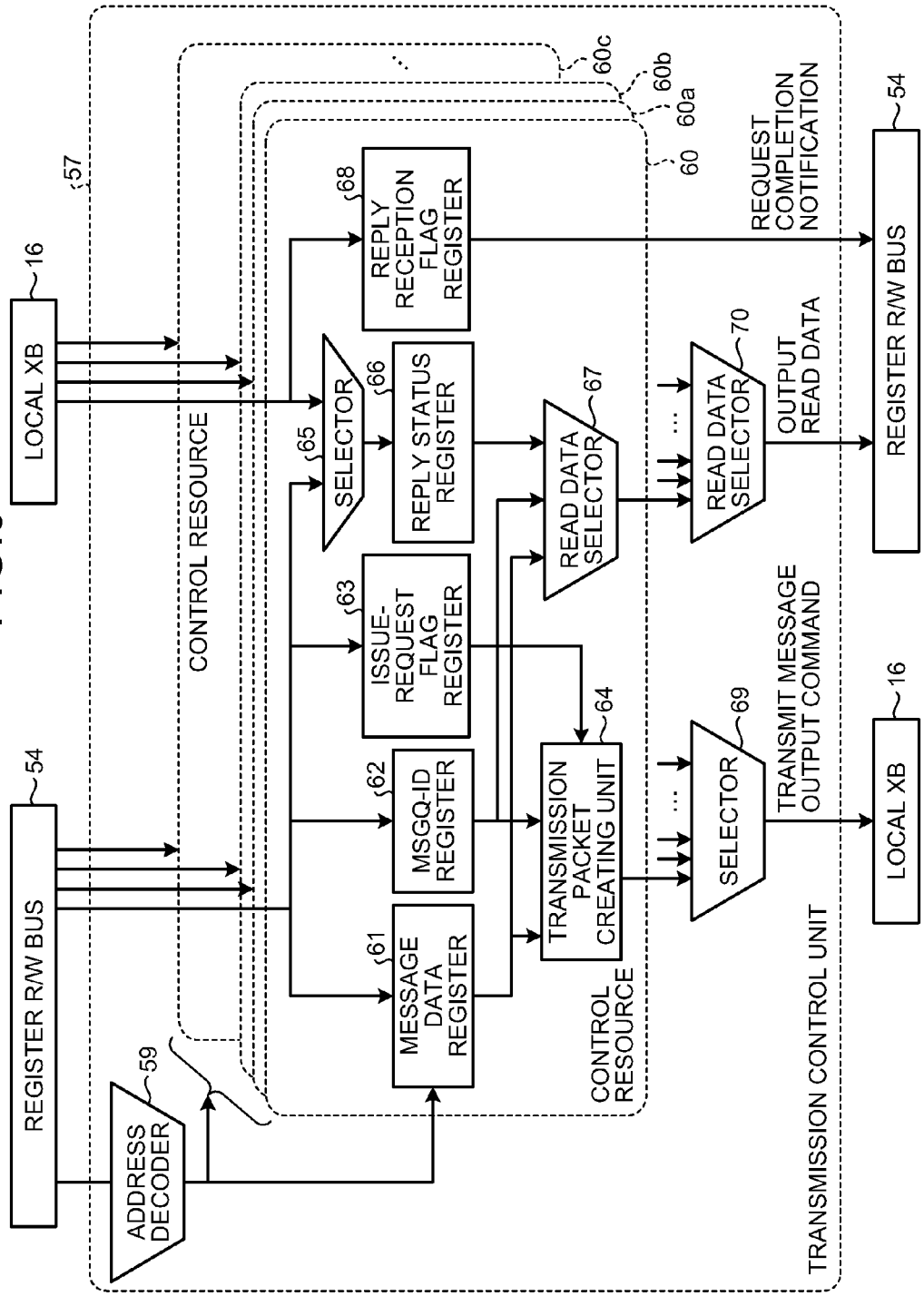

FIG.10

| REGISTER NAME | ADDRESS | COMMAND | DATA SIZE | MEANING OF DATA | STATUS OF SAVE/RESTORE AT TIME OF CONTEXT SWITCH |
|---|---|---|---|---|---|
| MESSAGE DATA REGISTER | 0x00 TO 0x3F | R/W | 32 BYTES OR 64 BYTES | MESSAGE DATA TO BE TRANSMITTED | TO BE PERFORMED |
| MSGQ-ID REGISTER | 0x40 TO 0x47 | R/W | 32 BITS | MSGQ-ID | TO BE PERFORMED |
| ISSUE-REQUEST FLAG REGISTER | 0x48 TO 0x4F | W | 1 BIT | TRANSMIT MESSAGE BY WRITING VALUE 1 IN THIS REGISTER | NOT TO BE PERFORMED |
| REPLY STATUS REGISTER | 0x50 TO 0x57 | R/W | 2 BITS | REPLY STATUS | TO BE PERFORMED |

FIG.11

| FIELD | CPU NUMBER | REGISTER SET NUMBER | ACCESS KEY | MESSAGE SIZE |
|---|---|---|---|---|
| DATA CONTENTS | CPU-ID [7:0] | REGISTER ID [10:0] | ACCESS KEY [11:0] | M SIZE |

FIG.12

| DATA CONTENTS | INFORMATION STORED IN FIELD |
|---|---|
| CPU-ID [7:0] | DESTINATION CPU NUMBER USED WHEN MESSAGE IS TRANSMITTED |
| REGISTER ID [10:0] | REGISTER SET NUMBER INDICATE UNIQUE DESTINATION ID TOGETHER WITH CPU-ID [7:0] IN ENTIRE SYSTEM |
| ACCESS KEY [11:0] | ACCESS KEY VALUE |
| M SIZE | MESSAGE SIZE THAT CAN BE RECEIVED VALUE 0: 32 BYTES, VALUE 1: 64 BYTES |

FIG.13

| FORMAT | DESTINATION CPU NUMBER | OPERATION CODE | TRANSMISSION SOURCE CPU NUMBER | ENTRY ID | - | MSGQ-ID | DATA |

FIG.14

| FORMAT | DESTINATION CPU NUMBER | OPERATION CODE | TRANSMISSION SOURCE CPU NUMBER | ENTRY ID | STATUS | - |

FIG.16

| RAM FIELD | DATA [81:79] | DATA [78] | DATA [77] | DATA [76:36] | DATA [34:24] | DATA [23:16] | DATA [15:8] | DATA [7:0] |
|---|---|---|---|---|---|---|---|---|
| STORED DATA | Q SIZE | M SIZE | INTMASK | BASE ADDRESS | MEMORY KEY | WRITE POINTER | READ POINTER | CHECK BIT |

FIG.17

| RAM FIELD | DATA CONTENTS |
|---|---|
| Q SIZE | INDICATE SIZE OF MESSAGE STORING AREA<br>VALUE 000: ENTRY IS INVALID, VALUE 001: 128 BYTES,<br>VALUE 010: 256 BYTES, VALUE 011: 512 BYTES,<br>VALUE 100: 1 KILOBYTE, VALUE 101: 2 KILOBYTES,<br>VALUE 110: 4 KILOBYTES, VALUE 111: 8 KILOBYTES |
| M SIZE | INDICATE MESSAGE SIZE<br>VALUE 0: 32 BYTES, VALUE 1: 64 BYTES |
| INTMASK | INSTRUCT TO GENERATE INTERRUPT WHEN MESSAGE IS RECEIVED<br>VALUE 0: DOES NOT GENERATE INTERRUPT,<br>VALUE 1: GENERATE INTERRUPT |
| BASE ADDRESS | INDICATE BASE ADDRESS OF MESSAGE STORING AREA<br>INDICATE EFFECTIVE MESSAGE STORING ADDRESS USING BOTH READ POINTER AND WRITE POINTER<br>EFFECTIVE BIT LENGTH DIFFER DEPENDING ON SIZE OF MESSAGE STORING AREA<br>MESSAGE STORING AREA IS INDICATED BY Q SIZE<br>MESSAGE STORING AREA START FROM ADDRESS BOUNDARY THAT MATCHES AREA SIZE |
| MEMORY KEY | MEMORY KEY VALUE FOR PROTECTION |
| WRITE POINTER | VALUE OF WRITE POINTER<br>EFFECTIVE BIT LENGTH DIFFER DEPENDING ON SIZE OF MESSAGE STORING AREA |
| READ POINTER | VALUE OF READ POINTER<br>EFFECTIVE BIT LENGTH DIFFER DEPENDING ON SIZE OF MESSAGE STORING AREA |
| CHECK BIT | REDUNDANT BIT (ECC) |

FIG.18

| REGISTER NAME | ADDRESS | COMMAND | DATA SIZE |
|---|---|---|---|
| Q SIZE | 0x00 TO 0x07 | R/W | 3 BITS |
| M SIZE | 0x08 TO 0x0F | R/W | 1 BIT |
| INTMASK REGISTER | 0x10 TO 0x17 | R/W | 1 BIT |
| BADRS REGISTER | 0x18 TO 0x1F | R/W | 41 BITS |
| MKEY REGISTER | 0x20 TO 0x27 | R/W | 12 BITS |
| WDP REGISTER | 0x28 TO 0x2F | R/W | 8 BITS |
| RDP REGISTER | 0x30 TO 0x37 | R/W | 8 BITS |
| UPDATE REGISTER | 0x38 TO 0x3F | W | - |

FIG.19

| Q SIZE CODE VALUE | M SIZE | MEMORY WRITE ADDRESS [47:0] |
|---|---|---|
| 000 | - | - |
| 001 | 0 | BADRS [47:7] \|\| WDP [0] \|\| 0b000000 |
| | 1 | BADRS [47:7] \|\| WDP [1:0] \|\| 0b00000 |
| 010 | 0 | BADRS [47:8] \|\| WDP [1:0] \|\| 0b000000 |
| | 1 | BADRS [47:8] \|\| WDP [2:0] \|\| 0b00000 |
| 011 | 0 | BADRS [47:9] \|\| WDP [2:0] \|\| 0b000000 |
| | 1 | BADRS [47:9] \|\| WDP [3:0] \|\| 0b00000 |
| 100 | 0 | BADRS [47:10] \|\| WDP [3:0] \|\| 0b000000 |
| | 1 | BADRS [47:10] \|\| WDP [4:0] \|\| 0b00000 |
| 101 | 0 | BADRS [47:11] \|\| WDP [4:0] \|\| 0b000000 |
| | 1 | BADRS [47:11] \|\| WDP [5:0] \|\| 0b00000 |
| 110 | 0 | BADRS [47:12] \|\| WDP [5:0] \|\| 0b000000 |
| | 1 | BADRS [47:12] \|\| WDP [6:0] \|\| 0b00000 |
| 111 | 0 | BADRS [47:13] \|\| WDP [6:0] \|\| 0b000000 |
| | 1 | BADRS [47:13] \|\| WDP [7:0] \|\| 0b00000 |

FIG.20

| RAM FIELD | Q SIZE | M SIZE | INTMASK | BASE ADDRESS | MEMORY KEY | WRITE POINTER | READ POINTER | CHECK BIT |
|---|---|---|---|---|---|---|---|---|
| INITIALIZE ENTRY (REGISTER R/W INTERFACE INSTRUCTION FROM CORE) | SPECIFIED VALUE | SPECIFIED VALUE | 0 | SPECIFIED VALUE | SPECIFIED VALUE | ALL 0 | ALL 0 | CREATED VALUE |
| CHANGE INTERRUPT MASK (REGISTER R/W INTERFACE INSTRUCTION FROM CORE) | UN-CHANGED | UN-CHANGED | SPECIFIED VALUE | UN-CHANGED | UN-CHANGED | UN-CHANGED | UN-CHANGED | CREATED VALUE |
| WRITING OPERATION OF MESSAGE (PERFORMED WHEN MESSAGE COMMAND IS RECEIVED) | UN-CHANGED | UN-CHANGED | UN-CHANGED | UN-CHANGED | UN-CHANGED | UPDATED VALUE | UN-CHANGED | CREATED VALUE |
| READING OPERATION OF MESSAGE (REGISTER R/W INTERFACE INSTRUCTION FROM CORE) | UN-CHANGED | UN-CHANGED | UN-CHANGED | UN-CHANGED | UN-CHANGED | UN-CHANGED | UPDATED VALUE | CREATED VALUE |

FIG.21

| Q SIZE CODE VALUE | M SIZE | MESSAGE STORING AREA SIZE | MESSAGE SIZE | NUMBER OF MESSAGES STORED | EFFECTIVE BIT LENGTH OF BASE ADDRESS | EFFECTIVE BIT LENGTH OF WRITE POINTER/READ POINTER |
|---|---|---|---|---|---|---|
| 000 | - | -(INVALID) | - | - | - | - |
| 001 | 1 | 128 BYTES | 64 BYTES | 1 | BASE ADDRESS [47:7] | WRITE POINTER [0]/READ POINTER [0] |
| 001 | 0 | 128 BYTES | 32 BYTES | 3 | BASE ADDRESS [47:7] | WRITE POINTER [1:0]/READ POINTER [1:0] |
| 010 | 1 | 256 BYTES | 64 BYTES | 3 | BASE ADDRESS [47:8] | WRITE POINTER [1:0]/READ POINTER [1:0] |
| 010 | 0 | 256 BYTES | 32 BYTES | 7 | BASE ADDRESS [47:8] | WRITE POINTER [2:0]/READ POINTER [2:0] |
| 011 | 1 | 512 BYTES | 64 BYTES | 7 | BASE ADDRESS [47:9] | WRITE POINTER [2:0]/READ POINTER [2:0] |
| 011 | 0 | 512 BYTES | 32 BYTES | 15 | BASE ADDRESS [47:9] | WRITE POINTER [3:0]/READ POINTER [3:0] |
| 100 | 1 | 1 KILOBYTE | 64 BYTES | 15 | BASE ADDRESS [47:10] | WRITE POINTER [3:0]/READ POINTER [3:0] |
| 100 | 0 | 1 KILOBYTE | 32 BYTES | 31 | BASE ADDRESS [47:10] | WRITE POINTER [4:0]/READ POINTER [4:0] |
| 101 | 1 | 2 KILOBYTES | 64 BYTES | 31 | BASE ADDRESS [47:11] | WRITE POINTER [4:0]/READ POINTER [4:0] |
| 101 | 0 | 2 KILOBYTES | 32 BYTES | 63 | BASE ADDRESS [47:11] | WRITE POINTER [5:0]/READ POINTER [5:0] |
| 110 | 1 | 4 KILOBYTES | 64 BYTES | 63 | BASE ADDRESS [47:12] | WRITE POINTER [5:0]/READ POINTER [5:0] |
| 110 | 0 | 4 KILOBYTES | 32 BYTES | 127 | BASE ADDRESS [47:12] | WRITE POINTER [6:0]/READ POINTER [6:0] |
| 111 | 1 | 8 KILOBYTES | 64 BYTES | 127 | BASE ADDRESS [47:13] | WRITE POINTER [6:0]/READ POINTER [6:0] |
| 111 | 0 | 8 KILOBYTES | 32 BYTES | 255 | BASE ADDRESS [47:13] | WRITE POINTER [7:0]/READ POINTER [7:0] |

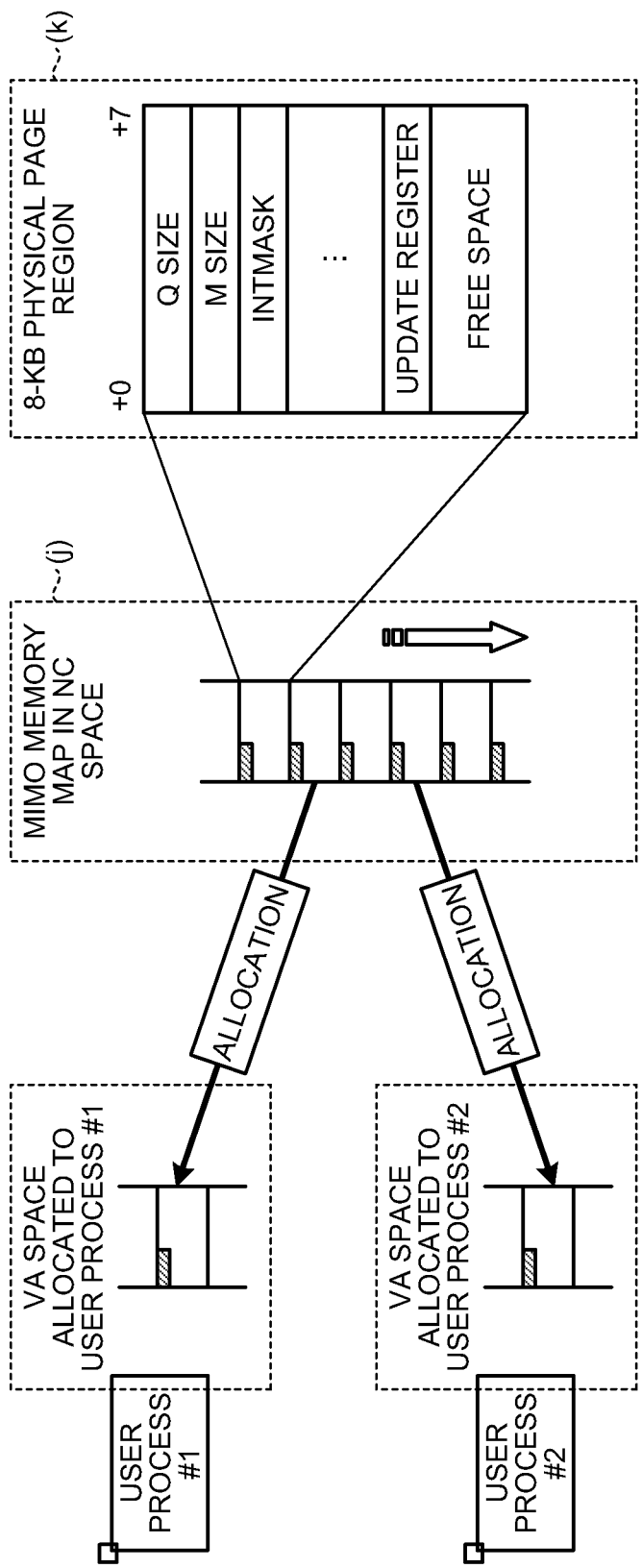

FIG.23

| ADDRESS BITS | 47:24 | 23:13 | 12:0 |
|---|---|---|---|
| CONTENTS | NC SPACE UNIQUE ADDRESS | REGISTER ID | UNIQUE ADDRESS IN 8 KBs IN REGISTER |
| BIT LENGTH | 24 BITS | 11 BITS | 13 BITS |

FIG.34

| RAM FIELD | DATA [82:80] | DATA [79] | DATA [78] | DATA [77] | DATA [76:36] | DATA [34:24] | DATA [23:16] | DATA [15:8] | DATA [7:0] |
|---|---|---|---|---|---|---|---|---|---|
| STORED DATA | Q SIZE | M SIZE | INTMASK | OVERFLOW | BASE ADDRESS | MEMORY KEY | WRITE POINTER | READ POINTER | CHECK BIT |

FIG.35

| RAM FIELD | DATA CONTENTS |
|---|---|
| Q SIZE | INDICATE SIZE OF MESSAGE STORING AREA<br>VALUE 000: ENTRY IS INVALID, VALUE 001: 128 BYTES,<br>VALUE 010: 256 BYTES, VALUE 011: 512 BYTES,<br>VALUE 100: 1 KILOBYTE, VALUE 101: 2 KILOBYTES,<br>VALUE 110: 4 KILOBYTES, VALUE 111: 8 KILOBYTES |
| M SIZE | MESSAGE SIZE<br>VALUE 0: 32 BYTES, VALUE 1: 64 BYTES |
| INTMASK | INSTRUCT TO GENERATE INTERRUPT WHEN MESSAGE IS RECEIVED<br>VALUE 0: DOES NOT GENERATE INTERRUPT,<br>VALUE 1: GENERATE INTERRUPT |
| OVERFLOW | INDICATE THAT OVERFLOW OF QUEUE HAS OCCURRED WHEN MESSAGE IS RECEIVED |
| BASE ADDRESS | INDICATE BASE ADDRESS OF MESSAGE STORING AREA<br>INDICATE EFFECTIVE MESSAGE STORING ADDRESS USING BOTH READ POINTER AND WRITE POINTER<br>EFFECTIVE BIT LENGTH DIFFER DEPENDING ON SIZE OF MESSAGE STORING AREA<br>MESSAGE STORING AREA IS INDICATED BY Q SIZE<br>MESSAGE STORING AREA START FROM ADDRESS BOUNDARY THAT MATCHES AREA SIZE |
| MEMORY KEY | MEMORY KEY VALUE FOR PROTECTION |
| WRITE POINTER | VALUE OF WRITE POINTER<br>EFFECTIVE BIT LENGTH DIFFER DEPENDING ON SIZE OF MESSAGE STORING AREA |
| READ POINTER | VALUE OF READ POINTER<br>EFFECTIVE BIT LENGTH DIFFER DEPENDING ON SIZE OF MESSAGE STORING AREA |
| CHECK BIT | REDUNDANT BIT (ECC) |

FIG.36

| REGISTER NAME | ADDRESS | COMMAND | DATA SIZE |
|---|---|---|---|
| Q SIZE | 0x00 TO 0x07 | R/W | 3 BITS |
| M SIZE | 0x08 TO 0x0F | R/W | 1 BIT |
| INTMASK REGISTER | 0x10 TO 0x17 | R/W | 1 BIT |
| BADRS REGISTER | 0x18 TO 0x1F | R/W | 41 BITS |
| MKEY REGISTER | 0x20 TO 0x27 | R/W | 12 BITS |
| WDP REGISTER | 0x28 TO 0x2F | R/W | 8 BITS |
| RDP REGISTER | 0x30 TO 0x37 | R/W | 8 BITS |
| UPDATE REGISTER | 0x38 TO 0x3F | W | - |
| OVERFLOW | 0x40 TO 0x47 | R/W | 1 BIT |

FIG.37

| RAM FIELD | Q SIZE | M SIZE | INTMASK | OVER-FLOW | BASE ADDRESS | MEMORY KEY | WRITE POINTER | READ POINTER | CHECK BIT |
|---|---|---|---|---|---|---|---|---|---|
| INITIALIZE ENTRY (REGISTER R/W INTERFACE INSTRUCTION FROM CORE) | SPECIFIED VALUE | SPECIFIED VALUE | 0 | 0 | SPECIFIED VALUE | SPECIFIED VALUE | ALL 0 | ALL 0 | CREATED VALUE |
| CHANGE INTERRUPT MASK (REGISTER R/W INTERFACE INSTRUCTION FROM CORE) | UN-CHANGED | UN-CHANGED | SPECIFIED VALUE | UN-CHANGED | UN-CHANGED | UN-CHANGED | UN-CHANGED | UN-CHANGED | CREATED VALUE |
| WRITING OPERATION OF MESSAGE (PERFORMED WHEN MESSAGE COMMAND IS RECEIVED) | UN-CHANGED | UN-CHANGED | UN-CHANGED | UPDATED VALUE | UN-CHANGED | UN-CHANGED | UPDATED VALUE | UN-CHANGED | CREATED VALUE |
| READING OPERATION OF MESSAGE (REGISTER R/W INTERFACE INSTRUCTION FROM CORE) | UN-CHANGED | UN-CHANGED | UN-CHANGED | UN-CHANGED | UN-CHANGED | UN-CHANGED | UN-CHANGED | UPDATED VALUE | CREATED VALUE |

INFORMATION PROCESSING APPARATUS, ARITHMETIC DEVICE, AND INFORMATION TRANSFERRING METHOD

CROSS-REFERENCE TO RELATED APPLICATION

This application is based upon and claims the benefit of priority of the prior Japanese Patent Application No. 2012-083281, filed on Mar. 30, 2012, the entire contents of which are incorporated herein by reference.

FIELD

The embodiments discussed herein are directed to an information processing apparatus, an arithmetic unit, and an information transferring method.

BACKGROUND

There is a known conventionally technology called inter process communication (IPC) used to transmit and receive data used by multiple pieces of software when each piece of the software performs a process in liaison with the multiple pieces of software. A technology for performing the inter process communication using a queue is known as an example technology of inter process communication.

In the following, an example of a technology for performing inter process communication using a queue will be described with reference to FIGS. 40 to 43. FIG. 40 is a schematic diagram illustrating the concept of inter process communication performed by conventional software. For example, in the example illustrated in FIG. 40, each of user processes A to C stores data, which is to be transmitted to a user process D, in a queue in a First In First Out (FIFO) system that is implemented by software. Furthermore, the user process D obtains the data stored in the queue in the FIFO system in the order it arrives.

In the following, a process performed when the user processes A to C transmit messages A to C, respectively, to the user process D by using a queue will be described with reference to FIG. 41. FIG. 41 is a schematic diagram illustrating a process performed as inter process communication using the conventional software. In the example illustrated in FIG. 41, a memory stores therein a base address of a storage area that is used as a queue, a read pointer that indicates a read address of the data, and a write pointer that indicates a write address of the data. In the example described below, it is assumed that each of the initial values of the read pointer and the write pointer is "0x0120".

For example, the user process A refers to the write pointer and stores a 32-byte message A from the address "0x0120" indicated by the write pointer. Then, the user process A adds "0x0020" to "0x0120", which is the value of the write pointer, and updates it to "0x0140". When the user process A updates the write pointer, the user process A issues an atomic instruction, such as a compare-and-swap (CAS) instruction or a fetch-and-add (FAD) instruction, or performs an exclusive access control in which, for example, an exclusive lock of the write pointer is obtained.

Subsequently, similarly to the user process A, the user process B refers to the write pointer; stores the 32-byte message B from the address "0x0140" indicated by the write pointer; and updates the value of the write pointer from "0x0140" to "0x0160". Furthermore, similarly, the user process C stores the message C in the address "0x0160" indicated by the write pointer and updates the value of the write pointer from "0x0160" to "0x0180".

In contrast, the user process D determines, asynchronously to the user processes A to C, whether a value of the read pointer matches a value of the write pointer. If both of the values do not match, the user process D determines that a new message is stored in the queue. If the user process D determines that a new message is stored in the queue, the user process D reads the message from the address indicated by the read pointer.

For example, because the value of the read pointer is "0x0120" and the value of the write pointer is "0x0160", the user process D reads the message A from "0x0120" and updates the value of the read pointer from "0x0120" to "0x0140". By repeating this process until the values of the read pointer and the write pointer match, the user process D reads each of the messages A to C stored in the queue.

Furthermore, a technology for a multi node system in which multiple CPUs perform different processes is known. An information processing system is known as an example of such a multi node system, which includes multiple central processing units (CPUs) that cache data with each CPU simultaneously performing different processes. Furthermore, a technology for a shared memory system is also known in which each CPU executes an independent OS and a part of memory area is shared between the CPUs. With this configuration, performance can be improved, and furthermore, because each OS individually operates in each node, an error can be prevented; therefore, it is possible to improve availability of the system.

FIG. 42 is a schematic diagram illustrating the concept of a multi node system using a shared memory. As illustrated in FIG. 42, the information processing system includes multiple nodes #0 to #3 that include CPUs #0 to #3, respectively. Each of the nodes #0 to #3 includes a local memory, hypervisor (HPV) software, an operating system (OS), and a device driver and simultaneously performs different user processes A to D, respectively. The HPV software is software that manages a virtual machine operated by each of the nodes #0 to #3. The information processing system described above implements a queue by storing the write pointer and the read pointer in a shared memory that is shared by each of the nodes #0 to #3 and performs the inter process communication between the user processes A to D.

In the following, an example of a process performed by each of the CPUs #0 to #3 when the user processes A to C transmit messages A to C, respectively, to the user process D will be described with reference to FIG. 43. FIG. 43 is a schematic diagram illustrating a process in which a write pointer is cached by each node. For example, the CPU #0 that executes the user process A caches the write pointer in a shared memory and stores therein the message A from the address "0x0120" indicated by the write pointer (in (1) of FIG. 43). Furthermore, the CPU #0 updates the value of the cached write pointer to "0x0140" (in (2) of FIG. 43) and stores information indicating that the cache line of the write pointer is in an updated state (i.e., modify).

Subsequently, because the cache line of the write pointer is in the updated state, a CPU #1 that executes the user process B caches, from the CPU #0, the write pointer that is updated by the CPU #0 (in (3) of FIG. 43). Then, if the CPU #1 stores the message B from the address "0x0140" indicated by the cached write pointer, the CPU #1 updates the value of the write pointer to "0x0160" (in (4) of FIG. 43). Similarly, a CPU #2 that executes the user process C caches, from the CPU #1, the write pointer that is updated by the CPU #1 (in (5) of FIG. 43) and stores the message C from the address "0x0160" indicated by the cached write pointer. Then, the CPU #2 updates the value of the write pointer to "0x0180" (in (6) of FIG. 43).

At this point, a CPU #3 that executes the user process D caches the read pointer from the shared memory (in (7) of FIG. 43). Furthermore, because the cache line of the write pointer is in the updated state, the CPU #3 caches, from the CPU #2, the write pointer that is updated by the CPU #2 (in (8) FIG. 43). Because the value of the read pointer "0x0120" does not match the value of the write pointer "0x0160", the CPU #3 reads the message from the address indicated by the read pointer and updates the value of the read pointer. Thereafter, the CPU #3 reads a message and updates the read pointer until the values of the read pointer and the write pointer match and then obtains the messages A to C transmitted by the user processes A to C, respectively.

Patent Document 1: Japanese Patent No. 2703417
Patent Document 2: Japanese Laid-open Patent Publication No. 2003-216592
Patent Document 3: Japanese Laid-open Patent Publication No. 07-200506

However, in the technology for storing a read pointer and a write pointer in a shared memory, a node at the data transmission side caches the write pointer and updates the value of the cached write pointer. Accordingly, if a failure occurs in the node that caches the write pointer, because another node does not obtain the latest value of the write pointer, data transmission is not performed. Accordingly, there is a problem in that a failure is propagated to the other nodes.

In the following, a description will be given of a problem, with reference to FIG. 44, in which a failure is propagated to another node when the failure has occurred in a node in which a write pointer is being cached. FIG. 44 is a schematic diagram illustrating the flow in which a failure is propagated to another node when the failure has occurred in a node.

For example, the CPU #0 caches the write pointer in the shared memory, stores the message A, and updates the value of the cached write pointer to "0x0140". Subsequently, if the CPU #1 caches, from the CPU #0, the write pointer that is updated by the CPU #0, the CPU #1 stores the message B from the address "0x0140" indicated by the cached write pointer and updates the value of the write pointer to "0x0160".

In this state, it is assumed that an error has occurred in the node #1 and assumed that the CPU #1 stops abnormally. In order to transmit a message, the CPU #2 attempts to cache the write pointer that has been updated by the CPU #1; however, because the CPU #1 has stopped, the CPU #2 does not cache the write pointer as illustrated in (A) of FIG. 44. Accordingly, the CPU #2 stops abnormally without continuing the process.

Furthermore, the CPU #3 attempts to cache the write pointer in order to determine whether a new message is transmitted. However, because the CPU #1 has stopped, the CPU #3 does not cache the write pointer from the CPU #1 and thus stops abnormally, as illustrated in (B) of FIG. 44. Furthermore, if the CPU #3 stops abnormally, because the process specified by the message A is not performed, the CPU #0 may possibly stop abnormally due to, for example, a time-out.

SUMMARY

According to an aspect of an embodiment, an information processing apparatus including a plurality of nodes. The each of the nodes comprises a processor and a storage device. The each of the nodes comprises a storing unit that stores therein multiple pointer sets in each of which a write pointer indicating an address used when data received from another node is stored in the storage device is associated with a read pointer indicating an address used when the data is read from the storage device. The each of the nodes comprises a notifying unit that notifies a node corresponding to a transmission source of the data of a pointer identifier that indicates a pointer set. The each of the nodes comprises a retaining unit that retains, when both the data and the pointer identifier notified by the notifying unit are received from the node corresponding to the transmission source of the data, the received data in the storage device in accordance with an address indicated by a write pointer in a pointer set indicated by the pointer identifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a schematic diagram illustrating the functional configuration of a transmission control unit according to the first embodiment;

FIG. 10 is a schematic diagram illustrating an example of an address provided to each register;

FIG. 11 is a schematic diagram illustrating an example of the format of a MSGQ-ID;

FIG. 12 is a schematic diagram illustrating information stored in each field in the MSGQ-ID;

FIG. 13 is a schematic diagram illustrating an example of a packet format;

FIG. 14 is a schematic diagram illustrating an example of a reply packet format;

FIG. 16 is a schematic diagram illustrating an example of a field in a RAM;

FIG. 17 is a schematic diagram illustrating the contents of data stored in the field in the RAM;

FIG. 18 is a schematic diagram illustrating an example of addresses of registers in a reception control unit viewed from the software side;

FIG. 19 is a schematic diagram illustrating an example of memory write addresses;

FIG. 20 is a schematic diagram illustrating updates, classified under operation types, of the field in the RAM;

FIG. 21 is a schematic diagram illustrating a message storing area;

FIG. 22 is a schematic diagram illustrating an address map that takes into consideration a program error;

FIG. 23 is a schematic diagram illustrating the configuration of addresses in the address map that takes into consideration the program error;

FIG. 34 is a schematic diagram illustrating the definition of a field in a RAM according to the second embodiment;

FIG. 35 is a schematic diagram illustrating the content of data stored in the field in the RAM according to the second embodiment;

FIG. 36 is a schematic diagram illustrating an example of addresses in a reception control unit according to the second embodiment viewed from the software side;

FIG. 37 is a schematic diagram illustrating a process for updating a field in the RAM according to the second embodiment;

DESCRIPTION OF EMBODIMENTS

Preferred embodiments of the present invention will be explained with reference to accompanying drawings.

[a] First Embodiment

Figure 1:
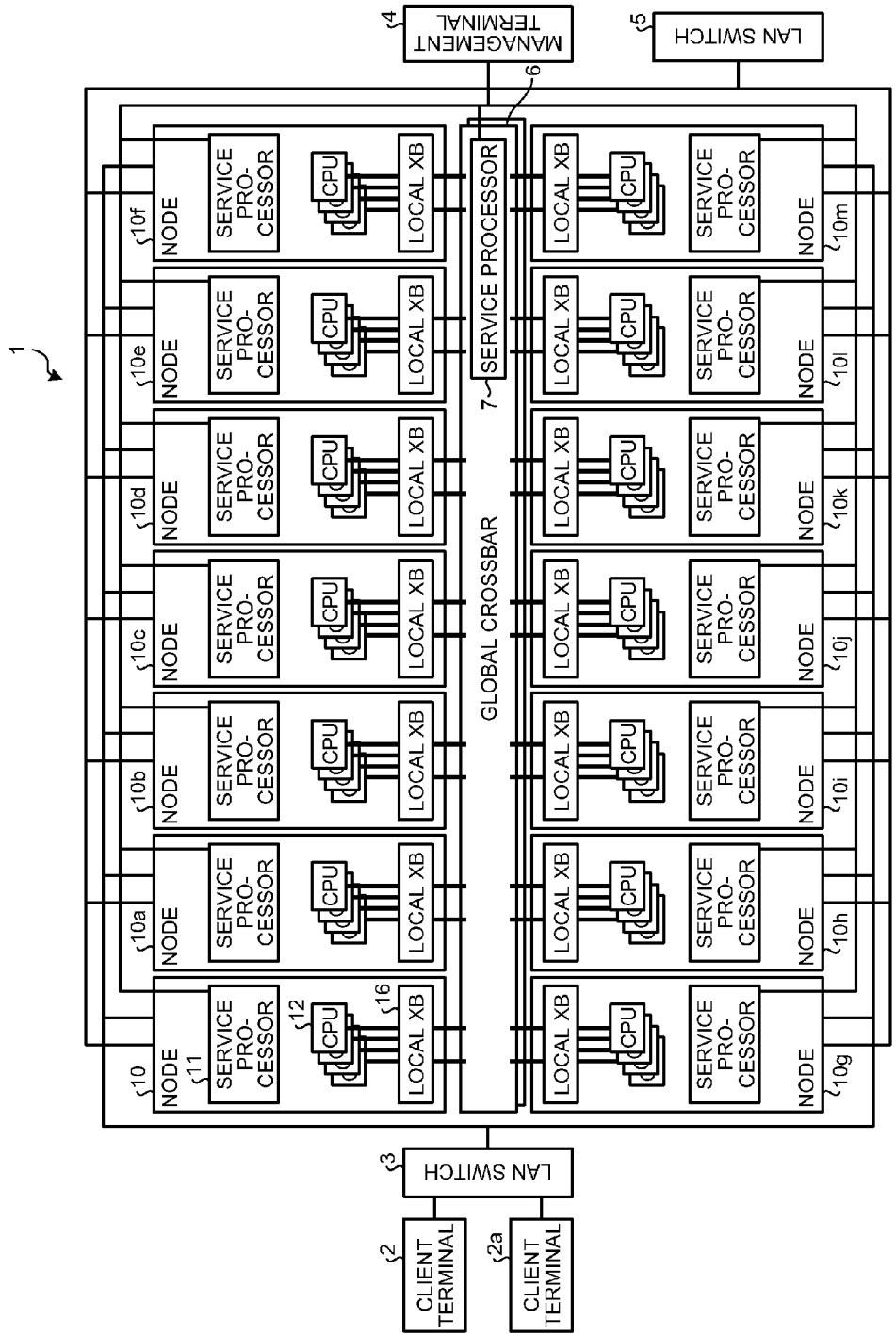
FIG. 1 is a schematic diagram illustrating an information processing system according to a first embodiment.

In a first embodiment, an example of an information processing system will be described below with reference to FIG. 1. FIG. 1 is a schematic diagram illustrating an information processing system according to the first embodiment. In the example illustrated in FIG. 1, an information processing system 1 includes a client terminal 2, a client terminal 2a, a local area network (LAN) switch 3, a management terminal 4, a LAN switch 5, a double global crossbar 6, and multiple nodes 10 to 10m. The global crossbar 6 includes a service processor 7.

In the first embodiment, a node is a unit in which a single and independent operating system (OS) runs and includes the bare minimum of needed device for running the OS. As will be described later, the node includes one or more CPUs, memories, and hard disk drives (HDDs) or external storage instead of the HDDs. The node may also be a single physical device or may also be physically constituted from multiple devices that are connected by using, for example, a cable.

The nodes 10 to 10m are connected, via a service LAN, to the LAN switch 3 and the client terminals 2 and 2a, respectively. Furthermore, the nodes 10 to 10m are connected to the LAN switch 5 via an internal LAN. Furthermore, the nodes 10 to 10m are connected to the management terminal 4 via a management LAN. Furthermore, the nodes 10 to 10m are connected to the double global crossbar 6 and are connected with each other via an interconnection.

Each of the client terminals 2 and 2a obtains a service from each of the nodes 10 to 10m via the service LAN. Although not illustrated in FIG. 1, the information processing system 1 may also include an arbitrary number of additional client terminals.

The node 10 includes a service processor 11, a CPU 12, and a local XB (crossbar) 16. Similarly to the node 10, other nodes 10a to 10m each also include a service processor, a CPU, and a local XB. In the following description, the nodes 10a to 10m have the same function as that performed by the node 10; therefore, a description thereof will be omitted.

The service processor 11 is connected to the management terminal 4 via the management LAN executes management control, such as the management of a power supply in each node 10. The service processor 7 included in the global crossbar 6 operates as the master of the service processor 11 and performs overall management control. Examples of the management control performed by each of the service processors 7 and 11 include power supply management, resets, changes in operation modes, the setting of addition or deletion of nodes, collecting f an error logs, and operation control of degeneracy.

Furthermore, the nodes 10 to 10m independently execute the operating system (OS). Although not illustrated in FIG. 1, the node 10 includes multiple CPUs other than the CPU 12. Each CPU is connected to the global crossbar 6 via the local XB 16.

The CPU 12 in the node 10 outputs a memory access request, which is a request for memory access, to the local XB 16, thereby the CPU 12 transfers the memory access request to another node. Then, when the CPU 12 in the node 10 obtains a memory access request, the CPU 12 performs the memory access in a similar manner as that performed when the CPU 12 accesses a memory connected to the CPU 12.

Specifically, the Non-Uniform Memory Access (NUMA) technology is used in the information processing system 1; therefore, each of the nodes 10 to 10m perform a process by sharing the corresponding memories.

Figure 2:
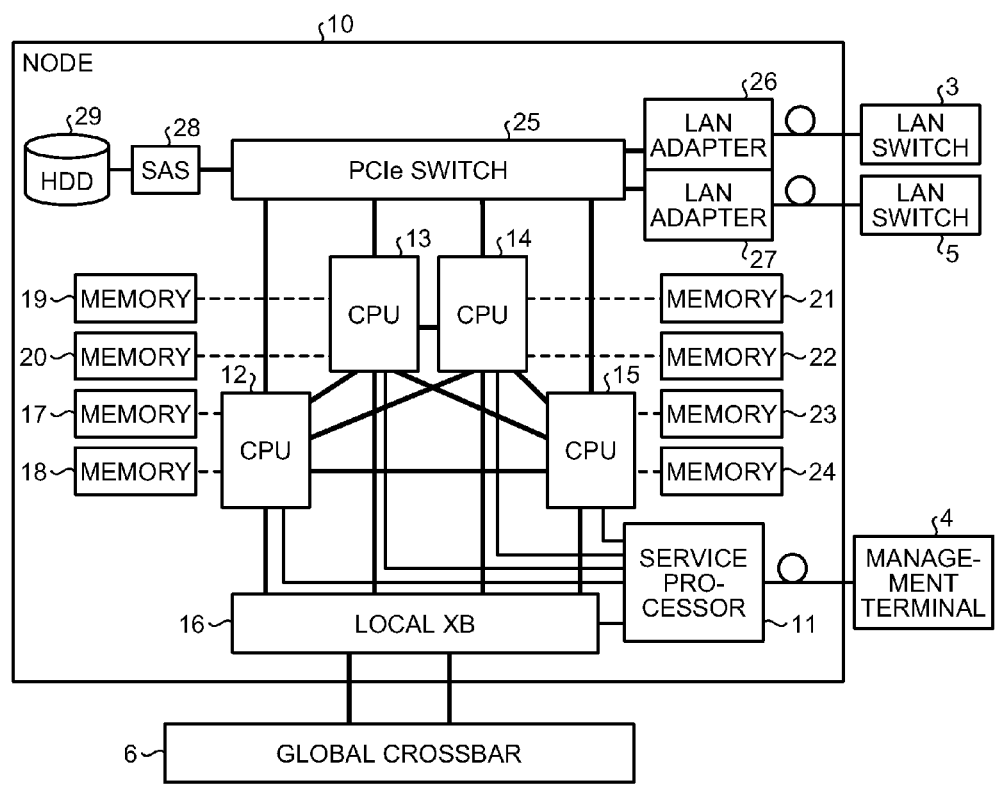
FIG. 2 is a schematic diagram illustrating the functional configuration of a node according to the first embodiment.

In the following, the functional configuration of the node 10 will be described with reference to FIG. 2. FIG. 2 is a schematic diagram illustrating the functional configuration of a node according to the first embodiment. In the example illustrated in FIG. 2, the node 10 includes the service processor 11, multiple CPUs 12 to 15, the local XB 16, multiple memories 17 to 24, and a Peripheral Component Interconnect Express (PCIe) switch 25. Furthermore, the node 10 includes a LAN adapter 26 used to be connected to the service LAN, a LAN adapter 27 used to be connected to the management LAN, a Serial Attached SCSI (SAS) 28, and a hard disk drive (HDD) 29.

The memory 17 and the memory 18 are connected to the CPU 12 and are storage devices that receive a memory access performed by the CPU 12. The memory 19 and the memory 20 are connected to the CPU 13 and are storage devices that receive memory access performed by the CPU 13. The memory 21 and the memory 22 are connected to the CPU 14 and are storage devices that receive memory access performed by the CPU 14.

The memory 23 and the memory 24 are connected to the CPU 15 and are storage devices that receive memory access performed by the CPU 15. In the example illustrated in FIG. 2, the node 10 includes the HDD 29; however, the embodiment is not limited thereto. For example, the HDD 29 may also be arranged outside the node 10 by using a technology, such as the Storage Area Network (SAN) technology.

The service processor 11 performs the management control of the node 10. Specifically, the service processor 11 includes a processor and a Field-Programmable Gate Array (FPGA) that performs a process and receives, from the management terminal 4 via the management LAN, an instruction to perform the management control. Then, the service processor 11 performs various management controls in accordance with the instruction received from the management terminal 4.

The PCIe switch 25 is a switch that controls an access to, for example, an I/O device connected to each of the CPUs 12 to 15 via PCIe slots. The LAN adapter 26 is a LAN adapter that connects the service LAN to the node 10. The LAN adapter 27 is a LAN adapter that connects the management LAN to the node 10. The SAS 28 is an adapter for the LAN or the SAS mounted to the PCIe slot and relays the connection between the HDD 29 and each of the CPUs 12 to 15.

In the following, the CPUs 12 to 15 will be described. The CPUs 12 to 15 are connected with each other and can transmit and receive a memory access request and a reply each other. The CPU 12 will be described below. The CPU 12 is connected to the CPUs 13 to 15 with each other. The CPUs 13 to 15 have the same function as that performed by the CPU 12; therefore, a description will be omitted.

The CPU 12 has a function of memory interface that performs a memory access to both the memory 19 and the memory 20; caches data stored in the memory 19 or the memory 20; and performs arithmetic processing by using the cached data. Furthermore, the CPU 12 has a PCIe interface function that controls an access by using the HDD 29, the internal LAN, or the management LAN via the PCIe switch 25.

Furthermore, the CPU 12 is connected, by an interconnection, to the CPUs included in the other nodes 10a to 10m via the local XB 16 and the global crossbar 6 and has a function of an interconnect router that transmits and receives a memory access request with each other. The CPU 12 having such configuration performs the following process when, for example, a memory access request is issued to the memory 19 or the memory 20 by a process to be executed. Specifically, the CPU 12 accesses the memory 19 or the memory 20 and caches data to be accessed.

Furthermore, when a memory access request is issued to a memory other than the memory 19 and the memory 20 by a process to be performed, the CPU 12 identifies a CPU connected to a memory that is the target for the memory access and transmits the memory access request to the identified CPU. Specifically, the CPU 12 has a node map in which a memory address to be accessed is associated with information uniquely indicating a CPU that accesses a storage area indicated by the memory address.

Then, if a process issues a memory access request, the CPU 12 refers to the node map and identifies a CPU that is associated with the memory address that is the target for the memory access. Thereafter, the CPU 12 creates a packet whose destination is the identified CPU, stores the memory access request in the created packet, and outputs the packet to the CPUs 12 to 15 connected with each other or to the local XB 16. If the packet is output to the local XB 16, the local XB 16 transmits, via the global crossbar 6, the packet to a CPU corresponding to the destination of the packet.

If the CPU 12 performs the memory access onto the memory 19 or the memory 20, the CPU 12 performs a process for retaining the coherency of the data cached by the memory 19 or the memory 20. For example, the CPU 12 transmits a snoop to the CPU that has cached the data from the memory 19 or the memory 20 and performs the write back of the cached data.

The local XB 16 is a switch that transfers, to the specified destination, a packet that is exchanged between the CPUs 12 to 15 included in the node 10 and the CPUs included in the other nodes 10a to 10m. For example, the local XB 16 transmits the packet, which is issued by the CPU 12 to be transmitted to a CPU included in the node 10a, to the CPU included in the node 10a via the global crossbar 6.

The memory 17 to the memory 24 are memories that stores therein data used by the OS or an application and are, for example, Dual In-Line Memory Modules (DIMMs). Furthermore, the memories 17 to 24 are mapped onto the same memory address space.

Furthermore, the memories 17 to 24 each have a region that can be accessed by only the CPUs 12 to 15 in the same node, i.e., a local area that is a region dedicated for the node that includes the CPUs 12 to 15. Furthermore, the memories 17 to 24 each have a region that can be accessed by an arbitrary CPU included in the information processing system 1, i.e., a shared memory area that can be used by all of the nodes. Furthermore, the shared memory area for the memories 17 to 24 is divided into multiple segments. Each segment is a protected area in which access control is performed by the memory token or is a non protected area in which access control is not performed by the memory token.

Figure 3:
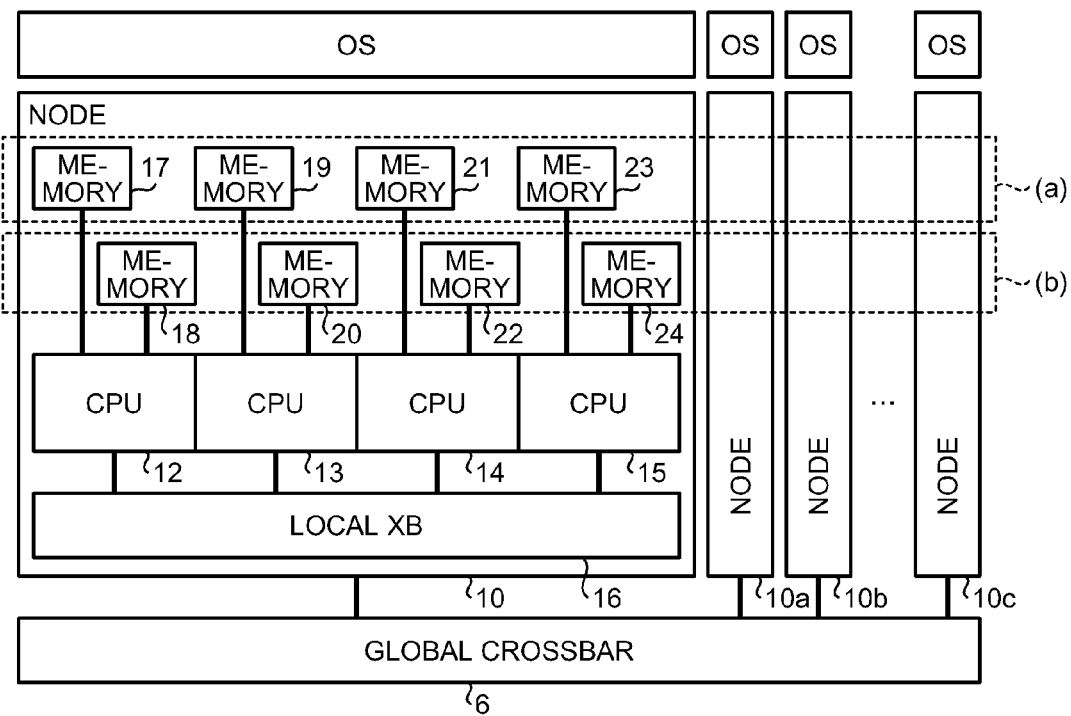
FIG. 3 is a schematic diagram illustrating an allocation of memories according to the first embodiment.

In the following, memory addresses that are mapped by the memories 17 to 24 will be described with reference to FIGS. 3 and 4. FIG. 3 is a schematic diagram illustrating an allocation of memories according to the first embodiment. For example, between the two memories connected to each CPU, the information processing system 1 uses one memory as a memory only for a local area and uses the other memory as a memory only for a shared memory area. Specifically, as illustrated in (a) of FIG. 3, the memory 17, the memory 19, the memory 21, and the memory 23 are used as memories dedicated to the node and, as illustrated in (b) of FIG. 3, the memory 18, the memory 20, the memory 22, and the memory 24 are used as shared memories.

Figure 4:
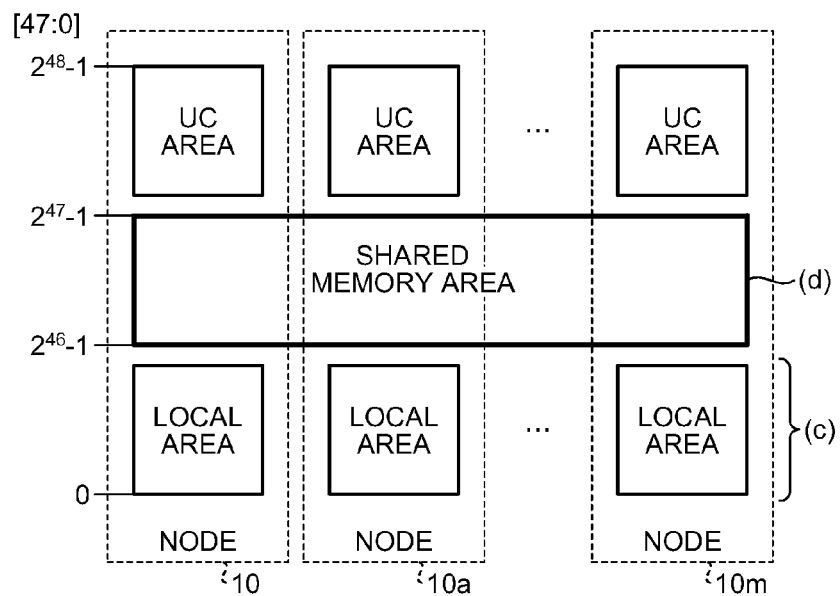
FIG. 4 is a schematic diagram illustrating a memory map in which the information processing system according to the first embodiment maps onto each memory.

FIG. 4 is a schematic diagram illustrating a memory map in which the information processing system according to the first embodiment maps on each memory. FIG. 4 illustrates an example in which a total of the 128-terabyte memory address space is prepared, 64 terabytes out of 128 terabytes are allocated to the local area, and 64 terabytes out of 128 terabytes are allocated to the shared memory area.

For example, the information processing system 1 allocates memory addresses of "0" to "$2^{46}$-1" in the region used as the local area in the memories included in the nodes 10 to 10m. Furthermore, the information processing system 1 allocates memory addresses of "$2^{46}$" to "$2^{47}$-1" in the region used as the shared memory area in the memories included in the nodes 10 to 10m.

Specifically, in the example illustrated in FIGS. 3 and 4, the information processing system 1 maps the memory addresses in the region illustrated in (c) of FIG. 4 onto the memory 17, the memory 19, the memory 21, and the memory 23 illustrated in (a) of FIG. 3. Furthermore, the information processing system 1 maps the memory address in the region illustrate in (d) of FIG. 4 onto the memory 18, the memory 20, the memory 22, and the memory 24 illustrated in (b) of FIG. 3. The addresses of "$2^{47}$" to "$2^{48}$-1" illustrated in FIG. 4 is an address range used as an Uncacheable (UC) area and is an address range for I/O space used by, for example, an I/O device, such as the HDD 29.

As described above, the information processing system 1 maps a single piece of memory address space onto a memory included in each of the nodes 10 to 10m. Accordingly, an arbitrary CPU can directly access the shared memory area in an arbitrary node. The memory map illustrated in FIG. 4 is only for an example; therefore, arbitrary allocation may also be performed.

Specifically, there is no need to allocate all of the memory addresses on the memory map to the memories. For example, a memory hole may also be presented. Furthermore, the memory map may also be set such that the local area used by the OS is present in each node included in the information processing system 1 and the shared memory area is present in one or more nodes.

If the information processing system 1 maps continuous memory addresses onto the memories (for example, the memory 17 and the memory 18) included in a single node, the information processing system 1 can delete the control resources. Furthermore, the information processing system 1 allocates memory addresses such that segment regions are at least aligned.

Figure 5:
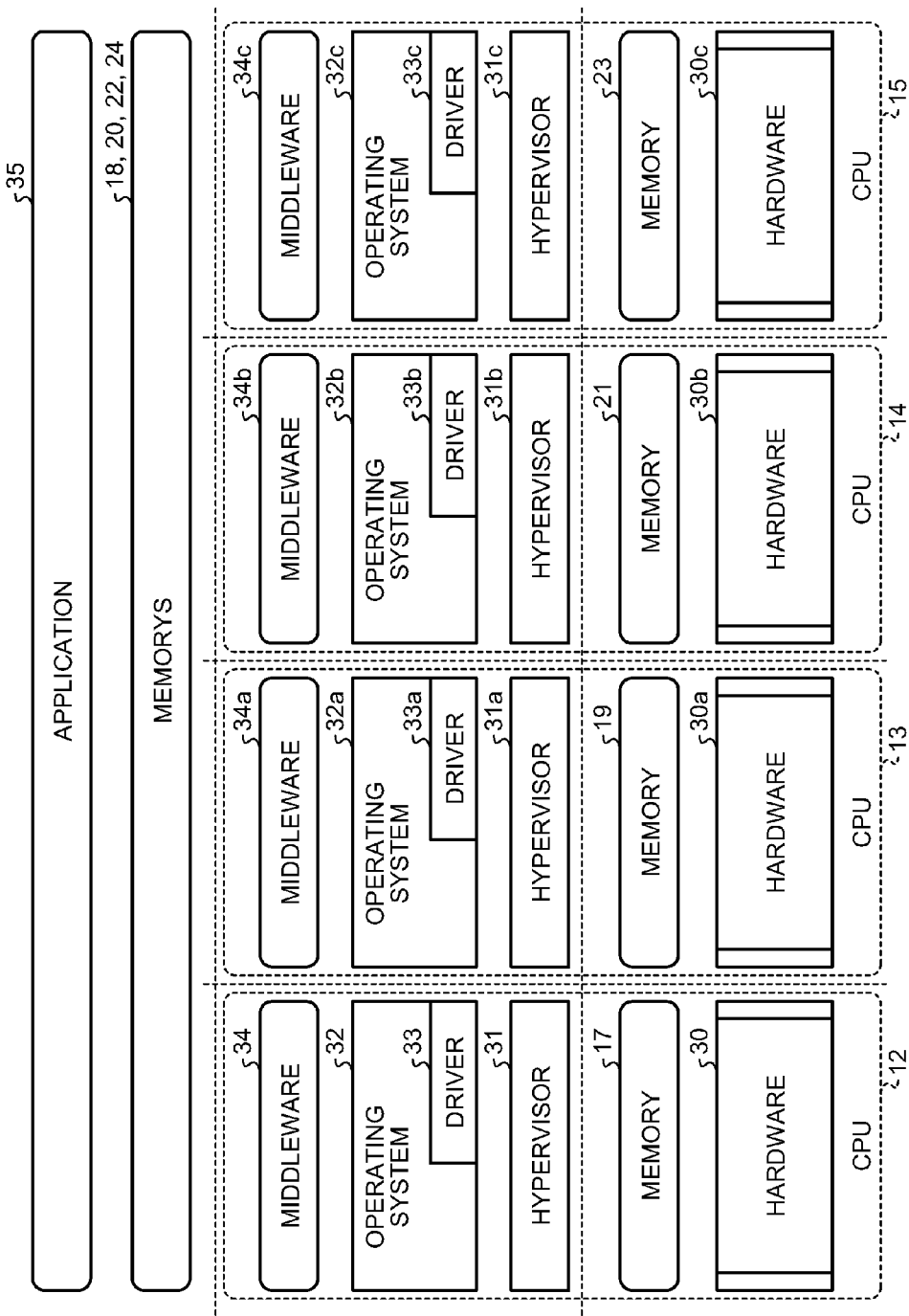
FIG. 5 is a schematic diagram illustrating the relationship between hardware and software in the information processing system according to the first embodiment.

In the following, the relationship between the hardware in each of the CPUs 12 to 15 and the software executed by each of the CPUs 12 to 15 will be described with reference to FIG. 5. FIG. 5 is a schematic diagram illustrating the relationship between hardware and software in the information processing system according to the first embodiment. In the example illustrated in FIG. 5, the hardware included in the CPU 12 is defined as hardware 30 and the hardware included in the CPU 13 is defined as hardware 30a. In the example illustrated in FIG. 5, it is assumed that the hardware included in the CPU 14 is hardware 30b and that the hardware included in the CPU 15 is hardware 30c.

For example, the CPU 12 includes the hardware 30 and accesses the memory 17, which is a local memory dedicated to the CPU 12, and accesses the memories 18, 20, 22, and 24, which form a shared memory. Furthermore, the CPU 12 operates, on the hardware 30, a hypervisor 31, an operating system 32, a driver 33, and middleware 34. Furthermore, the CPU 12, executes, on the middleware 34, an application 35 that is cooperatively operated by each of the CPUs 12 to 15.

Furthermore, similarly to the CPU 12, the other CPUs 13 to 15 includes hardware 30a to 30c, respectively, and operates hypervisors 31a to 31c, operating systems 32a to 32c, drivers 33a to 33c, and middleware 34a to 34c.

In the following, the outline of a process executed by the CPUs 12 to 15 according to the first embodiment will be described with reference to FIG. 6. In the following description, the CPUs 13 to 15 have the same function as that performed by the CPU 12; therefore, a description thereof will be omitted.

Figure 6:
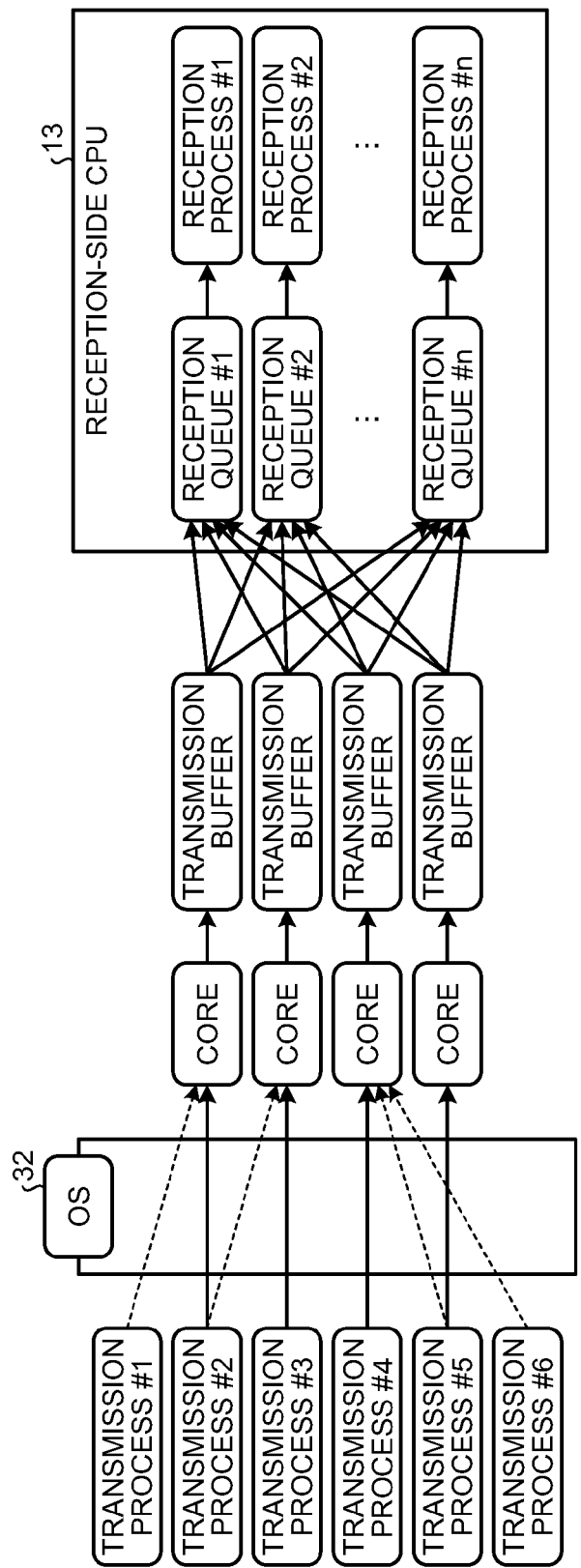
FIG. 6 is a schematic diagram illustrating the concept of a process performed by a CPU according to the first embodiment.

FIG. 6 is a schematic diagram illustrating the concept of a process performed by a CPU according to the first embodiment. FIG. 6 illustrates the outline of a process in which multiple transmission processes #1 to #6 that are executed by the CPU 12 transmit a message to reception processes #1 to #n executed by the CPU 13 arranged on the reception side. For example, the CPU 12 includes multiple cores and multiple transmission buffers that are associated with the cores. The CPU 13 includes reception queues #1 to #n that are associated with the processes to be executed.

For example, each core operates one of the transmission processes from among the multiple transmission processes #1 to #6 operating on the OS 32. For example, in the example illustrated in FIG. 6, each core operates the transmission processes #2 to #5. If a transmission process that is being executed transmits a message to the CPU 13, each core stores the message to be transmitted in a corresponding transmission buffer.

Furthermore, if each transmission buffer stores therein the message of the process executed by each corresponding core, each transmission buffer stores the message in one of the reception queues #1 to #n included in the CPU 13 in accordance with the reception process that receives the message. Then, each of the reception processes #1 to #n obtains the message stored in the corresponding reception queue when the process is executed by the CPU 13.

If a single core can simultaneously execute multiple threads, the CPU 12 has a transmission buffer register for each thread. Then, when a context switch occurs, the CPU 12 saves or restores the data stored in the transmission buffer register, and thereby the CPU 12 operates as if the CPU 12 virtually has the same number of transmission buffers as there are transmission processes.

Figure 7:
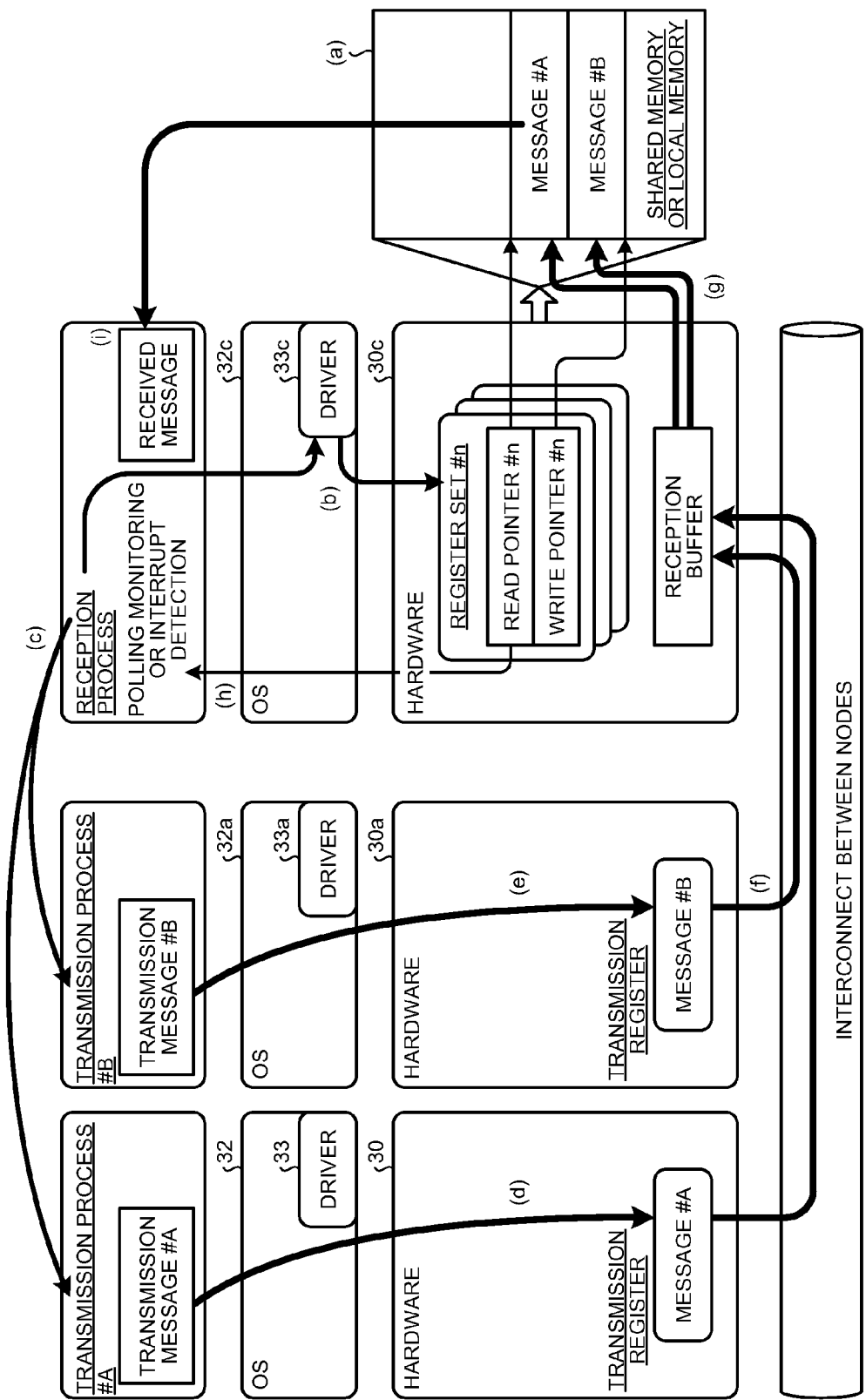
FIG. 7 is a schematic diagram illustrating the flow of an inter process communication process according to the first embodiment.

In the following, the flow of an inter process communication performed by a process that is executed by each CPU in the information processing system 1 will be described with reference to FIG. 7. FIG. 7 is a schematic diagram illustrating the flow of an inter process communication process according to the first embodiment. In the example illustrated in FIG. 7, a description will be given of the flow of a process in which transmission processes #A and #B operating on the hardware 30 and 30a, respectively, transmit messages to a reception process operating on the hardware 30c.

For example, in the example illustrated in FIG. 7, each of the hardware 30 and the hardware 30a includes a transmission register that temporarily stores therein a message to be transmitted. Furthermore, the hardware 30c that receives a message includes multiple register sets, in each of which a read pointer is associated with a write pointer, and a reception buffer that receives the message.

As illustrated in (a) of FIG. 7, the reception process executed by the hardware 30c previously sets a region for storing therein a message in a shared memory or a local memory. Then, as illustrated in (b) of FIG. 7, the reception process calls the driver 33c, obtains the register set resources, and performs initialization. Then, as illustrated in (c) of FIG. 7, the reception process notifies the transmission process #A and the transmission process #B of respective register IDs that uniquely indicate the obtained register sets.

Then, the transmission process #A creates a message #A that contains both the register ID notified by the reception process and a transmission message #A and stores the message #A in a transmission register included in the hardware 30, as illustrated in (d) of FIG. 7. Furthermore, the transmission process #B creates a message #B that contains both the register ID notified by the reception process and a transmission message #B and stores the message #B in the transmission register included in the hardware 30, as illustrated in (e) of FIG. 7.

When the messages #A and #B are stored in the respective transmission registers, the hardware 30 and 30a packetizes the corresponding message. Then, as illustrated in (f) of FIG. 7, the hardware 30 and 30a store the respective messages in the reception buffer included in the hardware 30c via the interconnection between nodes. Then, the hardware 30c identifies the register ID contained in each of the received packets and stores the message in a storage area indicated by a write pointer in the register set indicated by the identified register ID. For example, as illustrated in (g) of FIG. 7, the hardware 30c sequentially stores the message #A and the message #B in the storage area indicated by the write pointer in the corresponding register set.

At this point, as illustrated in (h) of FIG. 7, by using the monitoring using the polling or by using an interrupt process, the reception process detects an incoming call of the message. Then, by using the read pointers in the register sets indicated by the register IDs notified to the transmission process #A and the transmission process #B, respectively, the reception process reads the message #A and the message #B, as illustrated in (i) of FIG. 7.

As described above, in the inter process communication according to the first embodiment, a CPU on the message reception side includes multiple register sets and transmits, to a CPU on the message transmission side, a register identifier that identifies the register sets. Then, the CPU on the message transmission side transmits the message together with the register identifier to the CPU on the message reception side. Thereafter, the CPU on the message reception side stores therein the received message by using the write pointer in the register set indicated by the received register identifier.

Consequently, each of the CPUs 12 to 15 can implement inter process communication using a queue without caching the read pointer or the write pointer. Accordingly, even when a failure occurs in one of the CPUs, each of the CPUs 12 to 15 can read the read pointer or the write pointer; therefore, it is possible to prevent the failure from being propagated.

Furthermore, each of the CPUs 12 to 15 has register sets, the number of which is greater than that of the processes that simultaneously transmit a message to the corresponding CPU. Specifically, each of the CPUs 12 to 15 has register sets, the number of which is the same as that of the processes that simultaneously receive a message. Accordingly, each of the CPUs 12 to 15 can prevent a case in which the inter process communication is not performed due to insufficient register sets when an arbitrary process is being executed.

Figure 8:
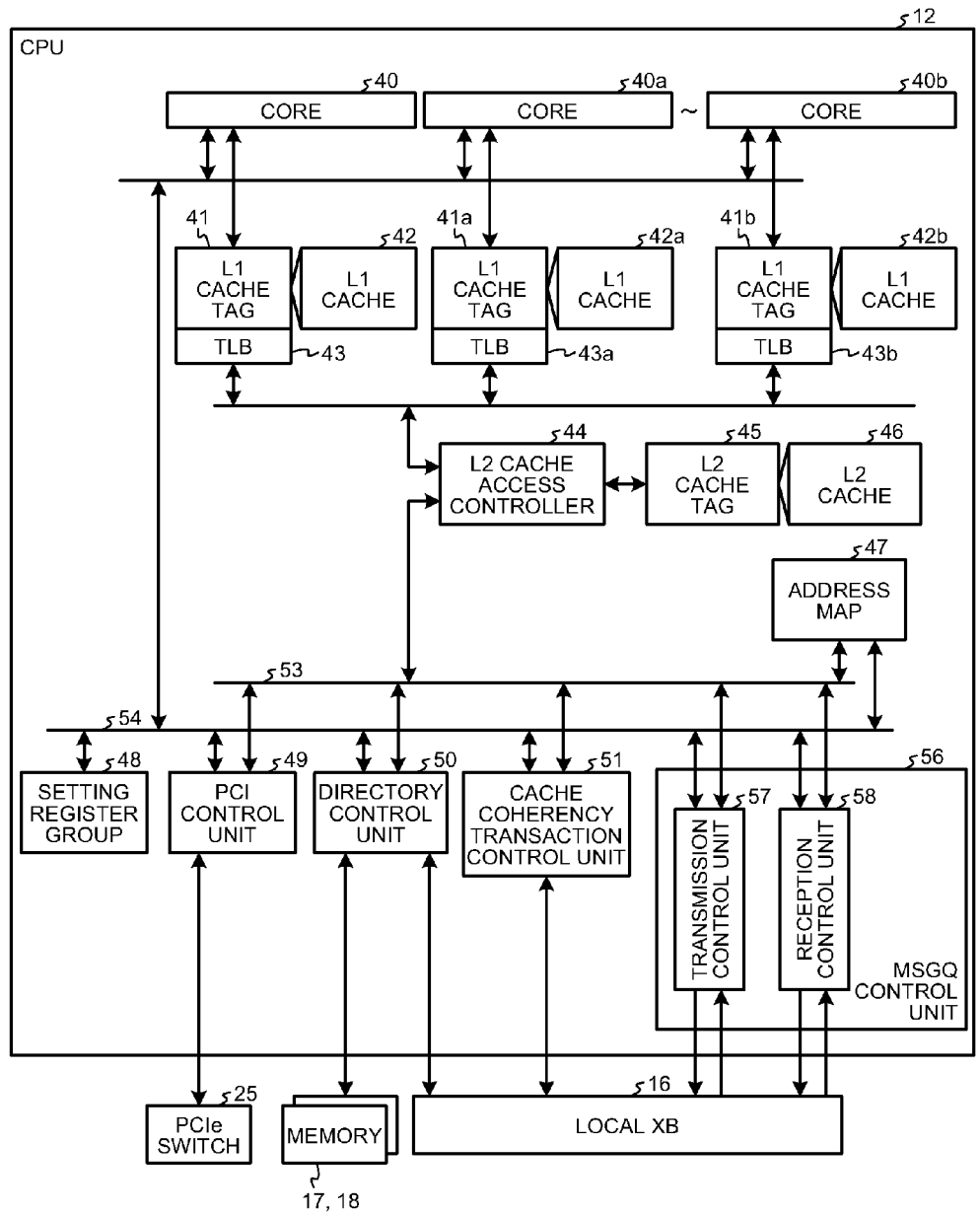
FIG. 8 is a schematic diagram illustrating the functional configuration of the CPU according to the first embodiment.

In the following, the functional configuration of the CPU 12 will be described with reference to FIG. 8. FIG. 8 is a schematic diagram illustrating the functional configuration of the CPU according to the first embodiment. In the example illustrated in FIG. 8, the CPU 12 is connected to the local XB 16, the memory 17, the memory 18, and the PCIe switch 25. Furthermore, the CPU 12 includes a plurality of cores 40 to 40b, L1 cache tags 41 to 41b, L1 caches 42 to 42b, and translation lookaside buffers (TLB) 43 to 43b.

Furthermore, the CPU 12 includes an L2 cache access controller 44, an L2 cache tag 45, an L2 cache 46, an address map 47, a setting register group 48, a PCI control unit 49, a directory control unit 50, a cache coherency transaction control unit 51, and a message queue (MSGQ) control unit 56. Furthermore, the MSGQ control unit 56 includes a transmission control unit 57 and a reception control unit 58.

The address map 47, the PCI control unit 49, the directory control unit 50, the cache coherency transaction control unit 51, and the MSGQ control unit 56 are connected via a memory R/W (Read/Write) bus 53. Furthermore, each of the cores 40 to 40b, the address map 47, the setting register group 48, the PCI control unit 49, the directory control unit 50, the cache coherency transaction control unit 51, and the MSGQ control unit 56 are connected via a register R/W bus 54.

The core 40a and the core 40b have the same function as that performed by the core 40; therefore, a description thereof will be omitted here. Furthermore, the L1 cache tag 41a and the L1 cache tag 41b have the same function as that performed by the L1 cache tag 41; and the L1 cache 42a and the L1 cache 42b have the same function as that performed by the L1 cache 42; therefore, a description thereof will be omitted here. Furthermore, the TLB 43a and the TLB 43b have the same function as that performed by the TLB 43; therefore, a description thereof will be omitted here.

The core 40 is an arithmetic unit that executes arithmetic processing by using data stored in the L1 cache 42 and includes an instruction execution unit and an arithmetic unit. Furthermore, when the core 40 transmits a message to the process that is executed by a CPU other than the CPU 12, the core 40 executes the following process.

First, the core 40 obtains, from a process executed by a CPU corresponding to the destination of a message, a register ID indicating a register set. Furthermore, the core 40 creates a MSGQ-ID containing both the register ID received from the destination CPU and a CPU-ID indicating the CPU corresponding to the destination of the message. Then, the core 40 transmits a message to be transmitted and the MSGQ-ID to the transmission control unit 57 in the MSGQ control unit 56. Furthermore, the core 40 transmits, to the transmission control unit 57, both the address of the CPU corresponding to the destination of the message and a command of the transmission request.

Furthermore, if the core 40 receives a message from a process executed by a CPU other than the CPU 12, the core 40 acquires a register set stored in the MSGQ control unit 56 and obtains a register ID that indicates the acquired register set. Then, the core 40 notifies the process, which is executed by the CPU that is the message transmission source, of the obtained register ID. The core 40 may also notify a process executed by a CPU other than the CPU 12 of the register ID by using an arbitrary method.

The process for transmitting both the message and the MSGQ-ID to the transmission control unit 57 in the MSGQ control unit 56 performed by the core 40 is executed via the register R/W bus 54. Specifically, by issuing a store request for writing both a message to be transmitted and the MSGQ-ID into a register included in the transmission control unit 57, the core 40 transmits both the message and the MSGQ-ID to the transmission control unit 57.

The L1 cache tag 41 is tag data of the L1 cache 42 and stores therein an address of data, a state, Least Recently Used (LRU) information for replacement, and the like that are stored in cache lines in the L1 cache 42. The L1 cache 42 is a cache memory that can be accessed at high speed and caches a part of the data stored in the memory 17, the memory 18, and the L2 cache 46.

Furthermore, the L1 cache 42 is a primary cache dedicated to the core 40. For example, the capacity of the L1 cache 42 is 64 kilobytes for each of the instruction region and the data region. The TLB 43 converts the virtual address that is output by the core 40 to the physical address by using a conversion table.

The L2 cache access controller 44 is an access controller for the L2 cache tag 45 or the L2 cache 46 and is a pipeline for accessing the L2 cache tag 45 or the L2 cache 46. Furthermore, the L2 cache access controller 44 has a function of serializing the same addresses.

The L2 cache tag 45 is tag data on the L2 cache 46 and stores therein the information similar to that stored in the L1 cache tag 41. Furthermore, the L2 cache 46 is a secondary cache memory shared by each of the cores 40 to 40b. The address map 47 stores therein, in an associated manner, a physical address to be requested and an identifier of a CPU that accesses the storage area indicated by the physical address and converts the physical address to the identifier of the CPU.

Specifically, if the CPU 12 issues a request for accessing a memory that is connected to a CPU other than the CPU 12, the address map 47 recognizes, from the physical address to be accessed, the identifier of the CPU corresponding to the destination of the request. Then, the address map 47 notifies the directory control unit 50 and the cache coherency transaction control unit 51 of the identifier of the CPU.

The setting register group 48 is multiple registers that performs various settings of the CPU 12 and stores therein data via the register R/W bus 54 by a store request received from the cores 40 to 40b. The PCI control unit 49 is the root complex with respect to the PCI express for the CPU connection.

The directory control unit 50 controls the memory access using the NUMA technology. Furthermore, if the directory control unit 50 obtains a memory request using, for example, Direct Memory Access (DMA), the directory control unit 50 maintains cache coherency by using directory information stored in the memory 17 and the memory 18. For example, by using the cache coherency transaction control unit 51, the directory control unit 50 issues a snoop to other CPUs or responds to the snoop issued by the another CPU.

When the cache coherency transaction control unit 51 receives a snoop from the CPUs other than the CPU 12 via the local XB 16, the cache coherency transaction control unit 51 checks the L2 cache 46 and sends the result of the checking as a response. Furthermore, if the cache coherency transaction control unit 51 receives an issue request for a snoop from the directory control unit 50, the cache coherency transaction control unit 51 transmits the snoop to the CPUs other than the CPU 12. For example, if the state of the data that is to be snooped and that is stored in the L2 cache 46 is "M", the cache coherency transaction control unit 51 transmits cache data as a response to the snoop.

The MSGQ control unit 56 controls the inter process communication between processes executed by the other CPUs 13 to 15 or the other nodes 10a to 10m and a process executed by the CPU 12. Specifically, the MSGQ control unit 56 stores therein multiple register sets that is a set of a write pointer indicating the start position of the writing of a message and a read pointer indicating the start position of the reading of a message.

Furthermore, if a process executed by one of the cores 40 to 40b receives a message from a process executed by a CPU other than the CPU 12, the MSGQ control unit 56 acquires a register set that is not being used. Then, the MSGQ control unit 56 notifies the process executed by one of the cores 40 to 40b of the register ID indicating the acquired register set. Then, if the MSGQ control unit 56 receives both the message and the register identifier transmitted from one of the cores 40 to 40b, the MSGQ control unit 56 creates a packet containing both the received message and the MSGQ-ID and transmits the packet via the local XB 16.

Furthermore, the MSGQ control unit 56 stores therein multiple register sets. If the MSGQ control unit 56 receives a packet from the other CPUs 13 to 15 or the other nodes 10a to 10m and extracts a register ID from the MSGQ-ID contained in the received packet. Then, the MSGQ control unit 56 identifies the register set indicated by the extracted register ID. Then, the MSGQ control unit 56 stores, in the storage area indicated by the write pointer in the identified register set, the message that is contained in the received packet. If the MSGQ control unit 56 stores the message, the MSGQ control unit 56 transfers the message to the directory control unit 50 via the memory R/W bus 53. In such a case, the directory control unit 50 stores the received message in the memories 17 or 18.

The local XB 16 is a router for an interconnection and transmits a request to the destination that is associated with an identifier of a CPU. Furthermore, the local XB 16 packetizes a request to be transmitted or attaches a cyclic redundancy check (CRC) value.

In the following, the functional configuration of the transmission control unit 57 will be described with reference to FIG. 9. FIG. 9 is a schematic diagram illustrating the functional configuration of a transmission control unit according to the first embodiment. In the example illustrated in FIG. 9, the transmission control unit 57 includes an address decoder 59, multiple control resources 60 to 60c, a selector 69, and a read data selector 70. Furthermore, each of the control resources 60 to 60c includes a message data register 61, a MSGQ-ID register 62, an issue-request flag register 63, a transmission packet creating unit 64, a selector 65, a reply status register 66, a read data selector 67, and a reply reception flag register 68.

The control resource 60 is the control resource for the core 40, the other control resources 60a and 60b are core resources for the cores 40a and 40b, respectively, and the control resource 60c is a control resource for another core that is not illustrated in FIG. 8. In the example illustrated in FIG. 9, only the functional configuration of the control resource 60 is illustrated; however, it is assumed that the other control resources 60a to 60c have the same functional configuration as that performed by the control resource 60. Furthermore, in the example illustrated in FIG. 9, the control resources for the cores 40 to 40b are illustrated; however, it is assumed that the CPU 12 includes the same number of control resources 60 to 60c as there are processes that are simultaneously executed.

In the following, each register included in the control resource 60 will be described first. At this stage, an address is provided to each of the message data register 61, the MSGQ-ID register 62, the issue-request flag register 63, the reply status register 66, and the reply reception flag register 68. Then, each of the cores 40 to 40b transmits data to be stored in each register and issues both a write request and an address of the register in which the data is stored, thereby storing the data in each register. Furthermore, each of the cores 40 to 40b issues both an address of each register and a read request, thereby reading each register.

FIG. 10 is a schematic diagram illustrating an example of an address provided to each register. FIG. 10 illustrates addresses provided to the registers, command that can be issued to the registers, the size of the data stored in the registers, the meaning of the data stored in the registers, and the status of save/restore at the time of the context switch. In the process executed by the core 40, it is possible to operate a value of each register included in the control resource 60 by issuing the addresses illustrated in FIG. 10 together with a read request or a write request.

For example, the message data register 61 is a register that stores therein a message to be transmitted. In the example illustrated in FIG. 10, the message data register 61 is a register in which the addresses "0x00" to "0x3F" are provided, a read request or a write request is to be performed, and 32-byte or 64-byte data is stored. Furthermore, the message data register 61 is a register in which the save/restore is to be performed at the time of the context switch.

The MSGQ-ID register 62 is a register that stores therein the MSGQ-ID. In the example illustrated in FIG. 10, the MSGQ-ID register 62 is a register in which the addresses "0x40" to "0x47" are provided, a read request or a write request is to be performed, and 32-bit data is stored. Furthermore, the MSGQ-ID register 62 is a register in which the save/restore is to be performed at the time of the context switch.

In the following, an example of data stored in the MSGQ-ID register 62 will be described with reference to FIG. 11. FIG. 11 is a schematic diagram illustrating an example of the format of a MSGQ-ID. As illustrated in FIG. 11, the MSGQ-ID has fields that stores therein a CPU number of a CPU that corresponds to the destination of a message, a register set number, an access key that is used to determine the accessibility to a register set, and the message size.

In the following, the contents of information stored in each field in the MSGQ-ID will be described with reference to FIG. 12. FIG. 12 is a schematic diagram illustrating information stored in each field in the MSGQ-ID. For example, the CPU-ID [7:0] is 8-bit information indicating a CPU corresponding to the destination of a message.

The register ID is a 11-bit number indicating a register set and indicates the unique destination in the entire information processing system 1 by combining it with a CPU-ID. The access key is 12-bit key information used to determine the accessibility, which is arbitrarily determined by a process on the message reception side, and is information sent to a process on the message transmission side. The M size illustrated in FIG. 12 is information indicating the size of a message to be transmitted. For example, if a value is "0", this indicates that the size of a message to be transmitted is 32 bytes, and, if a value is "1", this indicates that the size of a message to be transmitted is 64 bytes.

A description will be given here by referring back to FIG. 10. The issue-request flag register 63 is a register that stores therein a flag when the core 40 requests to transmit a message. In the example illustrated in FIG. 10, the issue-request flag register 63 is a register in which the addresses "0x48" to "0x4F" are provided, a write request is to be performed, and stores therein 1-bit data, i.e., a flag. The transmission packet creating unit 64, which will be described later, transmits a packet containing both a message and a MSGQ-ID to the destination when the core 40 stores "1" in the issue-request flag register 63. The issue-request flag register 63 is a register in which the save/restore is not to be performed at the time of the context switch.

The reply status register 66 is a register that stores therein a reply status indicating whether a reply from a CPU that has transmitted a message is normally received. In the example illustrated in FIG. 10, the reply status register 66 is a register in which the addresses "0x50" to "0x57" are provided, a read request or a write request is to be performed, and 2-bit data, i.e., a PROT bit and an OVFL bit, is stored. The PROT bit mentioned here is a bit that indicates the determination result of the accessibility to the key information, whereas the OVFL bit is a bit that indicates the result of the determination whether an overflow has occurred. Although not illustrated in FIG. 10, the reply reception flag register 68 is a register that stores therein a flag indicating whether a response to a message is received.

In order to easy to access from the software, each of the registers illustrated in FIG. 10 occupies an address area aligned in an 8-byte boundary even if the effective length of data is less than 8 bytes (64 bits). Furthermore, in an address area occupied by each register, values other than that corresponding to the effective length of the data do not have any meaning. The cores 40 to 40b can read and write with respect only to registers in the respective control resources 60 to 60b and do not read nor write with respect to the other control resources that are not associated with the subject core.

A description will be given here by referring back to FIG. 9. When the address decoder 59 receives an address and a command from the core 40 via the register R/W bus 54, the address decoder 59 decodes the received address and the command and stores them in a register included in the control resource 60. For example, when the address decoder 59 receives a command and an address from the core 40, when the address decoder 59 decodes the received command and the address and notifies the control resource 60 of the decoded command and the address. Then, the control resource 60 reads or writes data related to the register that is indicated by the address received from the address decoder 59.

When a value "1" is stored in the issue-request flag register 63, the transmission packet creating unit 64 obtains both the message stored in the message data register 61 and the MSGQ-ID stored in the MSGQ-ID register 62. Then, the transmission packet creating unit 64 creates a packet containing the obtained message and the MSGQ-ID and outputs the created packet to the selector 69.

FIG. 13 is a schematic diagram illustrating an example of a packet format. As illustrated in FIG. 13, the transmission packet creating unit 64 creates a packet that contains a format, a destination CPU number, an operation code, a transmission source CPU number, an entry ID, a MSGQ-ID, and data. The format contains 4-bit information indicating the format type of a packet.

In the destination CPU number, an ID indicating a destination CPU, i.e., an 8-bit destination ID (DID) is stored. The transmission packet creating unit 64 obtains a CPU-ID corresponding to the destination from the MSGQ-ID that is stored in the MSGQ-ID register 62 and uses the obtained CPUID as a destination CPU number.

The operation code stores therein 4-bit information indicating the contents of an access request. The transmission source CPU number stores therein an 8-bit ID indicating the transmission source CPU, i.e., the CPU 12. The entry ID stores therein an 8-bit entry ID uniquely indicating a process of the request source. The MSGQ-ID stores therein a MSGQ-ID that has been stored in the MSGQ-ID register 62. The data contains a message having the size in accordance with the value of the M size of the MSGQ-ID. If the transmission packet creating unit 64 issues a packet containing a 32-byte or a 64-byte message, an entry ID of the packet is stored.

A description will be given here by referring back to FIG. 9. When the core 40 reads the information stored in the reply status register 66, the selector 65 connects the register R/W bus 54 to the reply status register 66. Furthermore, the selector 65 receives a packet, as a reply, having the format illustrated in FIG. 14 from a CPU other than the CPU 12 via the local XB 16.

FIG. 14 is a schematic diagram illustrating an example of a reply packet format. As illustrated in FIG. 14, in a reply packet, 2-bit information indicating whether a message is normally received is stored as a status. When the selector 65 receives a reply, the selector 65 determines, by using the entry ID, whether the received reply is a reply to the packet transmitted by the transmission packet creating unit 64. If the selector 65 determines that the received reply is a reply to the packet transmitted by the transmission packet creating unit 64, the selector 65 extracts the status from the received reply and stores the extracted status in the reply status register 66.

In accordance with an address of a target read request issued by the core 40 via the register R/W bus 54, the read data selector 67 outputs the data stored in the message data register 61, the MSGQ-ID register 62, and the reply status register 66.

At the same time as the selector 65 receives the reply, the reply reception flag register 68 stores therein a flag "1" indicating that a reply has been received. When the reply reception flag register 68 stores therein the flag "1", the reply reception flag register 68 transmits, to the core 40, a signal indicating that a request has been transmitted. Specifically, the process executed by the core 40 determines that the message has been transmitted only after the flag "1" is stored in the reply reception flag register 68.

At this stage, the core 40 waits the operation of the process until a reply is received after the message has been transmitted. Specifically, the operation of a program executed by a core is stopped after "1" has been stored in the issue-request flag register 63 until "1" is stored in the reply reception flag register 68 and a request completion notification is transmitted to the core. By doing so, even if a context switch has occurred when a message is transmitted, the core 40 can act as if a message has been transmitted to a process at a single step.

When the selector 69 obtains a packet to be obtained by each of the control resources 60 to 60c, the selector 69 outputs the obtained packet to the local XB 16 and transmits the packet to the destination CPU. In accordance with a read request from the corresponding cores 40 to 40b, the read data selector 70 transmits data that is read by registers in the control resources 60 to 60c to the cores 40 to 40b, respectively, via the register R/W bus 54.

Figure 15:
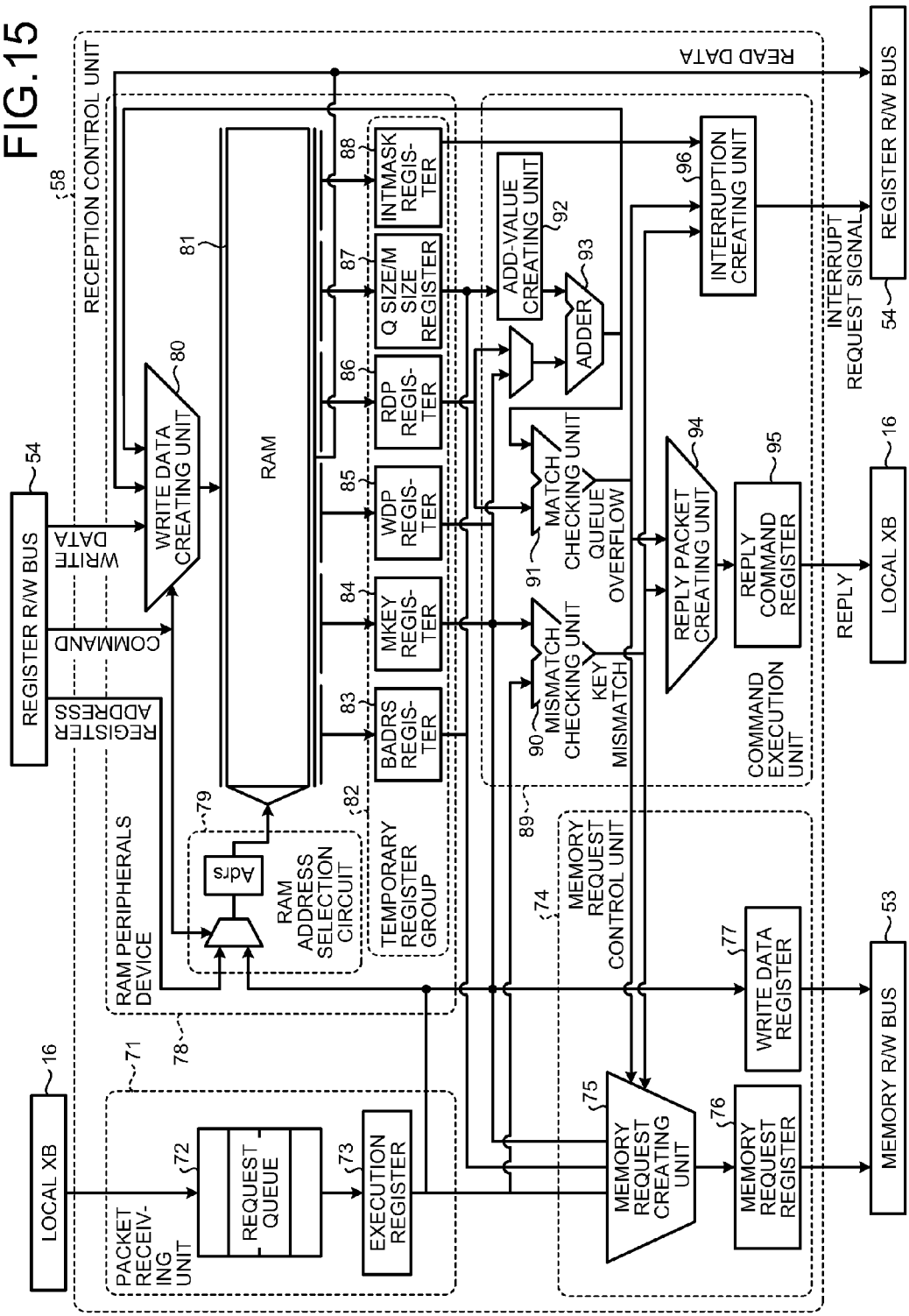
FIG. 15 is a schematic diagram illustrating the functional configuration of a reception control unit according to the first embodiment.

In the following, the functional configuration of the reception control unit 58 will be described with reference to FIG. 15. FIG. 15 is a schematic diagram illustrating the functional configuration of a reception control unit according to the first embodiment. In the example illustrated in FIG. 15, the reception control unit 58 includes a packet receiving unit 71, a memory request control unit 74, a random access memory (RAM) peripherals device 78, and a command execution unit 89.

The packet receiving unit 71 includes a request queue 72 and an execution register 73. The memory request control unit 74 includes a memory request creating unit 75, a memory request register 76, and a write data register 77. The RAM peripherals device 78 includes a RAM address selection circuit 79, a write data creating unit 80, a RAM 81, and a temporary register group 82.

The temporary register group 82 includes a base address (BADRS) register 83, a memory key (MKEY) register 84, a write pointer (WDP) register 85, and a read pointer (RDP) register 86. Furthermore, the temporary register group 82 includes a Q size/M size register 87 and an interrupt mask (INTMASK) register 88. The command execution unit 89 includes a mismatch checking unit 90, a match checking unit 91, an add-value creating unit 92, an adder 93, a reply packet creating unit 94, a reply command register 95, and an interruption creating unit 96.

In the following, the RAM peripherals device 78 included in the reception control unit 58 will be described first. In the following description, the RAM 81 and the temporary register group 82 will be described. Then, each unit included in the RAM peripherals device 78 will be described.

The RAM 81 stores therein multiple entries in which information stored in the temporary register group 82 is associated. Specifically, the RAM 81 stores therein multiple register sets. Furthermore, an address is provided to the storage area in the RAM 81. Each of the cores 40 to 40b issues an address of the RAM 81, a write request, and a read request, thereby reading or manipulating a value stored in the RAM 81.

Specifically, the RAM 81 stores therein multiple entries in which information stored in each of the registers 83 to 88 is associated. In the following, the information stored in each of the entries stored in the RAM 81 will be described with reference to FIG. 16. FIG. 16 is a schematic diagram illustrating an example of a field in a RAM. In the example illustrated in FIG. 16, the RAM 81 includes an entry containing 82 bits. Specifically, the RAM 81 retains the Q size from the $81^{st}$ bit to the $79^{th}$ bit inclusive in the entry, retains the M size at the $78^{th}$ bit, and retains the INTMASK at the $77^{th}$ bit.

Furthermore, the RAM 81 retains the base address bits from the $76^{th}$ bit to the $36^{th}$ bit inclusive in the entry and retains the memory key from the $34^{th}$ bit to the $24^{th}$ bit inclusive in the entry. Furthermore, the RAM 81 retains the write pointer from the $23^{rd}$ bit to the $16^{th}$ bit inclusive in the entry, retains the read pointer from the $15^{th}$ bit to the $8^{th}$ bit inclusive in the entry, and retains the check bit from the $7^{th}$ bit to the $0^{th}$ bit inclusive in the entry.

In the following, the contents of the information stored in the entry in the RAM 81 will be described with reference to FIG. 17. FIG. 17 is a schematic diagram illustrating the contents of data stored in the field in the RAM. The Q size is information indicating the size of the message storing area that is the storage area in which the received message is stored. In the Q size, if the value is "000", this indicates that the subject entry is invalid, and, if the value is "001", this indicates that the size of the message storing area is 128 bytes. Furthermore, in the Q size, if the value is "010", this indicates that the size of the message storing area is 256 bytes, and, if the value is "011", this indicates that the size of the message storing area is "512" bytes.

Furthermore, in the Q size, if the value is "100", this indicates the size of the message storing area is 1 kilobyte, and, if the value is "101", this indicates that the size of the message storing area is 2 kilobytes. Furthermore, in the Q size, if the value is "110", this indicates that the size of the message storing area is 4 kilobytes, and, if the value is "111", this indicates that the size of the message storing area is 8 kilobytes.

The M size is information indicating the size of a message. If the value is "0", this indicates that the size of the message is 32 bytes, and if the value is "1", this indicates that the size of the message is 64 bytes. The INTMASK mentioned here is information used to instruct whether an interrupt is to be generated when a message is received. In the INTMASK, if the value is "0", this indicates that an interrupt is not to be generated, and, if the value is "1", this indicates that an interrupt is to be generated.

The base address is 41-bit address information used as a reference of the message storing area, i.e., the storage area that stores therein the message. Furthermore, the base address indicates addresses of the message storing area for both a read pointer and a write pointer. The data size of the base address varies in accordance with the size of the message storing area. The message storing area starts from the address boundary that matches the area size indicated by an add value, which will be described later.

The memory key is key information for determining whether an access to the message storing area is permitted, i.e., is a value of a memory key for protecting the message storing area. The write pointer is 8-bit address that indicates the address in which the writing is started when a message is written in the message storing area. Furthermore, the read pointer is 8-bit address indicating the address in which the reading is started when a message is read from the message storing area.

Values of the data size of a write pointer and a read pointer vary in accordance with the size of the message storing area. Furthermore, the check bit is a redundant bit used to detect and correct an error from each piece of the information contained in the same entry and is a bit for error detection and correction (ECC).

In the following, the registers 83 to 88 included in the temporary register group 82 will be described. Each of the registers 83 to 88 is a register that temporarily stores therein information contained each entry that is stored in the RAM 81. Specifically, an address is provided to each of the registers 83 to 88 when viewed from a process executed by the core 40. Then, the process executed by the core 40 can write or read information stored in each of the registers 83 to 88 by specifying an address.

In the following, an example of an address provided to each of the registers 83 to 88 in the temporary register group 82 will be described with reference to FIG. 18. FIG. 18 is a schematic diagram illustrating an example of addresses of registers in a reception control unit viewed from the software side. The example in FIG. 18 illustrates addresses provided to the respective registers, commands that can be issued to the registers, and the size of the data stored in the registers 83 to 88. Furthermore, in the example illustrated in FIG. 18, the information stored in the Q size/M size register 87 is separately illustrated in the Q size and the M size.

The Q size/M size register 87 is a register that stores therein the Q size and the M size. In the example illustrated in FIG. 18, "0x00" to "0x07" are provided to the Q size/M size register 87 as the addresses for storing the Q size, and "0x08" to "0x0F" are provided to the Q size/M size register 87 as the addresses for storing the M size. Furthermore, the Q size/M size register 87 is a register in which a write request and a read request are to be performed and 3-bit Q size data and 1-bit M size data are stored.

The INTMASK register 88 is a register that stores therein the INTMASK. In the example illustrated in FIG. 18, the INTMASK register 88 is a register in which "0x10" to "0x17" are provided as the addresses for storing the INTMASK and a write request and a read request are to be performed.

The BADRS register 83 is a register that stores therein a base address. In the example illustrated in FIG. 18, the BADRS register 83 is a register in which "0x18" to "0x1F" are provided as the addresses for storing the base address and a write request and a read request are to be performed. The MKEY register 84 is a register that stores therein a memory key. In the example illustrated in FIG. 18, the MKEY register 84 is a register in which "0x20" to "0x27" are provided as the addresses for storing a value of the memory key and a write request and a read request are to be performed.

The WDP register 85 is a register that stores therein a write pointer. In the example illustrated in FIG. 18, the WDP register 85 is a register in which "0x28" to "0x2F" are provided as the addresses for storing the write pointer and a write request and a read request are to be performed. The RDP register 86 is a register that stores therein a read pointer. In the example illustrated in FIG. 18, the RDP register 86 is a register in which "0x30" to "0x37" are provided as the addresses for storing a read pointer and a write request and a read request are to be performed.

Furthermore, the update register illustrated in FIG. 18 is a virtual register used to instruct, by a process, to update a value of a read pointer when a message is read. Specifically, if a write request is issued to the update register, an input of the write data is not performed and only a value of the updated read pointer is written. In the example illustrated in FIG. 18, update register is a register in which "0x38" to "0x3F" are provided as the addresses for storing an add value.

Similarly to each register illustrated in FIG. 10, in order to easy to access from the software, each of the registers illustrated in FIG. 18 occupies an address area aligned in an 8-byte boundary even if the effective length of data is less than 8 bytes (64 bits). Furthermore, in an address area occupied by each register illustrated in FIG. 18, values other than that corresponding to the effective length of the data do not have any meaning.

In the following, the RAM address selection circuit 79 will be described by referring back to FIG. 15. The RAM address selection circuit 79 obtains a register address and a command from the core 40 via the register R/W bus 54. Then, by using the upper address of the received register address, the RAM address selection circuit 79 selects an entry to be accessed from the entries stored in the RAM 81.

Then, the RAM address selection circuit 79 identifies a storage area to be accessed by using the lower address of the received register address. Thereafter, the RAM address selection circuit 79 reads or writes the identified storage area in accordance with the received command. Furthermore, when the RAM address selection circuit 79 receives a register ID from the packet receiving unit, the RAM address selection circuit 79 stores, in each of the registers 83 to 88 in the temporary register group 82, information other than the check bit from each pieces of the information in the entry indicated by the received register ID. Specifically, the RAM address selection circuit 79 stores the value of the register set indicated by the register ID in the registers 83 to 88 in the temporary register group 82.

When viewed from the process executed by the core 40, the address that seems to be provided to the temporary register group 82 is, in practice, the lower address of the RAM 81. Specifically, the process executed by the core 40 recognizes the entries stored in the RAM 81 such that the different register groups store the entries. Then, in a state address used to select a register group, i.e., in an upper address used to select an entry stored in the RAM 81, the process executed by the core 40 creates a register address in which the address provided to each register is provided as the lower address.

Thereafter, by outputting the created register address to the reception control unit 58, the process executed by the core 40 selects information that is to be accessed and that is stored in the RAM 81 as if each piece of the information stored in the RAM 81 is stored in the different registers.

When the write data creating unit 80 obtains the write data from the core 40 via the register R/W bus 54, the write data creating unit 80 stores the data obtained from the core 40 in the storage area that is selected by the RAM address selection circuit 79. Furthermore, the write data creating unit 80 stores, in the RAM 81, a new write pointer or a new read pointer created by the adder 93, which will be described later.

If the command issued by the core 40 indicates the writing into the RAM 81, the RAM peripherals device 78 performs the following process. Namely, from among the entries indicated by the upper addresses of the register addresses, the RAM peripherals device 78 rewrites the data on the information indicated by the lower addresses, calculates redundant bits with respect to the write data, and stores the new check bits.

Furthermore, when the information stored in the RAM 81 is read, the read data that has been read is transmitted to the core 40 via the register R/W bus 54 and the write data creating unit 80 receives the data that has been read. Then, the write data creating unit 80 writes the read data again in the RAM 81.

In the following, a description will be given of a process performed by the packet receiving unit 71, the memory request control unit 74, and the command execution unit 89 included in the reception control unit 58. When the packet receiving unit 71 receives, via the local XB 16, a packet that has been transmitted by another CPU, the packet receiving unit 71 stores the received packet in the request queue 72. Furthermore, the packet receiving unit 71 fetches, in synchronization with the update time of the RAM 81, a single packet from the top in the request queue 72 and stores the fetched packet in the execution register 73.

Then, the packet receiving unit 71 extracts a MSGQ-ID from the packet stored in the execution register 73 and obtains a register ID from the extracted MSGQ-ID. Thereafter, the packet receiving unit 71 outputs the obtained register ID to the RAM address selection circuit 79 in the RAM peripherals device 78, thereby a value of the register set indicated by the register ID is stored in the registers 83 to 88 in the temporary register group 82. Furthermore, the packet receiving unit 71 extracts data, i.e., a message, from the packet stored in the execution register 73 and stores the extracted message in the write data register 77 included in the memory request control unit 74.

Then, the packet receiving unit 71 obtains an access key value from the extracted MSGQ-ID and outputs the obtained access key value to the mismatch checking unit 90 in the command execution unit 89. Then, the mismatch checking unit 90 determines whether the value of the memory key stored in the MKEY register 84 matches the access key value received from the packet receiving unit 71. If the value of the memory key matches the access key value, the mismatch checking unit 90 notifies the memory request creating unit 75, the reply packet creating unit 94, and the interruption creating unit 96 that an access is permitted. In contrast, if the value of the memory key does not match the access key value, the mismatch checking unit 90 notifies the memory request creating unit 75, the reply packet creating unit 94, and the interruption creating unit 96 that an access is not permitted.

Furthermore, as the same time as the mismatch checking unit 90 performs the process described above, the match checking unit 91, the add-value creating unit 92, and the adder 93 performs the following process. First, the add-value creating unit 92 creates an add value in accordance with a value of the M size stored in the Q size/M size register 87. Furthermore, the adder 93 calculates an update value of a write pointer by adding the add value created by the add-value creating unit 92 to a write pointer stored in the RDP register 86.

Then, the match checking unit 91 determines whether the update value of the write pointer calculated by the adder 93 matches the value of the read pointer stored in the RDP register 86. If the match checking unit 91 determines that the update value of the write pointer matches the value of the read pointer, the match checking unit 91 determines that an overflow has occurred. Then, the match checking unit 91 outputs the occurrence of the overflow to the memory request creating unit 75, the reply packet creating unit 94, and the interruption creating unit 96.

In contrast, if the match checking unit 91 determines that the update value of the write pointer does not match the value of the read pointer, the match checking unit 91 outputs the permission of the writing into the memory to the memory request creating unit 75, the reply packet creating unit 94, and the interruption creating unit 96.

At this point, the memory request creating unit 75 in the memory request control unit 74 obtains a notification from the mismatch checking unit 90 indicating that an access is permitted, and, if the memory request creating unit 75 obtains from the match checking unit 91 indicating that the writing into the memory is permitted, the memory request creating unit 75 performs the following process. Namely, the memory request creating unit 75 obtains the value of the base address stored in the BADRS register 83, the value of the write address stored in the WDP register 85, and the values of the Q size and the M size stored in the Q size/M size register 87.

Then, the memory request creating unit 75 creates a memory write address by using the obtained values of the base address, the write address, the Q size, and the M size and stores the created memory write address in the memory request register 76. Then, the memory request control unit 74 stores the message in the memories 17 or 18 by outputting both the memory write address stored in the memory request register 76 and the message stored in the write data register 77 to the memory R/W bus 53.

If the memory request creating unit 75 obtains a notification from the mismatch checking unit 90 indicating that an access is not permitted or obtains a notification from the match checking unit 91 indicating that an overflow has occurred, the memory request creating unit 75 ends a process without creating a memory request. In such a case, the packet receiving unit 71 discards the packet stored in the execution register 73, fetches a new packet from the request queue 72, and stores the packet in the execution register 73.

In the following, an example of a memory write address created by the memory request creating unit 75 will be described with reference to FIG. 19. FIG. 19 is a schematic diagram illustrating an example of memory write addresses. In the example illustrated in FIG. 19, if the code value of the Q size is "001" and the value of the M size is "0", the memory request creating unit 75 creates the following memory write address. Namely, the memory request creating unit 75 creates a 48-bit memory write address by joining the base address from the $47^{th}$ bit to the $7^{th}$ bit inclusive, the $0^{th}$ bit of the write address, and the address "0b000000".

Furthermore, for example, if the code value of the Q size is "001" and the value of the M size is "1", the memory request creating unit 75 creates the following memory write address. Namely, the memory request creating unit 75 creates a 48-bit memory write address by joining the base address from the $47^{th}$ bit to the $7^{th}$ bit inclusive, the write address from the $1^{st}$ bit to the $0^{th}$ bit inclusive, and the address "0b00000".

Furthermore, for example, if the code value of the is "010" and the value of the M size is "0", the memory request creating unit 75 creates the following memory write address. Namely, the memory request creating unit 75 creates a 48-bit memory write address by joining the base address form the $47^{th}$ bit to the $8^{th}$ bit inclusive, the write address from the $1^{st}$ bit to the $0^{th}$ bit inclusive, and the address "0b000000".

Furthermore, for example, if the code value of the Q size is "010" and the value of the M size is "1", the memory request creating unit 75 creates the following memory write address.

Namely, the memory request creating unit 75 creates a 48-bit memory write address by joining the base address from the $47^{th}$ bit to the $8^{th}$ bit inclusive, the write address from the $2^{nd}$ bit to the $0^{th}$ bit inclusive, and the address "0b00000".

In other words, as illustrated in FIG. 19, as the code value of the Q size increases, the memory request creating unit 75 reduces the number of bits of the base address that is used as a memory write address. Furthermore, as the code value of the Q size increases, the memory request creating unit 75 increases the number of bits of the write pointer that is used as a memory write address.

A description will be given here by referring back to FIG. 15. The reply packet creating unit 94 creates a reply illustrated in FIG. 14 and stores, in the reply, the status in accordance with the result processed by the mismatch checking unit 90 and the match checking unit 91. At this stage, the reply packet creating unit 94 stores, in the destination CPU number, a CPU number that indicates a CPU corresponding to the message transmission source.

Then, the reply packet creating unit 94 stores the created reply in the reply command register 95. For example, the reply packet creating unit 94 obtains a notification from the mismatch checking unit 90 indicating that an access is permitted, and, if the reply packet creating unit 94 obtains a notification from the match checking unit 91 indicating that the writing into a memory is permitted, the reply packet creating unit 94 stores the following status. Namely, by setting the OVFL bit to "0" and the PROT bit to "0", the reply packet creating unit 94 stores the status indicating that a message is normally received.

In contrast, if the reply packet creating unit 94 receives a notification from the mismatch checking unit 90 indicating that an access is not permitted, the reply packet creating unit 94 sets the PROT bit to "1". Furthermore, if the reply packet creating unit 94 obtains a notification from the match checking unit 91 indicating that an overflow has occurred, the reply packet creating unit 94 sets the OVFL bit to "1". Each of the bits in the status are stored in the reply status register included in the destination CPU and then read by the process executed by the destination CPU. If the reply command register 95 obtains a reply from the reply packet creating unit 94, the reply command register 95 temporarily retains the obtained reply and then transmits the reply to the CPU, i.e., the message transmission source, via the local XB 16.

When the interruption creating unit 96 obtains a notification from the mismatch checking unit 90 indicating that an access is permitted and a notification from the match checking unit 91 indicating that the writing of the memory is permitted, the interruption creating unit 96 performs the following process. First, the interruption creating unit 96 determines whether the value of the INTMASK stored in the INTMASK register 88 is "1" or "0". If the value of the INTMASK is "1", the interruption creating unit 96 outputs, to the cores 40 to 40b via the register R/W bus 54, an interrupt request signal used to request to execute an interrupt process.

In contrast, if the value of the INTMASK is "0", the interruption creating unit 96 does not output the interrupt request signal. Furthermore, if the interruption creating unit 96 obtains a notification from the mismatch checking unit 90 indicating that an access is not permitted or obtains a notification from the match checking unit 91 indicating that an overflow has occurred, the interruption creating unit 96 does not output the interrupt request signal.

At this point, if the interrupt request signal is output, one of the cores 40 to 40b executes the message receive process that has been waited due to the context switch. Then, each of the cores 40 to 40b reads a message stored in memory 17 or memory 18 by using a register set indicated by the register ID sent to the process executed by the CPU corresponding to the message transmission source.

If the RAM peripherals device 78 performs the operation, such as the initialization of the entry stored in the RAM 81, a change in an interrupt mask, the writing of a message, and the reading of a message, the RAM peripherals device 78 updates the information stored in the RAM 81 in accordance with the operation illustrated in FIG. 20. FIG. 20 is a schematic diagram illustrating updates, classified under operation types, of the field in the RAM.

For example, if the core 40 initializes an entry due to a read request or a write request with respect to each of the registers 83 to 88, the RAM peripherals device 78 updates the value of each field as follows. First, the RAM peripherals device 78 updates the values of the Q size, the M size, the base address, and the memory key to the value specified by a process. Furthermore, the RAM peripherals device 78 updates the value of the INTMASK to "0" and updates the values of the write pointer and the read pointer to "All 0". Furthermore, the RAM peripherals device 78 updates the value of the check bit to the value that is created in accordance with each piece of the updated information.

Furthermore, if the core 40 changes the interrupt mask, the RAM peripherals device 78 does not change the values of the Q size, the M size, the base address, the memory key, the write pointer, and the read pointer, and the RAM peripherals device 78 updates the value of the INTMASK to the value specified by a process. Furthermore, if the RAM peripherals device 78 receives a message and writes the received message to memory 17 or memory 18, the RAM peripherals device 78 only updates the value of the write pointer. Furthermore, if the core 40 reads a message from memory 17 or memory 18, the RAM peripherals device 78 only updates the value of the read pointer.

The reception control unit 58 described above retains multiple register sets in the RAM 81; however, the embodiment is not limited thereto. For example, each of the register sets may also be retained by using a flip flop (FF) or the like. Furthermore, the reception control unit 58 stores the register sets read from the RAM 81 in the temporary register group 82. This is considered a delay time occurring when the register sets are read from the RAM 81; however, the embodiment is not limited thereto. For example, another configuration may also be used as long as the reception control unit 58 can store multiple register sets and store a message in memory 17 or memory 18 in accordance with the register sets indicated by the received register IDs.

In the following, a message storing area in which the driver 33 is reserved in the memories 18 and 19 and the effective bit length of each address pointer will be described with reference to FIG. 21. FIG. 21 is a schematic diagram illustrating a message storing area. For example, by aiming at reducing the cost of hardware, the RAM 81 retains only some bits from among the physical addresses that are used as the write pointers and the read pointers. Accordingly, as illustrated in FIG. 21, the driver 33 reserves the message storing area in accordance with the Q size and the M size.

For example, if the Q size is "001" and the M size is "1", the driver 33 sets the size of the message storing area to 128 bytes such that the driver 33 can store therein a single 64-byte message. In such a case, the effective bit length of the base address is from the $47^{th}$ bit to the $7^{th}$ bit inclusive, and the effective bit length of each of the write pointer and the read pointer is only at the $0^{th}$ bit.

Furthermore, if the Q size is "001" and the M size is "0", the driver 33 sets the size of the message storing area to 128 bytes such that the driver 33 can store therein three 32-byte messages. In such a case, the effective bit length of the base address is from the $47^{th}$ bit to the $7^{th}$ bit inclusive, and the effective bit length of each of the write pointer and the read pointer is from the $1^{St}$ bit to the $0^{th}$ bit inclusive.

Furthermore, if the Q size is "010" and the M size is "1", the driver 33 sets the size of the message storing area to 256 bytes such that the driver 33 can store therein three 64-byte messages. In such a case, the effective bit length of the base address is from the $47^{th}$ bit to the $8^{th}$ bit inclusive, and the effective bit length of each of the write pointer and the read pointer is from the $1^{st}$ bit to the $0^{th}$ bit inclusive.

Subsequently, the driver 33 sets the message storing area having the size illustrated in FIG. 21 in accordance with the values of the Q size and the M size. Specifically, the driver 33 reserves, for a message storing area, consecutive physical addresses having an area indicated by a value of a power of two. Furthermore, as the value of the Q size increases, the driver 33 sets a message storing area that is exponentially large.

Because the M size is information indicating the size of a message, the number of messages stored in the message storing area varies in accordance with the values of the Q size and the M size. Accordingly, the effective bit length of the base address becomes short as the message storing area increases, whereas, the effective bit length of the write pointer and the read pointer becomes long as the number of stored messages increases. Furthermore, because the reception control unit 58 detects an overflow by using the adder 93 and the match checking unit 91, the number of stored messages corresponds to the value obtained by subtracting one from a value obtained by dividing the size of the message storing area by the message size.

The CPU 12 reserves the message storing area for storing messages in the memories 18 and 19. However, the memories 18 and 19 are not only the management programs, such as the kernel of the OS 32 or the driver 33, but also the resources that can be directly used from the software, such as the application 35, that operates in a user mode. Accordingly, if the software operating in a user mode accesses the message storing areas reserved in the memories 18, 19, a message may possibly be rewritten.

Accordingly, by using a memory key, an address key, and a memory address allocated to the message storing area, the processes executed by the CPUs 12 to CPU 15 control an access to the message storing area and prevents the message communication resources from being destructed. In the following, a method for preventing the message communication resources from being destructed will be described.

In the following, a description will be given of a method for preventing, by using a memory key and an address key, the message communication resources from being destructed. First, the process on the message transmission side creates a MSGQ-ID containing a value of the access key notified by the process on the message reception side and transmits the created MSGQ-ID together with the message to the process on the message reception side.

Furthermore, the process on the message reception side determines whether the value of the access key contained in the MSGQ-ID matches the value of the memory key. If the values of the access key and the memory key do not match, the process on the message reception side does not write the message nor update the write pointer. The value of the memory key is arbitrarily determined by the process on the message reception side and may possibly sent to the process on the message transmission side; therefore, it is possible to prevent the other message communication resources from being destructed due to an error made by the process on the transmission side.

In the following, a description will be given, with reference to FIGS. 22 and 23, of a method for preventing a message reception area from being destructed by using a memory address allocated in the message storing area. FIG. 22 is a schematic diagram illustrating an address map that takes into consideration a program error. FIG. 23 is a schematic diagram illustrating the configuration of addresses in the address map that takes into consideration the program error.

For example, as illustrated in (j) of FIG. 22, the driver 33 defines each register illustrated in FIG. 18 from a non-cacheable (NC) region in the memory map by using the memory mapped Input/Output (MMIO) method. At this stage, as illustrated in (k) of FIG. 22, the driver 33 defines, in the 8-kilobyte physical page region, a single register set, i.e., registers corresponding to a single entry stored in the RAM 81. Furthermore, the driver 33 defines another register set in a different 8-kilobyte physical page region. At this point, each register set is defined only in the physical address, and thus is not associated with each virtual address; therefore, each register set is not accessed from the software operating in a user mode.

If the driver 33 is requested to allocate a message communication resource from a user process #1, the driver 33 allocates a register ID and notifies the user process #1 of the MSGQ-ID. At this time, the driver 33 associates physical page address, which is associated with the register ID in the NC region, with an arbitrary virtual address and registers it in the TLB 43. The driver 33 notifies the user process #1 of the virtual address associated with the physical page address. Then, by accessing the notified virtual address, the user process #1 can access the register resource that is associated with the notified MSGQ-ID.

As described above, because a virtual address of the driver set other than that allocated by the driver 33 is not registered in the TLB 43, the user process #1 does not access the register resource. Accordingly, for example, the user process #1 does not erroneously destruct the message communication resources that is used by the user process #2. Furthermore, by performing the same process as that performed on the register set, the driver 33 can prevent the user process #1 from accessing the message storing area that is allocated to the user process #2. Accordingly, the driver 33 can prevent the message communication resources from being destructed due to a program error.

Furthermore, for example, the driver 33 provides the physical address having the address configuration illustrated in FIG. 23 to the registers. For example, the driver 33 stores a 24-bit unique address for the NC space in the address bits from the bit $47^{th}$ bit to the $24^{th}$ bit inclusive. Furthermore, the driver 33 stores a 11-bit register ID in the address bit from the $23^{rd}$ bit to the $13^{th}$ bits inclusive. Furthermore, the driver 33 stores the 13-bit unique address provided to each register illustrated in FIG. 18 in the address bits from the $12^{th}$ bit to the $0^{th}$ bit inclusive. Then, the driver 33 provides the address bits containing each of the bits to each register.

The transmission control unit 57, the address decoder 59, the selector 65, the transmission packet creating unit 64, the read data selector 67, the selector 69, and the read data selector 70 are electronic circuits. Furthermore, the RAM address selection circuit 79, the write data creating unit 80, the memory request creating unit 75, the mismatch checking unit 90, the match checking unit 91, the add-value creating unit 92, the adder 93, the reply packet creating unit 94, and the interruption creating unit 96 are electronic circuits. Examples of the electronic circuits include integrated circuits, such as application specific integrated circuits (ASICs) or field programmable gate arrays (FPGAs), central processing units (CPUs), or micro processing units (MPUs).

Figure 24:
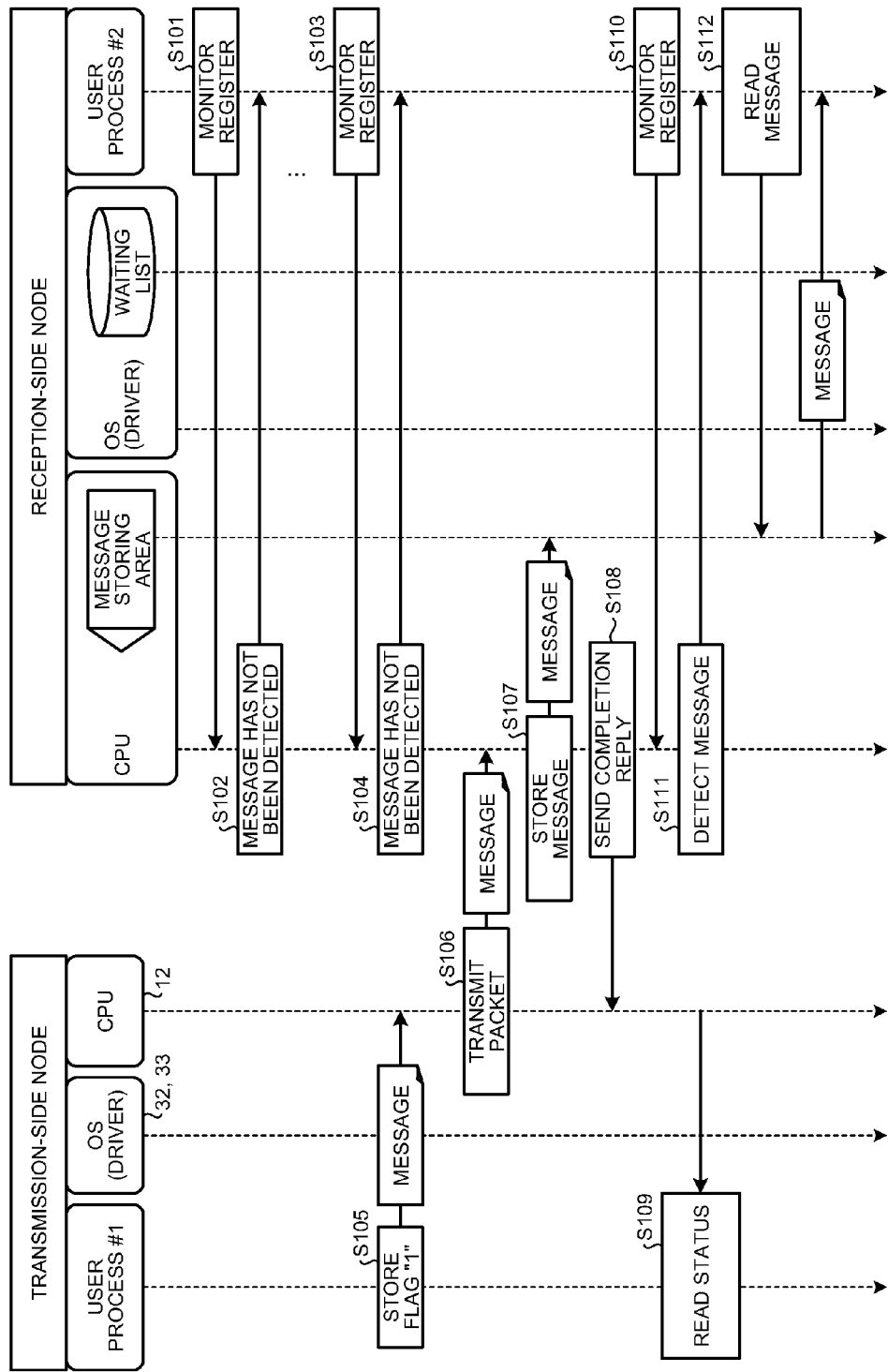
FIG. 24 is a sequence diagram illustrating an operation performed when a message is transmitted and received.

In the following, a description will be given, with reference to FIG. 24, of the flow of a process executed by the node arranged on the message transmission side and the node arranged on the message reception side when a message is transmitted and received. FIG. 24 is a sequence diagram illustrating an operation performed when a message is transmitted and received. In the example illustrated in FIG. 24, a description will be given of the flow of a process performed when the reception of a message is monitored by the polling that is performed by the user process #2 executed by the reception-side node.

First, the user process #2 executed by the reception-side node monitors the temporary register group (Steps S101 and S103), and detects the reception of a message by comparing the value of the write pointer with the value of the read pointer. In the example illustrated in FIG. 24, because the message has not been received at Steps S102 and S104, the reception of the message has not been detected (Steps S102 and S104).

At this point, the user process #1 stores the flag "1" in the issue-request flag register 63, the user process #1 instructs the CPU 12 to transmit a message (Step S105). Then, the CPU 12 transmits a packet containing the message to the reception-side node (Step S106). Furthermore, the CPU included in the reception-side node stores the received message in the message storing area (Step S107). At this point, the CPU included in the reception-side node updates the value of the write pointer. Furthermore, the CPU included in the reception-side node transmits a completion reply to the CPU 12 (Step S108).

Then, the CPU 12 stores the flag "1" in the reply reception flag register 68, thereby the CPU 12 notifies the user process #1 of the completion of the message transmission. Then, the user process #1 reads the value of the reply status register 66 (Step S109).

In contrast, the user process #2 monitors the temporary register group 82 (Step S110) and compares the value of the write pointer with the value of the read pointer. Because the value of the write pointer is different from that of the read pointer, the user process #2 detects the message (Step S111). Then, the user process #2 reads the message (Step S112) and ends the process.

Figure 25:
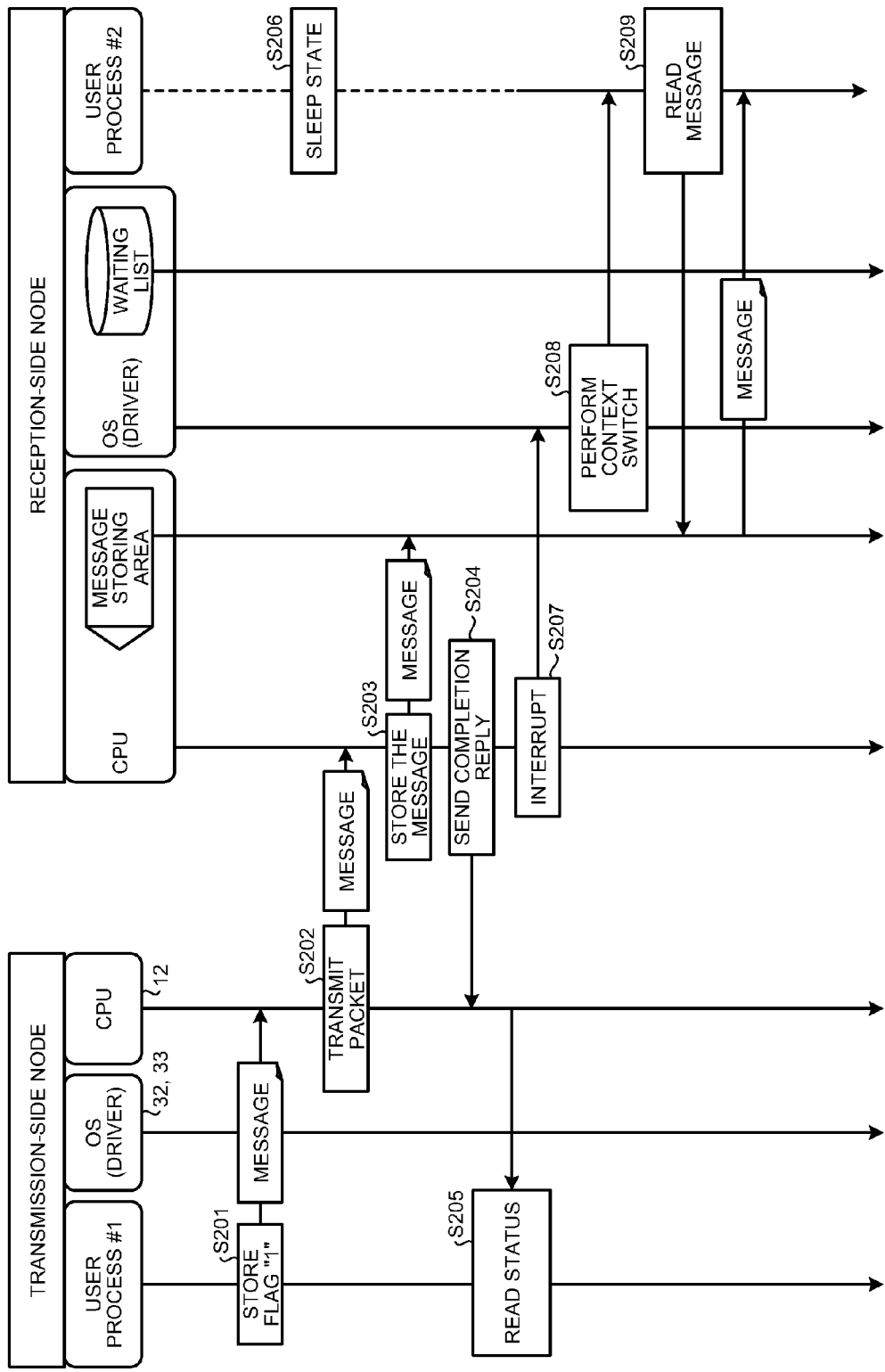
FIG. 25 is a sequence diagram illustrating the flow of a process for issuing an arrival notification to a user process by using an interruption instruction.

In the following, a description will be given, with reference to FIG. 25, of the flow of a process for receiving the message using the interrupt process performed by the node that is arranged on the message reception side and that has received the message. Specifically, a description will be given of the flow of a process performed by the node on the message transmission side and the node on the message reception side when "1" is stored in the INTMASK register 88. FIG. 25 is a sequence diagram illustrating the flow of a process for issuing an arrival notification to a user process by using an interruption instruction.

In such a case, by storing the flag "1" in the issue-request flag register 63, the user process #1 instructs the CPU 12 to transmit the message (Step S201). Then, the CPU 12 transmits the packet containing the message to the reception-side node (Step S202). Furthermore, the CPU included in the reception-side node stores the received message in the message storing area (Step S203). At this point, the CPU included in the reception-side node updates the value of the write pointer. Furthermore, the CPU included in the reception-side node transmits the completion reply to the CPU 12 (Step S204).

Then, by storing the flag "1" in the reply reception flag register 68, the CPU 12 notifies the user process #1 of the completion of the message transmission. Then, the user process #1 reads the value of the reply status register 66 (Step S205).

The user process #2 executed by the reception-side node at this step is in a sleep state (Step S206). Accordingly, if the CPU in the reception-side node transmits a reply to the CPU 12, the CPU issues an interrupt request signal as an arrival notification (Step S207). Then, the driver in the reception-side node executes a context switch (Step S208) and executes the user process #2 that were being in the sleep state. Then, the user process #2 reads the message (Step S209) and ends the process.

Figure 26:
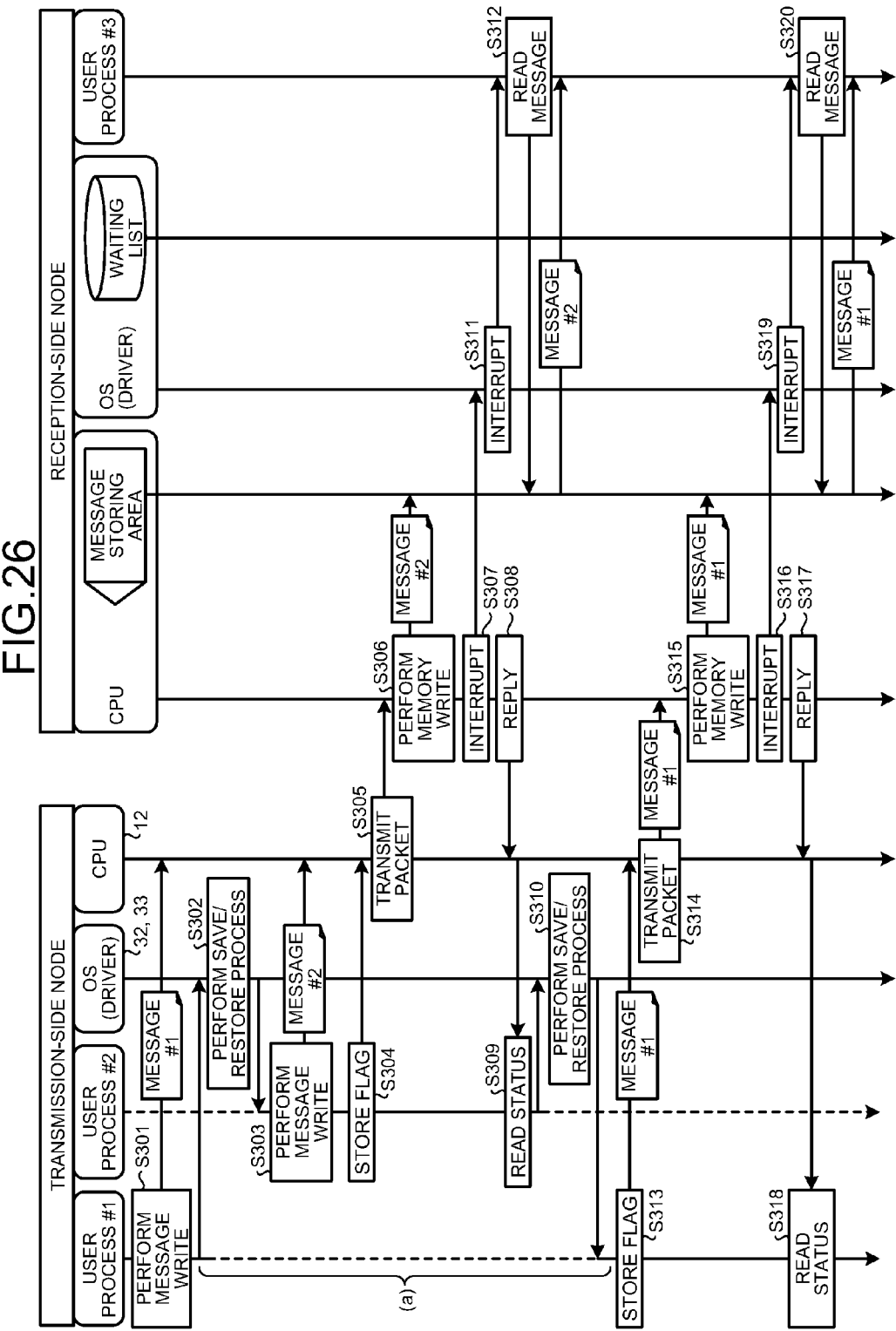
FIG. 26 is a sequence diagram illustrating the flow of a process performed when a context switch occurs in a transmission-side node.

In the following, a description will be given, with reference to FIG. 26, of the flow of a process performed if a context switch occurs in the transmission-side node when the user process #1 transmits a message #1. FIG. 26 is a sequence diagram illustrating the flow of a process performed when a context switch occurs in a transmission-side node.

For example, the user process #1 in the transmission-side node stores the message #1 in the message data register 61 (Step S301). At this point, a context switch occurs and thus the driver 33 performs the save/restore process on a user program #1 (Step S302). At this point, the save/restore process is also performed on the message #1 stored in the message data register 61.

Subsequently, the user process #2 executed due to the context switch stores a message #2 in the message data register 61 (Step S303). Then, by storing "1" in the issue-request flag register 63 (Step S304), the user process #2 allows the CPU 12 to transmit a packet containing the message #2 (Step S305).

Then, the CPU in the reception-side node stores the message #2 in the message storing area (Step S306). Then, the CPU in the reception-side node issues an interrupt request signal (Step S307), and transmits a reply to the CPU 12 (Step S308). When the CPU 12 receives a reply, because "1" is stored in the reply reception flag register 68, the user process #2 reads the status stored in the reply status register 66 (Step S309). Thereafter, a context switch occurs and thus the driver 33 performs the save/restore process on the user program #2 (Step S310).

In contrast, when the driver in the reception-side node receives the message #2, an interrupt request signal is issued (Step S307); therefore, the driver issues an interruption notification to the user process #3 (Step S311). Then, the user process #3 reads the message #2 (Step S312).

At this stage, the user process #1 executed due to the context switch stores the message #1 that is transmitted at Step S301 in the message data register 61. Accordingly, the user process #1 stores "1" in the issue-request flag register 63 (Step S313), thereby transmitting the packet containing the message #1 to the CPU 12 (Step S314).

Then, the CPU in the reception-side node stores the message #1 in the message storing area (Step S315). Then, the CPU in the reception-side node issues an interrupt request signal (Step S316) and transmits a reply to the CPU 12 (Step S317). At this stage, when the CPU 12 receives the reply, "1" is stored in the reply reception flag register 68, the user process #1 reads the status stored in the reply status register 66 (Step S318).

In contrast, when the driver in the reception-side node receives the message #1, an interrupt request signal is issued (Step S316); therefore, the driver issues an interruption notification to the user process #3 (Step S319). Then, the user process #3 reads the message #1 (Step S320).

At this stage, the CPU 12 waits the execution of the user process #1 during the time period indicated by (a) in FIG. 26. Specifically, the CPU 12 waits the completion of the execution of the message transmission command during the time period from when the process has issued the message transmission command until when the status is stored in the reply status register 66 and the flag "1" is stored in the reply reception flag register 68. Accordingly, even when a context switch occurs immediately after the process has issued the message transmission command, a reply seems to be received, from the process side, immediately after the message transmission command is issued. Accordingly, even when a context switch occurs, the CPU 12 can normally stop and resume the execution of the process.

As described above, the CPU 12 includes the RAM 81 that stores therein multiple register sets in each of which a write pointer is associated with a read pointer and notifies the CPU, which is the message transmission source, a register ID indicating a register set. Then, when the CPU 12 obtains a register ID together with a message, the CPU 12 stores the receives message in the message storing area indicated by the write pointer in the register set indicated by the obtained register ID. Furthermore, the other CPUs 13 to 15 execute the same process. Accordingly, the CPUs 12 to 15 can perform the inter process communication without caching the write pointer by the transmission-side CPU; therefore, it is possible to prevent the failure from being propagated to the other CPUs when one of the other CPUs fails.

The CPU 12 has the control resources 60 to 60c, the number of which is the same as that of the processes that can be simultaneously executed. Specifically, the CPU 12 has transmission queues, the number of which is the same as that of the processes that can be simultaneously executed. Furthermore, the CPU 12 stores therein register sets, the number of which is the same as the number of processes that simultaneously transmit a message with respect to a certain process. Specifically, the CPU 12 has reception queues, the number of which is the same as that of the processes that simultaneously transmit a message with respect to a process that is being executed. Accordingly, the CPU 12 can reduce the latency in the inter process communication while preventing an increase in the size of the circuit in accordance with the inter process communication.

Incidentally, in the conventional InfiniBand technology, the inter process communication is performed by using a queue pair that is a combination of transmission queues prepared in the transmission-side hardware and reception queues prepared in the reception-side hardware. Specifically, when the transmission process communicates with the reception process, the transmission process reserves a queue pair that is previously agreed between the processes and then transmission-side processes #1 to #3 write messages into the reserved respective queue pairs. Then, the reception-side processes #1 to #3 obtain the messages from the reserved respective queue pairs.

Figure 27:
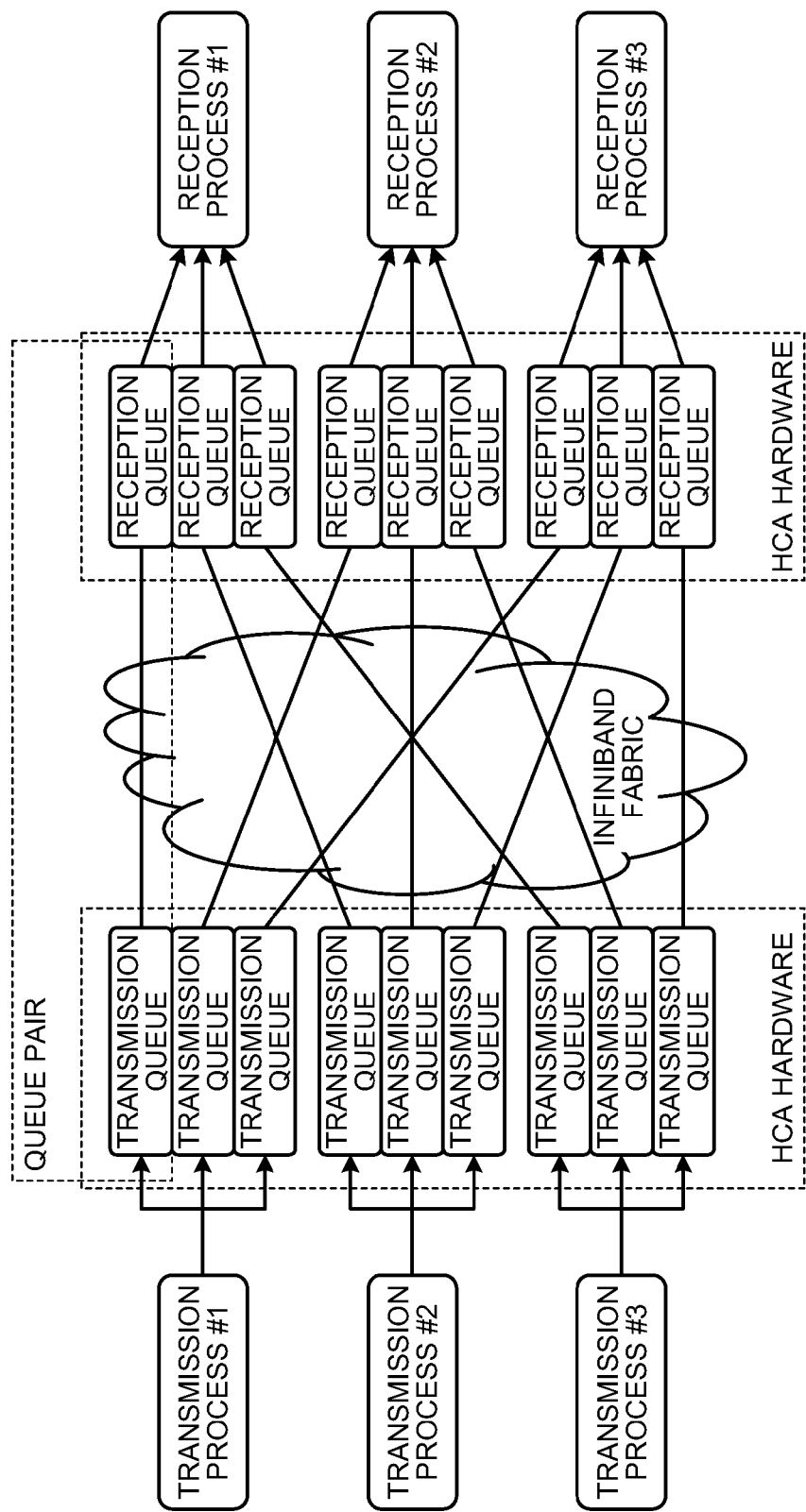
FIG. 27 is a schematic diagram illustrating the function of a queue pair at a conventional InfiniBand.

However, with the conventional InfiniBand technology, a queue pair needs to be prepared for each combination of a transmission process and a reception process. FIG. 27 is a schematic diagram illustrating the function of a queue pair at a conventional InfiniBand. FIG. 27 illustrates an example in which the multiple transmission processes #1 to #3 transmit messages to the multiple reception processes #1 to #3, respectively.

In the example illustrated in FIG. 27, because the transmission processes #1 to #3 and the reception processes #1 to #3 execute the inter process communication, each of a transmission-side Host Channel Adapter (HCA) hardware and a reception-side HCA hardware needs to prepare nine queue pairs. Accordingly, with the conventional InfiniBand technology, the number of resources needed to implement the inter process communication increases.

Figure 28:
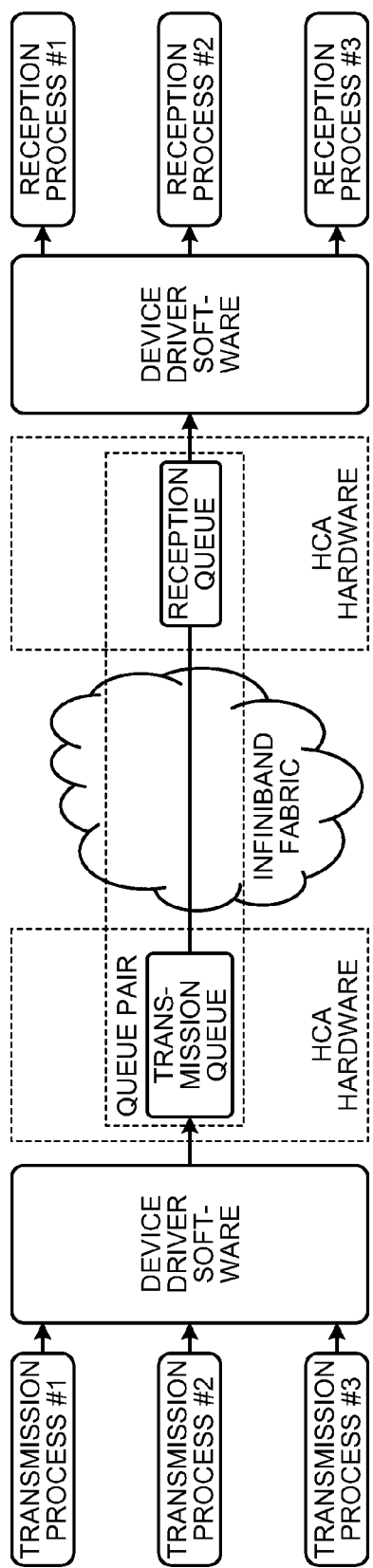
FIG. 28 is a schematic diagram illustrating a process performed when a queue pair is shared between processes.

Furthermore, it is possible to conceive a method for performing the inter process communication, without increasing the number of resources, by a single queue pair sharing multiple processes. FIG. 28 is a schematic diagram illustrating a process performed when a queue pair is shared between processes. As illustrated in FIG. 28, the transmission processes #1 to #3 share a transmission queue in a queue pair via the device driver software. Furthermore, the reception processes #1 to #3 share the reception queue in the queue pair via the device driver software.

For example, the transmission process #1 calls the transmission-side device driver software and request it to write the message to be transmitted to a reception process #2 in the transmission queue. In such a case, the transmission-side device driver software writes the message in the transmission queue. By doing so, the reception-side device driver software reads the message arrived at the reception queue and notifies the reception process #2, which is the destination, of the read message.

However, with a technology for sharing a single queue pair, the transmission-side processes #1 to #3 read the device driver software and request to transmit a message, and the reception-side processes #1 to #3 obtain the message via the device driver software. Accordingly, a context switch occurs every time when the message is transmitted and received, a delay time increases when the inter process communication is performed.

In contrast, because the CPU 12 has the transmission queues, the number of which is the same as that of the processes that can be simultaneously executed, a lack of queue does not occur when each process transmits a message. Furthermore, because the CPU 12 has the reception queues, the number of which is the same as that of the processes that simultaneously transmit a message with respect to the process that is being executed, a lack of queue does not occur when the message is received. Accordingly, the CPU 12 can perform the inter process communication without increasing the delay time occurring when the inter process communication is performed without preparing a queue pair used among all of the processes.

Figure 29:
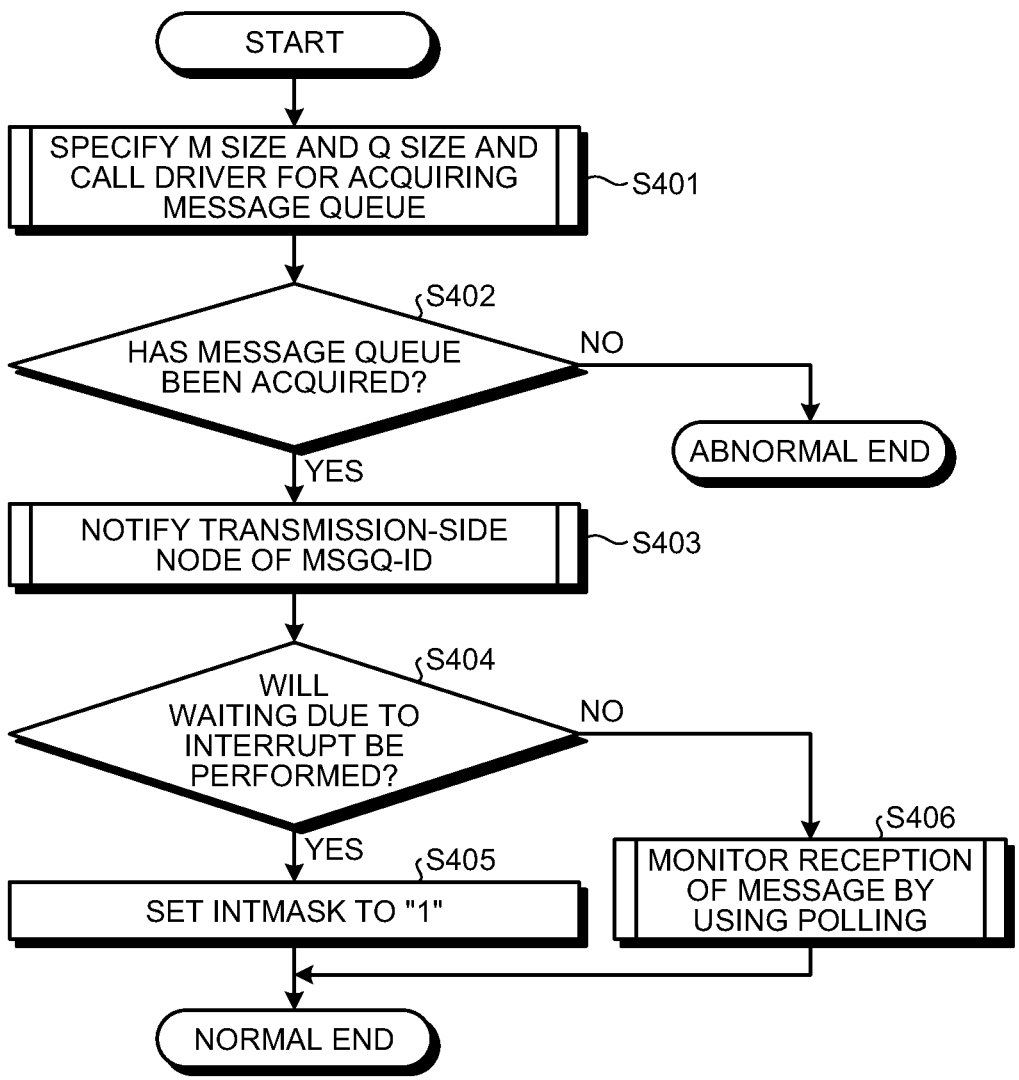
FIG. 29 is a flowchart illustrating the flow of a process performed when a new message queue is acquired.

In the following, the flow of a process executed by the process executed by the CPU 12 will be described with reference to FIGS. 29 to 32. First, the flow of a process executed by the process that has acquired a new message queue will be described with reference to FIG. 29. FIG. 29 is a flowchart illustrating the flow of a process performed when a new message queue is acquired.

First, the process specifies the M size and the Q size and calls the driver 33 that is used to acquire a message queue (Step S401). Then, the process determines whether a message queue has been acquired (Step S402). If a message queue has not been acquired (No at Step S402), the process issues an abnormal-end notification.

In contrast, if a message queue has been acquired (Yes at Step S402), the process notifies the process, which is executed by the transmission-side node, of the MSGQ-ID (Step S403). Subsequently, the process determines whether the process waits to receive the message due to an interrupt (Step S404). If the process waits to receive the message due to an interrupt (Yes at Step S404), the process sets the INT-MASK to "1" (Step S405) and ends the process. in contrast, if the process does not wait to receive the message due to an interrupt (No at Step S404), the process monitors the reception of the message by using the polling (Step S406) and ends the process.

Figure 30:
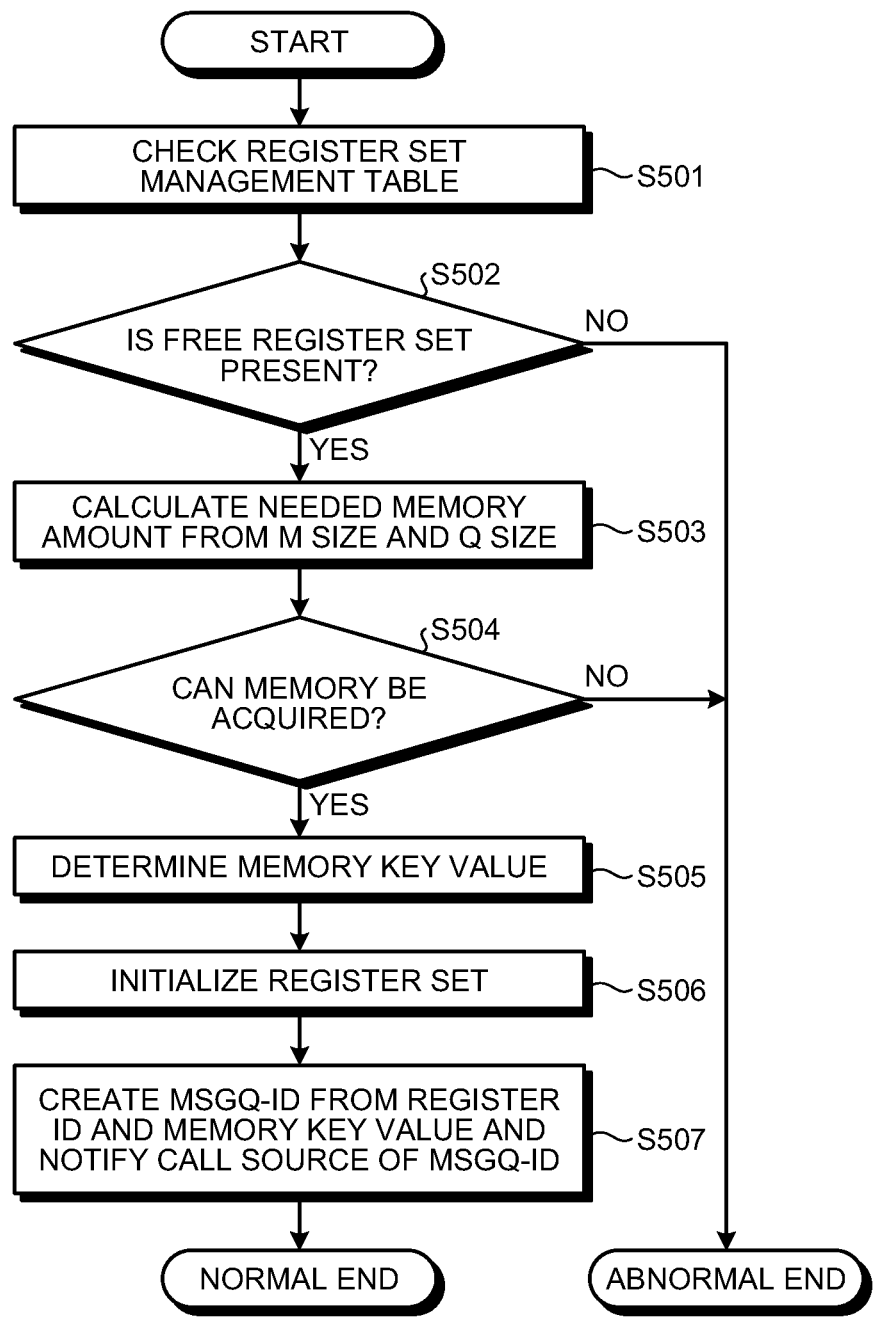
FIG. 30 is a flowchart illustrating the flow of a process for acquiring a new message queue by a driver.

In the following, a process for acquiring, by the driver 33, a message queue will be described with reference to FIG. 30. FIG. 30 is a flowchart illustrating the flow of a process for acquiring a new message queue by a driver. The process illustrated in FIG. 30 is a process executed by the driver called at Step S401 illustrated in FIG. 29.

For example, the driver 33 checks the register set management table that indicates the allocation of the register sets stored in the RAM 81 with respect to the processes (Step S501). The register set management table is stored in, for example, the memories 18 and 19. Then, the driver 33 determines whether a free register set to which no process is allocated is present (Step S502).

If a free register set is present (Yes at Step S502), the driver 33 acquires the free register set and calculates, from the specified M size and the Q size, the capacity needed for the message storing area (Step S503). Then, the driver 33 determines whether the memory having the calculated capacity can be acquired (Step S504). If the driver 33 can acquire the subject memory (Yes at Step S504), the driver 33 determines a value of the memory key (Step S505).

Subsequently, the driver 33 initializes the acquired free register set (Step S506), creates a MSGQ-ID from the register ID indicated by the acquired register set and the value of the memory key, notifies the process, which is the call source, of the MSGQ-ID (Step S507), and ends the process. In contrast, if a free register set is not present (No at Step S502) or a memory is not acquired (No at Step S504), the driver 33 notifies the process, which is the call source, that a message queue is not acquired and then abnormally ends the process.

Figure 31:
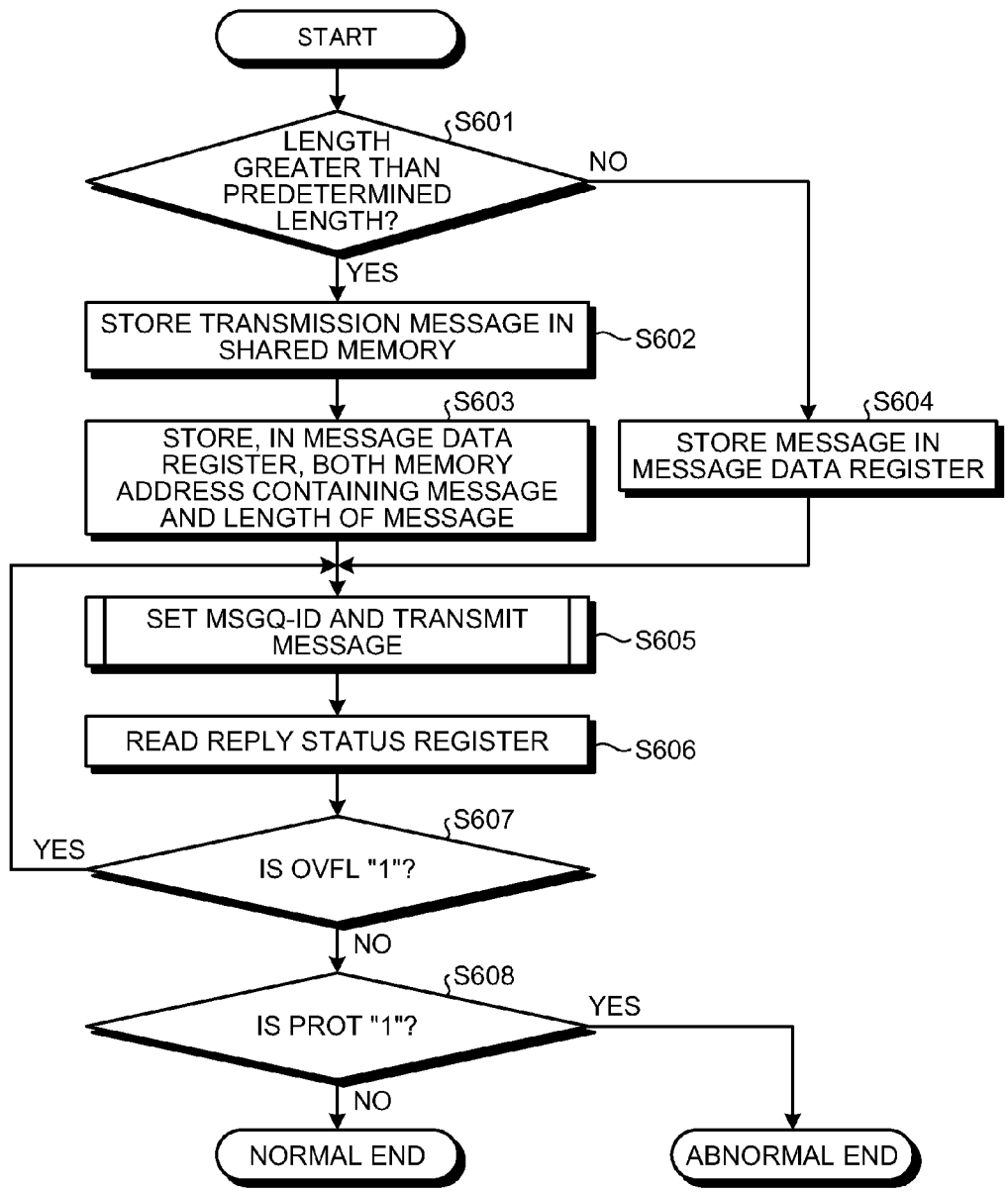
FIG. 31 is a flowchart illustrating the flow of a message transmission process in a transmission-side CPU.

In the following, the flow of a process performed by the CPU 12 transmitting a message will be described with reference to FIG. 31. FIG. 31 is a flowchart illustrating the flow of a message transmission process in a transmission-side CPU. First, the CPU 12 determines whether the length of the message to be transmitted is greater than a predetermined bit length (Step S601).

If the length of the message is greater than the predetermined bit length (Yes at Step S601), the CPU 12 stores the transmission message in the shared memory (Step S602). Then, the CPU 12 stores, in the message data register 61, both the memory address containing the message and the length of the message (Step S603). In contrast, if the CPU 12 determines that the length of the message is not greater than the predetermined bit length (No at Step S601), the CPU 12 stores the message in the message data register (Step S604).

Then, the CPU 12 sets the MSGQ-ID and transmits the message (Step S605). Subsequently, the CPU 12 reads the reply status register 66 (Step S606) and determines whether the OVFL is "1" (Step S607). Specifically, the CPU 12 determines whether an overflow occurs. Then, if the CPU 12 determines that the OVFL is "1" (Yes at Step S607), the CPU 12 executes Step S605 again. In contrast, if the CPU 12 determines that the OVFL is not "1" (No at Step S607), the CPU 12 determines whether the PROT is "1" (Step S608).

Specifically, the CPU 12 determines whether the value of the memory key matches the value of the access key. If the CPU 12 determines that the PROT is "0" (No at Step S608), the CPU 12 normally ends the process. If the CPU 12 determines that the PROT is "1" (Yes at Step S608), the CPU 12 issues an abnormal-end notification to the process that is being executed and then ends the process.

Figure 32:
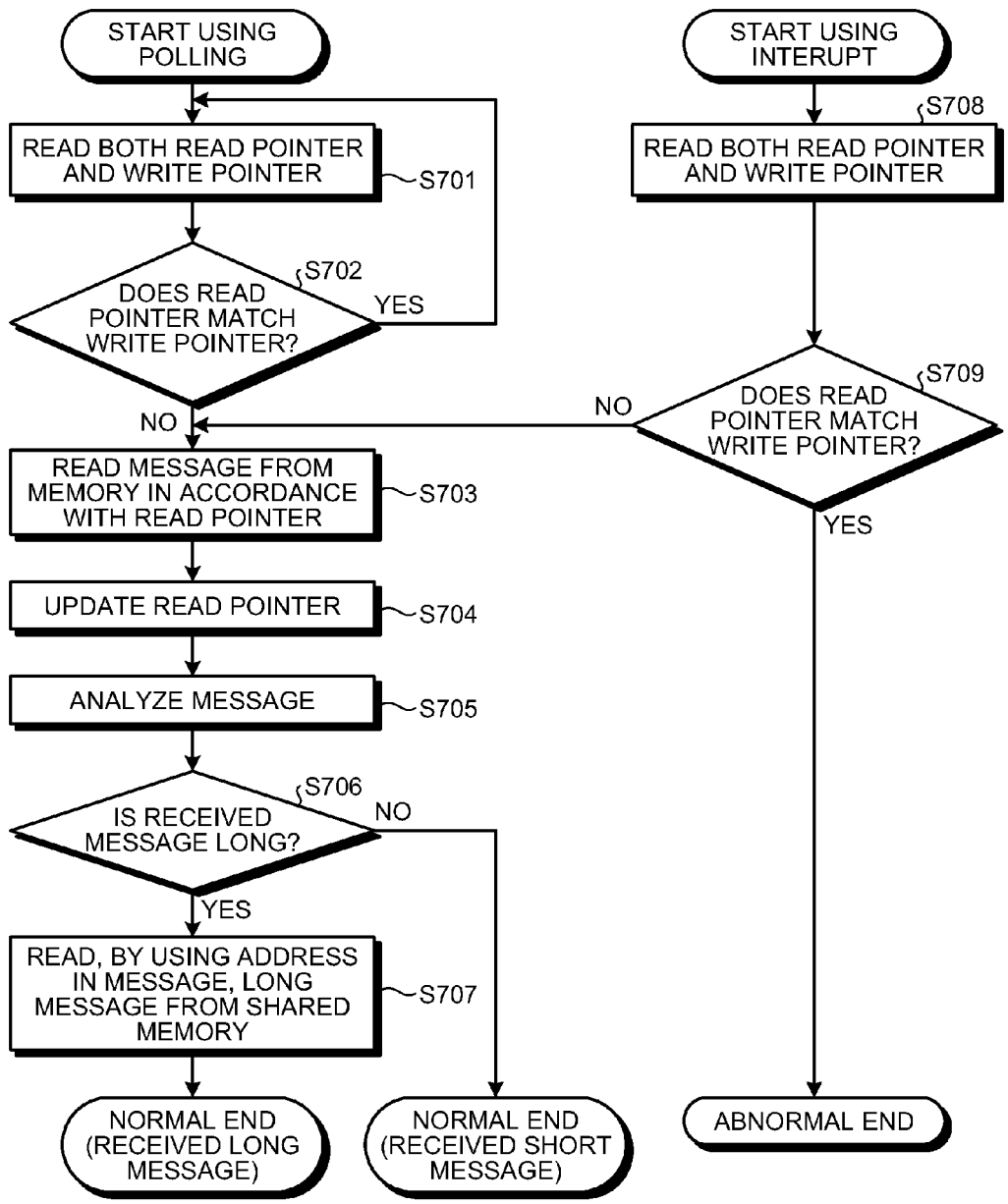
FIG. 32 is a flowchart illustrating the flow of a message reception process in a reception-side CPU.

In the following, the flow of a process performed when the CPU 12 receives a message will be described with reference to FIG. 32. FIG. 32 is a flowchart illustrating the flow of a message reception process in a reception-side CPU. FIG. 32 illustrates an example of a case in which the reception of a message is waited by using the polling and a case in which the reception of a message is identified due to an interrupt request, which are illustrated side by side.

For example, if the reception of a message is waited by using the polling, the CPU 12 reads a read pointer and a write pointer (Step S701). Then, the CPU 12 determines whether the read pointer matches the write pointer (Step S702). If the CPU 12 determines that the read pointer matches the write pointer (Yes at Step S702), the CPU 12 again executes the process at Step S701. In contrast, if the CPU 12 determines that the read pointer does not match the write pointer (No at Step S702), the CPU 12 reads a message from the memory in accordance with the read pointer (Step S703).

Then, the CPU 12 updates the value of the read pointer (Step S704), and analyzes the received message (Step S705). Then, in accordance with whether the received message contains a memory address, the CPU 12 determines whether the received message is long (Step S706). If the CPU 12 determines that the received message is long (Yes at Step S706), the CPU 12 reads, by using the address in the message, a long message from the shared memory (Step S707) and ends the process. In contrast, if the CPU 12 determines that the received message is not long (No at Step S706), the CPU 12 ends the process.

Furthermore, if the CPU 12 identifies the reception of a message due to an interrupt notification, the CPU 12 reads a read pointer and a write pointer triggered when an interrupt request is issued (Step S708). Then, the CPU 12 determines whether the read pointer matches the write pointer (Step S709). If the CPU 12 determines that the read pointer matches the write pointer (Yes at Step S709), the CPU 12 issues an abnormal-end notification and ends the process. In contrast, if the CPU 12 determines that the read pointer does not match the write pointer (No at Step S709), the CPU 12 ends the process at Step S703.

Advantage of the First Embodiment

As described above, the CPU 12 stores therein multiple register sets in each of which a write pointer are associated with a read pointer and notifies the node, which is arranged on the message transmission side, of the register ID that is used to identify the register set. Then, if the CPU 12 receives a message and the register ID, the CPU 12 stores the received message in the memories 17 or 18 in accordance with the write pointer in the register set indicated by the received register ID.

Accordingly, in the inter process communication that uses the multi node system technology that uses a shared memory, the CPU 12 can prevent a failure from being propagated to the other nodes when a node fails. Specifically, when the CPU 12 transmits a message, the CPU 12 can appropriately transmit a message without caching a write pointer. Accordingly, the CPU 12 can prevent a case in which a failure is propagated to the other CPUs 13 to 15 when the CPU 12 fails.

Furthermore, the CPU 12 has the control resources 60 to 60c, the number of which is the same as that of the processes that can be simultaneously executed. Accordingly, the CPU 12 can transfer a message without increasing the delay time when the process reserves a queue.

Furthermore, if the process that is being executed transmits a message to the other node, the CPU 12 stops the progress of the program of the running process until a reply to the message is received. For example, if the CPU 12 stores a message in the memories 17 or 18, the CPU 12 has a function of transmitting a reply to the transmission source of the message. Then, the CPU 12 stops the program executed in the core during the time period from when the process stores "1" in the issue-request flag register 63 until when "1" is stored in the reply reception flag register 68 and the request completion notification is transmitted to the core. Accordingly, when the process reads the reply status register 66, the process reads the reply status with respect to the message transmitted by the CPU 12.

Furthermore, the CPU 12 stores therein pointer sets, the number of which is equal to that of the processes that transmit a message to the process executed by the CPU 12 or the number of which is greater than that of the processes that transmit a message to the process executed by the CPU 12. Accordingly, the CPU 12 can implement the inter process communication without preparing queues for all of the combinations of the processes to be executed. Accordingly, the CPU 12 can prevent an increase in the delay time in the inter process communication without increasing the size of the circuit.

Furthermore, with the CPU 12, the process directly writes a message into the message data register 61. Furthermore, when a message is received, the CPU 12 directly writes the message into the message storing area without calling the device driver. Accordingly, because a delay due to the overhead does not occur when a context switch for calling the device driver is performed, the CPU 12 can satisfactorily maintain the latency performance in the inter process communication.

Furthermore, if a message is long, the CPU 12 stores the message in the shared memory 18, memory 20, memory 22, or memory 24 and transmits the memory address containing the long message instead of transmitting the message. Then, when the CPU 12 receives the memory address instead of the message, the CPU 12 acquires the long message from the storage area, between the memory 18, memory 20, memory 22, or memory 24, indicated by the received memory address. Accordingly, even when the length of a message is greater than a predetermined threshold, the CPU 12 can perform inter process communication without increasing the latency.

Furthermore, the CPU 12 notifies the node arranged on the message transmission side of an access key. Then, the CPU 12 determines whether the access key that is received together with the message from the node arranged on the message transmission side matches the memory key that is stored by the CPU 12. If the CPU 12 determines that they do match, the CPU 12 stores the message in the message storing area. Accordingly, the CPU 12 can prevent a program error and the destruction of a message due to a malicious program.

Furthermore, the CPU 12 stores multiple register sets in the RAM 81. Then, the CPU 12 temporarily stores, in the temporary register group 82, a register set indicated by the register ID that is received together with the message. Accordingly, because the CPU 12 does not need to have many registers that stores therein the register sets, the inter process communication can be implemented without increasing the size of the circuit.

Furthermore, when the CPU 12 stores a message, the CPU 12 updates the value of the write pointer. Furthermore, the CPU 12 determines whether a value of the write pointer matches a value of the read pointer. If the CPU 12 determines that the values do not match, the CPU 12 reads a message from the memories 17 or 18 in accordance with the read pointer. Accordingly, the CPU 12 can wait the reception of the message without performing a complicated process.

[b] Second Embodiment

In the first embodiment described above, if the OVFL stored in the reply status register is "1", the process executed by the CPU 12 determines that an overflow has occurred and retransmits the message; however, the embodiment is not limited thereto.

Specifically, with the CPU 12 according to the first embodiment, if a process continuously executes the transmission of messages, the CPU 12 may possibly waste the processing time. For example, if the reception-side node executes a certain process for a long time, the CPU 12 does not recognize when a reception-side message queue is released. Accordingly, the CPU 12 continues transmitting messages until the reception-side message queue is released.

Accordingly, when a CPU 12a according to a second embodiment transmits a message, if the CPU 12a receives a reply indicating an overflow state, the CPU 12a eliminates a waste of the processing time by stopping the process that transmits the message and executing another process.

Figure 33:
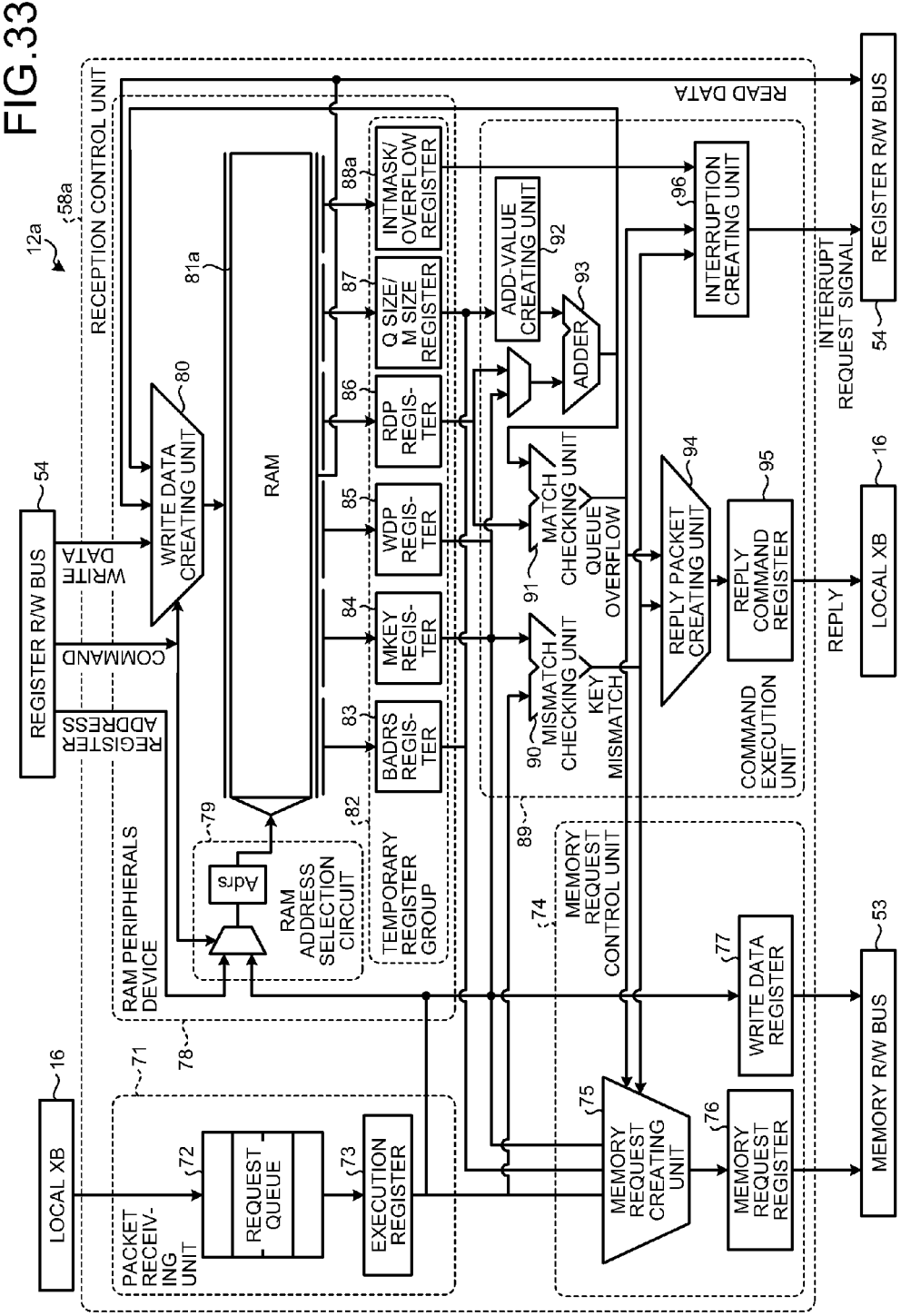
FIG. 33 is a schematic diagram illustrating the functional configuration of a reception control unit according to a second embodiment.

In the following, the CPU 12a according to the second embodiment will be described with reference to the drawing. FIG. 33 is a schematic diagram illustrating the functional configuration of a reception control unit according to a second embodiment. The units illustrated in FIG. 33 having the same function as those in the first embodiment are assigned the same reference numerals illustrated in FIG. 15; therefore, descriptions thereof will be omitted. The CPU 12a has the same configuration as the CPU 12 in the first embodiment. In the example illustrated in FIG. 33, the CPU 12a includes a reception control unit 58a.

The reception control unit 58a has the same function as that performed by the reception control unit 58 according to the first embodiment and includes, similarly to the RAM 81, a RAM 81a that stores therein multiple register sets. Furthermore, in the reception control unit 58a, an INTMASK/overflow register 88a is used instead of the INTMASK register 88 in the temporary register group 82 included in the reception control unit 58.

In the following, the register set stored in the RAM 81a will be described with reference to FIGS. 34 and 35. FIG. 34 is a schematic diagram illustrating the definition of a field in a RAM according to the second embodiment. As illustrated in FIG. 34, the RAM 81a stores therein an overflow bit (OVFL bit) in addition to the register sets stored in the RAM 81 according to the first embodiment. Specifically, the RAM 81a uses the $77^{th}$ bit in the 83-bit entry as the OVFL bit and stores the same information as that stored in the register sets according to the first embodiment in the other 82 bits.

FIG. 35 is a schematic diagram illustrating the content of data stored in the field in the RAM according to the second embodiment. As illustrated in FIG. 35, the RAM 81a stores therein the 1-bit OVFL bit indicating whether an overflow of a queue has occurred when a message is received. As illustrated in FIG. 35, the other information stored in the RAM 81a is the same as that stored in the RAM 81; therefore, a description thereof will be omitted.

In the following, the INTMASK/overflow register 88a will be described with reference to FIG. 36. FIG. 36 is a schematic diagram illustrating an example of addresses in a reception control unit according to the second embodiment viewed from the software side. For example, the INTMASK/overflow register 88a is a register that stores therein, in addition to the INTMASK, the OVFL bit indicating whether an overflow of a queue has occurred when a message is received.

As illustrated in FIG. 36, similarly to the other registers 83 to 87, an address is provided to the INTMASK/overflow register 88a when viewed from another piece of software. In the example illustrated in FIG. 36, similarly to the first embodiment, the addresses "0x10" to "0x17" are provided to a region in which the INTMASK/overflow register 88a stores the INTMASK. Furthermore, the addresses "0x40" to "0x47" are provided to a region in which the INTMASK/overflow register 88a stores the OVFL bit.

In the following, by referring back to FIG. 33, a process executed by the reception control unit 58a will be described. For example, when the reception control unit 58a receives a message from the local XB 16, the reception control unit 58a determines, by using the match checking unit 91, whether a new message can be stored in the message storing area that stores therein received messages. Specifically, when the reception control unit 58a receives a message, the reception control unit 58a determines whether an overflow has occurred.

If the overflow has occurred, by defining the reply OVFL bit as "1", the reception control unit 58a notifies the node on the message transmission side of the occurrence of the overflow. Furthermore, from among multiple pieces of information stored in the RAM 81a, the reception control unit 58a defines the OVFL bit in the entry, which is indicated by the register ID and received together with the message, as "1".

Furthermore, when the read pointer is updated by the write request with respect to the update register, if the OVFL bit is "1", the reception control unit 58a outputs an interrupt request signal by using the interruption creating unit 96. In such a case, the driver 33 transmits a free space available notification to the message transmission source node that has not stored a message in the message storing area due to an overflow.

FIG. 37 is a schematic diagram illustrating a process for updating a field in the RAM according to the second embodiment. As illustrated in FIG. 37, when the RAM peripherals device 78 initializes the entry, the RAM peripherals device 78 updates the OVFL bit to "0", and, when the RAM peripherals device 78 writes a message, the RAM peripherals device 78 updates the value of the OVFL bit to an update value. Specifically, if an overflow has occurred when a message is written, the RAM peripherals device 78 stores "1", whereas if an overflow has not occurred, the RAM peripherals device 78 stores "0". Furthermore, when the RAM peripherals device 78 changes the interrupt mask or reads a message, the RAM peripherals device 78 makes the value of the OVFL bit constant. Furthermore, the RAM peripherals device 78 performs the same processes as those illustrated in FIG. 20 on the information indicated in the fields other than the OVFL bit illustrated in FIG. 37; therefore, a description thereof will be omitted.

Figure 38:
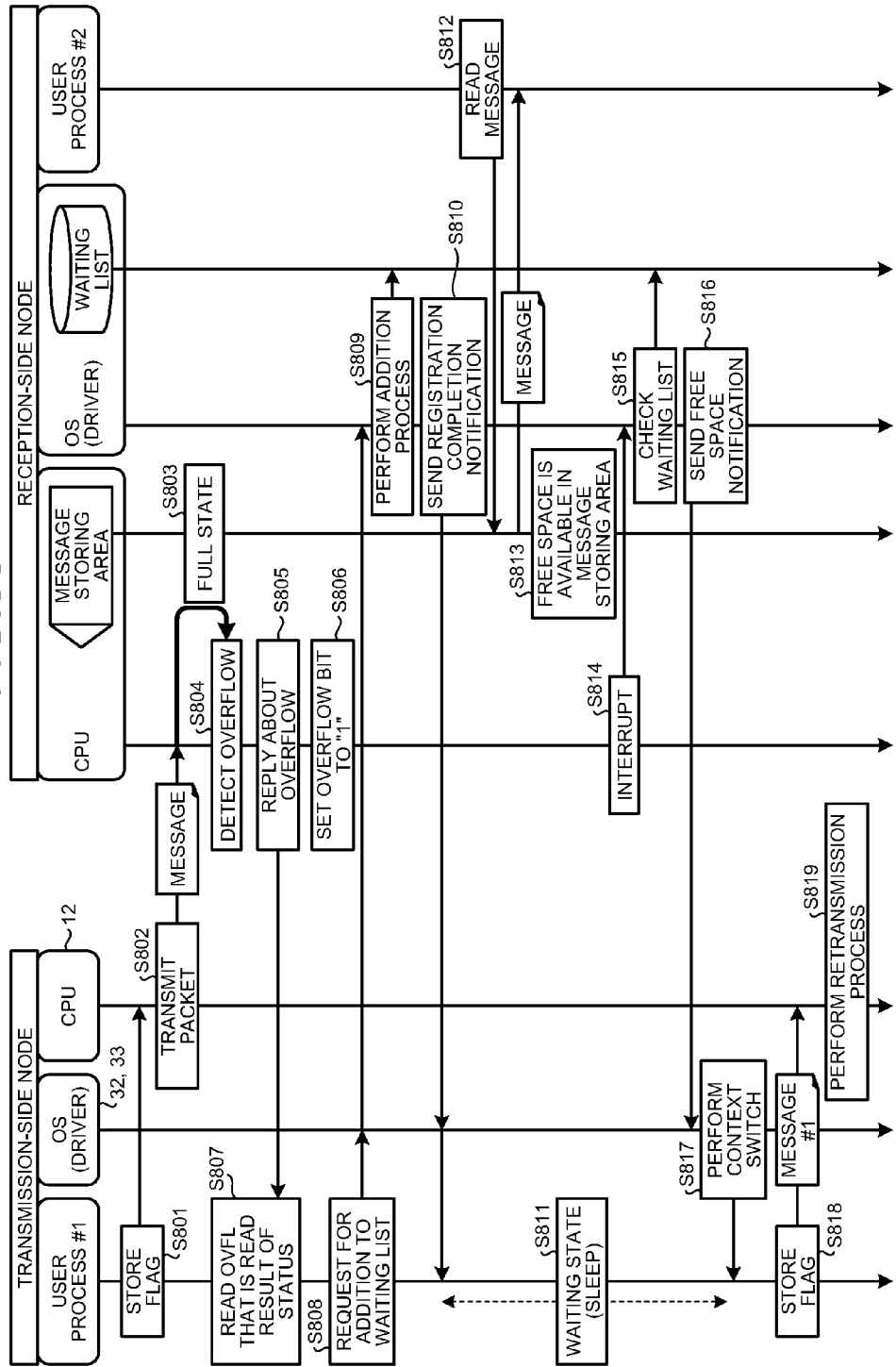
FIG. 38 is a sequence diagram illustrating the flow of a process performed when an overflow occurs in the second embodiment.

In the following, the operation of the process executed by the CPU 12a when an overflow has occurred will be described with reference to FIG. 38. FIG. 38 is a sequence diagram illustrating the flow of a process performed when an overflow occurs in the second embodiment.

For example, by storing the flag "1" in the issue-request flag register 63, the user process #1 instructs the CPU 12a to transmit a message (Step S801). Then, the CPU 12a transmits a packet containing the message to the reception-side node (Step S802). Furthermore, because the message storing area in the CPU included in the reception-side node is in the FULL state (be filled) (Step S803), an overflow is detected (Step S804).

Then, the CPU included in the reception-side node transmits a reply in which the OVFL bit is "1" to the CPU 12a (Step S805). Furthermore, the CPU included in the reception-side node sets the overflow bit related to the transmitted message occurring in the RAM 81a to "1" (Step S806). Then, the user process #1 reads the value of the reply status register 66 and detects the OVFL bit. (Step S807). Thereafter, the user process #1 transmits a request for addition of the user process #1 to a waiting list to the driver executed by the reception-side node (Step S808).

Then, the driver executed by the reception-side node adds the user process #1 to the waiting list (Step S809). Then, the driver executed by the reception-side node transmits, to the user process #1, a completion notification of the registration in the waiting list (Step S810). Then, the user process #1 shifts its state to the waiting state (sleep) (Step S811). During this time period, the CPU 12a may also execute a process other than the user process #1.

In the following, the user process #2 executed by the reception-side node reads the message (Step S812). Then, the CPU in the reception-side node determines that the message storing area has free space (Step S813); detects a transmission-side process that is in the sleep state because the process detects the overflow from the state in which the overflow bit in the RAM 81a is "1"; and notifies the driver of the interrupt process (Step S814). Then, the driver in the reception-side node checks the waiting list (Step S815) and determines that the user process #1 has been registered in the waiting list.

Consequently, the driver in the reception-side node sends a free space available notification to the driver 33 (Step S816). Then, the driver 33 executes a context switch (Step S817) and operates the user process #1. Consequently, the user process #1 stores the message #1 in the message data register 61 and stores the flag "1" in the issue-request flag register 63 (Step S818). Then, the CPU 12a retransmits the message #1 (Step S819).

Figure 39:
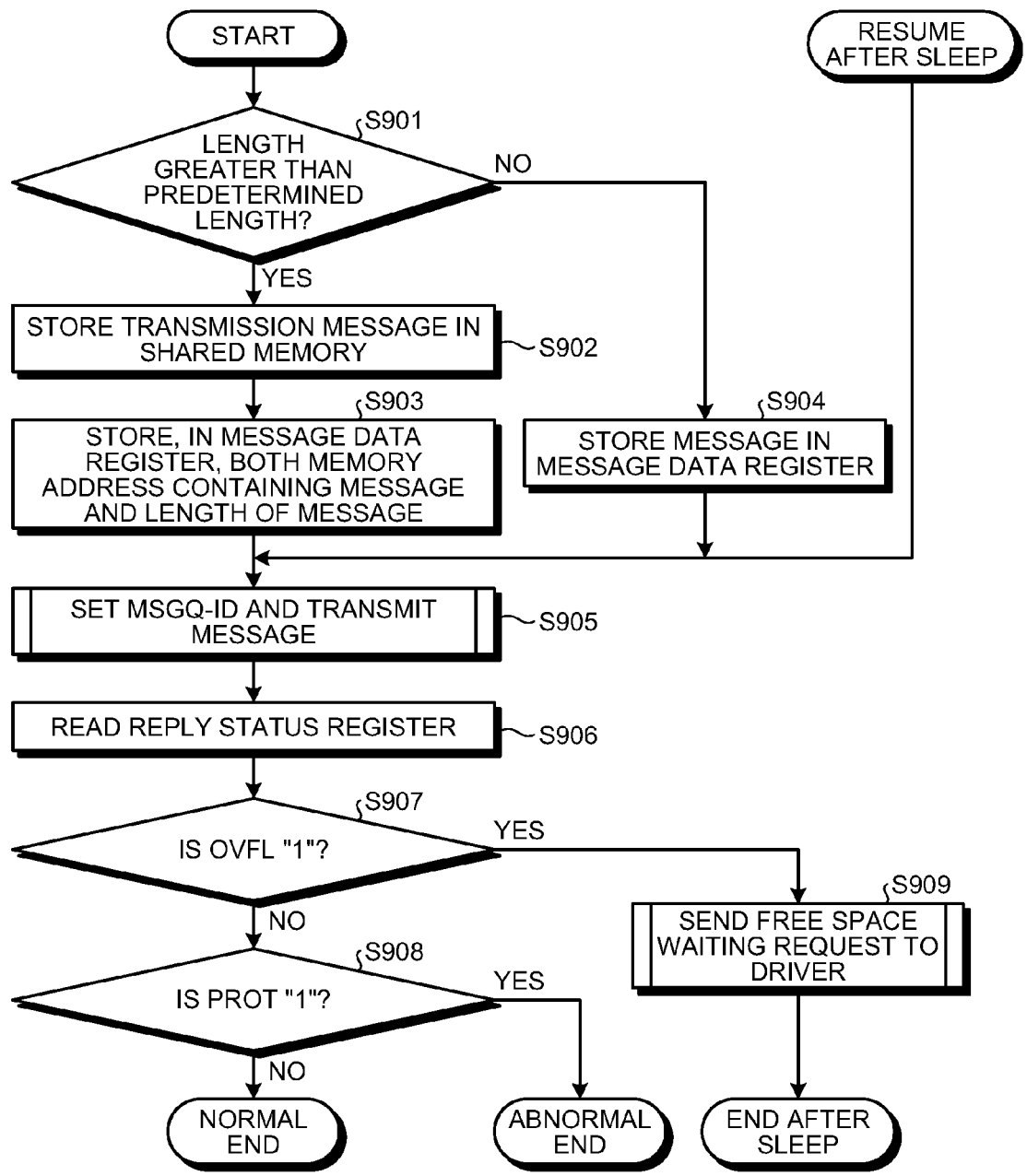
FIG. 39 is a flowchart illustrating the flow of a process performed by a CPU according to the second embodiment when an overflow occurs.
Figure 40:
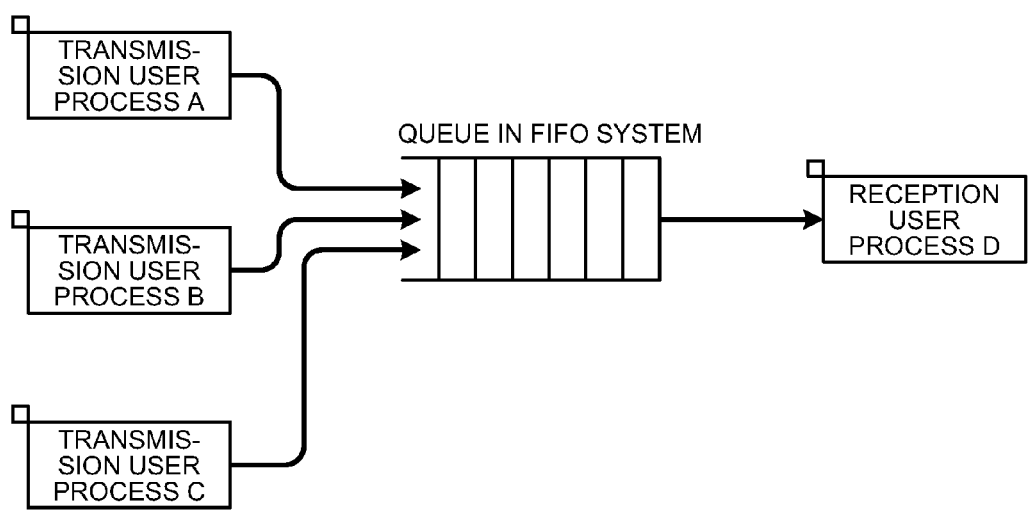
FIG. 40 is a schematic diagram illustrating the concept of inter process communication performed by conventional software.
Figure 41:
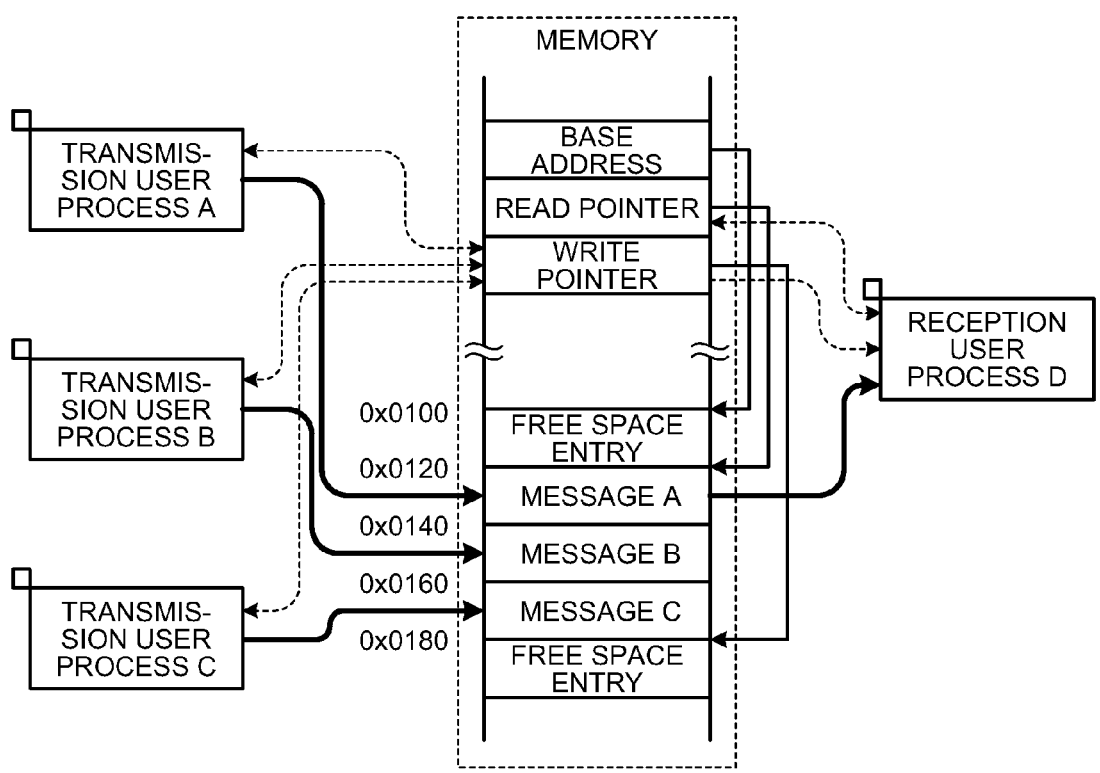
FIG. 41 is a schematic diagram illustrating a process performed as inter process communication by using the conventional software.
Figure 42:
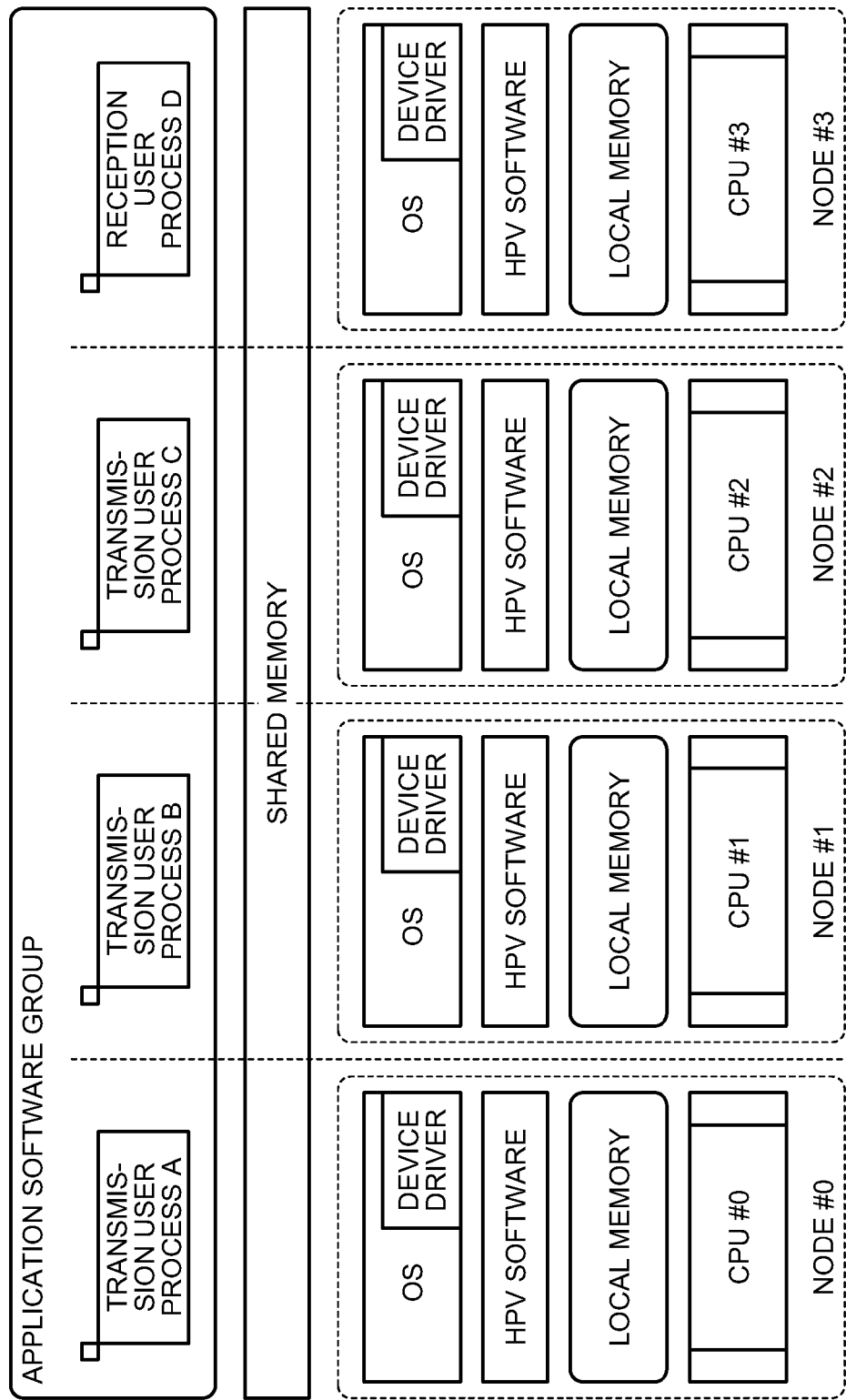
FIG. 42 is a schematic diagram illustrating the concept of a multi node system using a shared memory.
Figure 43:
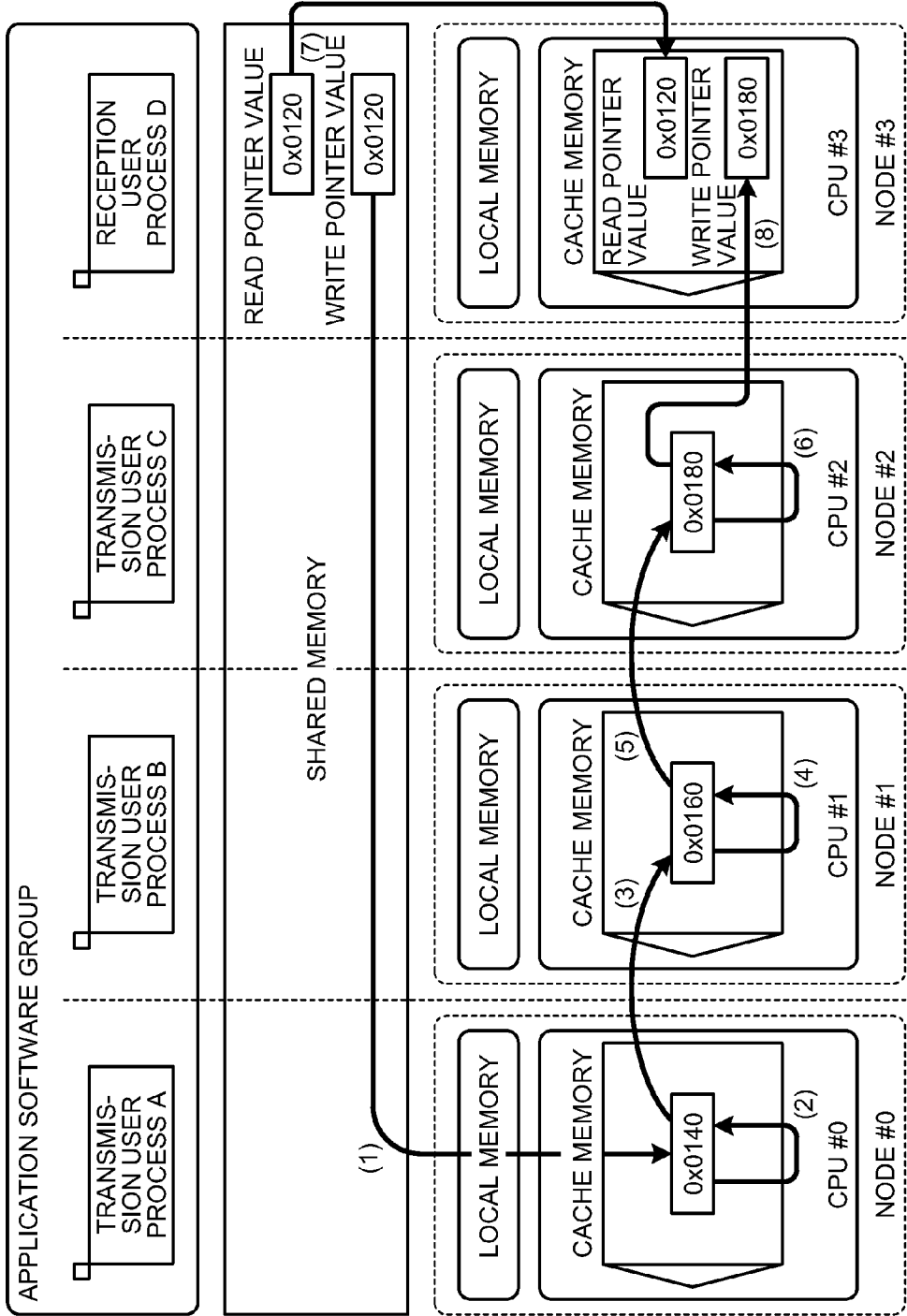
FIG. 43 is a schematic diagram illustrating a process in which a write pointer is cached by each node.
Figure 44:
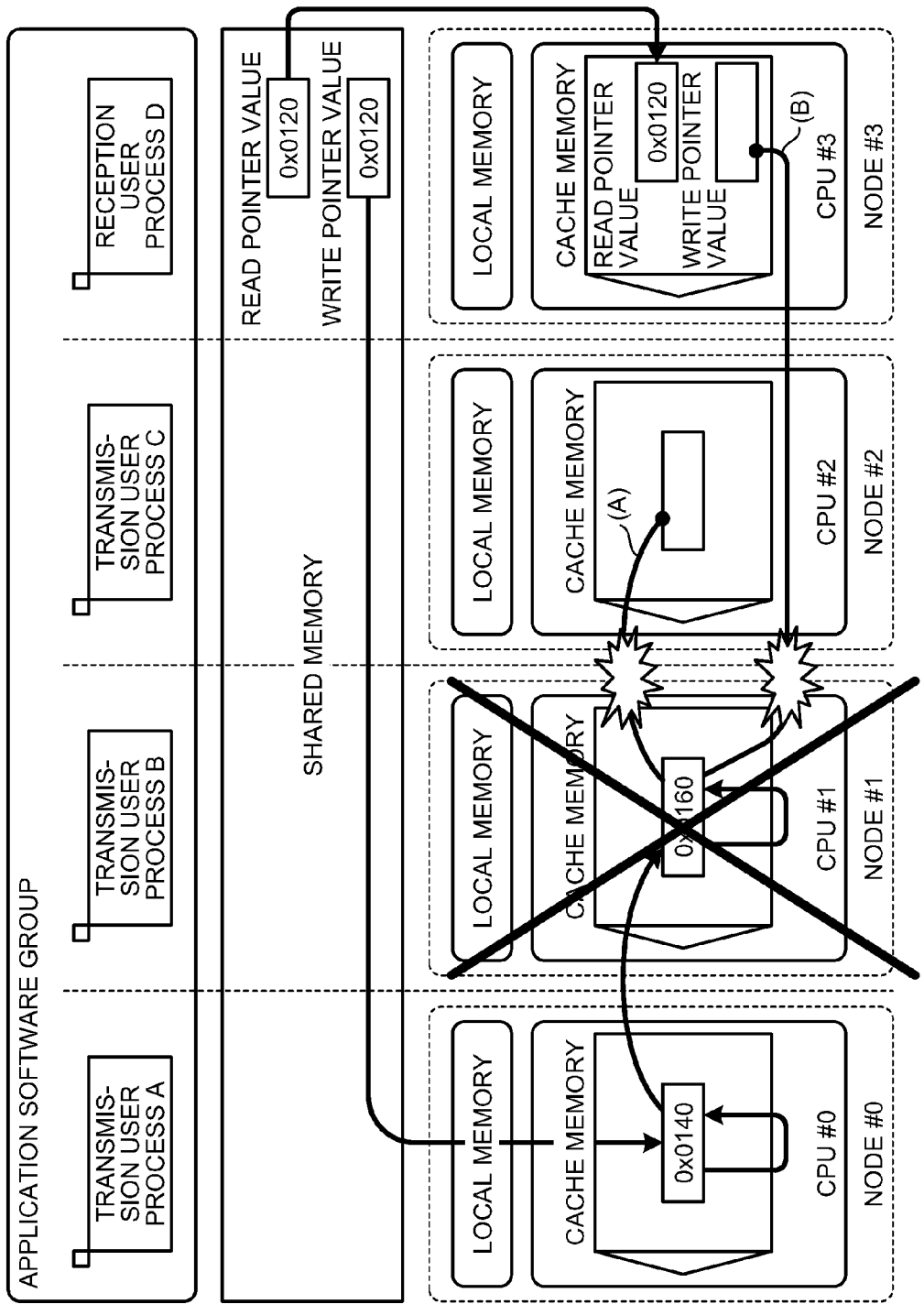
FIG. 44 is a schematic diagram illustrating the flow in which a failure is propagated to another node when a failure has occurred in a node.

In the following, the flow of a process executed by the CPU 12a when an overflow occurs will be described with reference to FIG. 39. FIG. 39 is a flowchart illustrating the flow of a process performed by a CPU according to the second embodiment when an overflow occurs. The processes performed at Steps S901 to S908 illustrated in FIG. 39 are the same as those performed at Steps S601 to S608 illustrated in FIG. 31; therefore, descriptions thereof will be omitted.

For example, if the OVFL bit is "1", the CPU 12a sends a free space waiting request to the driver 33 (Step S909). Then, the driver 33 transmits a request for addition of a process to a waiting list to the node that is the message destination. Then, the CPU 12a allows the process to be executed to sleep and ends the process. In contrast, when the CPU 12a receives a free space available notification from the node that is the message destination, the CPU 12a allows the process to resume its operation from the sleep state and executes the process at Step S905. The other processes performed other than the above are the same as those performed illustrated in FIG. 31; therefore, descriptions thereof will be omitted.

Advantage of the Second Embodiment

As described above, the CPU in the reception-side node transmits a reply containing the OVFL bit and sets the overflow bit stored in the RAM 81a. Then, if the OVFL bit contained in the reply that is notified by the message destination node indicating that a new message is not received, the CPU 12a executes the following process. Namely, the CPU 12a transmits, to the message destination node, a request for adding a process to the waiting list, stops the process for transmitting the message, and executes another process.

Then, if the CPU 12a receives a free space available notification from the message destination node, the CPU 12a executes the stopped process and retransmits the message. Accordingly, the CPU 12a can eliminate a waste of the processing time.

[c] Third Embodiment

In the above explanation, a description has been given of the embodiments according to the present invention; however, the embodiments are not limited thereto and the present invention can be implemented with various kinds of embodiments other than the embodiments described above. Accordingly, in the following, another embodiment included in the present invention will be described as a third embodiment.

(1) Information Stored in the RAM

The CPUs 12 and 12a described above include the RAMs 81 and 81a, respectively, that store therein the register sets; however, the embodiments are not limited thereto. For example, the CPUs 12 and 12a may also include, in practice, a register that stores therein each of the register sets. Furthermore, the CPUs 12 and 12a may also store the register sets read from the RAMs 81 and 81a, respectively, in buffers, such as FFs, instead of the temporary register group 82.

(2) Message Storing Area

The CPUs 12 and 12a described above set a message storing area in the memories 17 or 18; however, the embodiments are not limited thereto. For example, the CPUs 12 and 12a may also set a message storing area in a shared memory area that is shared by the other CPUs 13 to 15.

(3) Control Resources

The CPU 12 described above includes the control resources 60 to 60c for the cores 40 to 40b, respectively. However, the embodiments are not limited thereto. For example, if each of the cores 40 to 40b can execute two processes by using the threading technology, each of the cores 40 to 40b may also include two control resources. Furthermore, for example, when the core 40b is allowed to execute only the process that does not perform the inter process communication with the other processes by limiting the process executed by the core 40b, the CPU 12 does not use the control resource included in the core 40b.

According to an aspect of the present invention, in the inter process communication that uses a multiple node system technology, when a failure occurs in a node, the failure is prevented from being propagated to other nodes.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus including a plurality of nodes, wherein a node among the nodes comprises:
a processor;
a storage device;
a storing unit that stores a pointer set in which a write pointer indicating an address used when data received from another node is stored in the storage device is associated with a read pointer indicating an address used when the data is read from the storage device, the pointer set being indicated by a pointer identifier, wherein the storing unit comprises a memory that stores therein a plurality of pointer sets, the number of which is equal to or greater than the number of processes that are executed within the node and simultaneously receive data from other nodes, and an acquiring unit that acquires, from the memory, a pointer set indicated by a pointer identifier received from a node corresponding to a transmission source of data;
a notifying unit that notifies a node corresponding to a transmission source of the data of a pointer identifier;
a retaining unit that retains, when both the data and the pointer identifier notified by the notifying unit are received from the node corresponding to the transmission source of the data, the received data in the storage device in accordance with an address indicated by a write pointer in a pointer set acquired from the memory by the acquiring unit, the pointer set being indicated by the received pointer identifier; and
a plurality of transmitting units, the number of which is the same as the number of processes that can be simultaneously executed by the processor, each transmit both the pointer identifier notified by a node corresponding to a destination and the data to the node corresponding to the destination.

2. The information processing apparatus according to claim 1, wherein each of the nodes further comprises:
a stopping unit that, when a process that is being executed transmits the data to the node corresponding to the destination, stops progress of a program of the process until a reply to the data is received.

3. The information processing apparatus according to claim 1, wherein each of the nodes further comprises:
a replying unit that transmits a reply to the node corresponding to the transmission source of the data when the retaining unit retains the data in the storage device.

4. The information processing apparatus according to claim 1, further including a shared memory that is shared by each of the nodes, wherein
a transmitting unit among the plurality of transmitting units stores data in the shared memory and transmits pointer identifier and a memory address of the shared memory that stores therein the data to the node corresponding to the destination of the data,
the retaining unit retains, when both the pointer identifier and the memory address are received, the received memory address in accordance with an address indicated by the write pointer in the pointer set indicated by the pointer identifier, and
a process executed by the node corresponding to the destination of the data obtains the data from the shared memory in accordance with the memory address that is retained in the storage device by the retaining unit.

5. The information processing apparatus according to claim 1, wherein
the storing unit stores therein, for each pointer set, key information,
the notifying unit notifies the node corresponding to the transmission source of the data of both the pointer identifier and the key information on a pointer set indicated by the pointer identifier,
a transmitting unit among the plurality of transmitting units transmits the pointer identifier, the data, and the key information, and when the key information of a pointer set indicated by the pointer identifier received from the node corresponding to the transmission source of the data stored in the storing unit matches the key information received together with the pointer identifier, the retaining unit retains in the storage device the received data in accordance with the address indicated by the write pointer in the pointer set.

6. The information processing apparatus according to claim 3, wherein the replying unit transmits to the node corresponding to the transmission source of data a reply including an overflow bit indicating whether the node corresponding to the destination can receive a new piece of data, and a transmitting unit among the plurality of transmitting units requests, when the overflow bit notified by the node corresponding to the destination indicating that the new piece of data cannot be received, the node corresponding to the destination of the data to send a notification when the new piece of data can be stored and stops a process for transmitting the data until the notification is received.

7. The information processing apparatus according to claim 1, wherein the storing unit further comprises:

a register that temporarily retains the pointer set acquired by the acquiring unit.

8. The information processing apparatus according to claim 1, wherein each of the nodes further comprises:

an updating unit that updates, when the retaining unit retains in the storage device the data, a value of a write pointer in a pointer set indicated by a pointer identifier that is received together with the data;

a determining unit that determines whether the value of the write pointer matches a value of a read pointer in the pointer set indicated by the pointer identifier; and a reading unit that reads, when the determining unit determines that the value of the write pointer does not match the value of the read pointer, data from the storage device in accordance with an address indicated by the read pointer.

9. An arithmetic device comprising:

a storing unit that stores a pointer set in which a write pointer indicating an address used when data received from another arithmetic device is stored in a storage device is associated with a read pointer indicating an address used when the data is read from the storage device, the pointer set being indicated by a pointer identifier, wherein the storing unit comprises a memory that stores therein a plurality of pointer sets, the number of which is equal to or greater than the number of processes that are executed within the arithmetic device and simultaneously receive data from other arithmetic devices, and an acquiring unit that acquires, from the memory, a pointer set indicated by a pointer identifier received from an arithmetic device corresponding to a transmission source of data;

a notifying unit that notifies an arithmetic device corresponding to a transmission source of data of a pointer identifier;

a retaining unit that retains, when both the data and the pointer identifier notified by the notifying unit are received from the arithmetic device corresponding to the transmission source of the data, the received data in the storage device in accordance with an address indicated by a write pointer in a pointer set acquired from the memory by the acquiring unit, the pointer set being indicated by the received pointer identifier; and a plurality of transmitting units, the number of which is the same as the number of processes that can be simultaneously executed by the arithmetic device, each transmit both the pointer identifier notified by an arithmetic device corresponding to a destination and the data to the node corresponding to the destination.

10. An information transferring method comprising:

storing, in a storing unit of a node, a pointer set in which a write pointer indicating an address used when data received from another node is stored in a storage device is associated with a read pointer indicating an address used when the data is read from the storage device, the pointer set being indicated by a pointer identifier, wherein the storing unit comprises a memory that stores therein a plurality of pointer sets, the number of which is equal to or greater than the number of processes that are executed within the node and simultaneously receive data from other nodes, and an acquiring unit that acquires, from the memory, a pointer set indicated by a pointer identifier received from a node corresponding to a transmission source of data;

notifying a node corresponding to a transmission source of the data of a pointer identifier;

retaining, when both the data and the pointer identifier notified at the notifying are received from the node corresponding to the transmission source of the data, the received data in the storage device in accordance with an address indicated by a write pointer in a pointer set acquired from the memory by the acquiring unit, the pointer set being indicated by the received pointer identifier; and transmitting, by a plurality of transmitting units the number of which is the same as the number of processes that can be simultaneously executed by the node, both the pointer identifier notified by a node corresponding to a destination and the data to the node corresponding to the destination.

* * * * *